United States Patent
Koyama et al.

(10) Patent No.: US 11,518,897 B2
(45) Date of Patent: Dec. 6, 2022

(54) INK COMPOSITION, METHOD FOR PRODUCING THE SAME, AND IMAGE-FORMING METHOD

(71) Applicant: FUJIFILM CORPORATION, Tokyo (JP)

(72) Inventors: Ichiro Koyama, Kanagawa (JP); Shota Suzuki, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 426 days.

(21) Appl. No.: 16/726,945

(22) Filed: Dec. 26, 2019

(65) Prior Publication Data

US 2020/0140709 A1    May 7, 2020

Related U.S. Application Data

(63) Continuation of application No. PCT/JP2018/021547, filed on Jun. 5, 2018.

(30) Foreign Application Priority Data

Jul. 26, 2017 (JP) .............................. JP2017-144936

(51) Int. Cl.
| | | |
|---|---|---|
| *C09D 11/38* | (2014.01) | |
| *C08J 3/205* | (2006.01) | |
| *C08L 3/12* | (2006.01) | |
| *C08L 5/06* | (2006.01) | |
| *C08L 5/12* | (2006.01) | |
| *C08L 75/02* | (2006.01) | |
| *C08L 75/04* | (2006.01) | |
| *C09D 11/023* | (2014.01) | |
| *C09D 11/08* | (2006.01) | |
| *C09D 11/10* | (2014.01) | |
| *C09D 11/102* | (2014.01) | |
| *C09D 11/101* | (2014.01) | |
| *B41M 5/00* | (2006.01) | |

(52) U.S. Cl.
CPC ............ *C09D 11/38* (2013.01); *C08J 3/2053* (2013.01); *C08L 3/12* (2013.01); *C08L 5/06* (2013.01); *C08L 5/12* (2013.01); *C08L 75/02* (2013.01); *C08L 75/04* (2013.01); *C09D 11/023* (2013.01); *C09D 11/08* (2013.01); *C09D 11/10* (2013.01); *C09D 11/101* (2013.01); *C09D 11/102* (2013.01); *B41M 5/00* (2013.01)

(58) Field of Classification Search
CPC . B41M 5/00; C08J 3/2053; C08L 3/12; C08L 5/06; C08L 5/12; C08L 75/02; C08L 75/04; C09D 11/38; C09D 11/023; C09D 11/08; C09D 11/10; C09D 11/102; C09D 11/101
See application file for complete search history.

(56) References Cited

U.S. PATENT DOCUMENTS

| | | |
|---|---|---|
| 6,471,758 B1 | 10/2002 | Kelderman et al. |
| 2013/0335479 A1 | 12/2013 | Takabayashi et al. |
| 2014/0275395 A1 | 9/2014 | Xu et al. |
| 2014/0357889 A1* | 12/2014 | McCarthy .......... C08G 65/3322 560/200 |
| 2015/0145920 A1 | 5/2015 | Breton et al. |
| 2017/0009094 A1 | 1/2017 | Miyano |
| 2017/0166766 A1 | 6/2017 | Sato et al. |
| 2017/0349771 A1 | 12/2017 | Sato et al. |

FOREIGN PATENT DOCUMENTS

| | | |
|---|---|---|
| CN | 103547639 A | 1/2014 |
| CN | 106715508 A | 5/2017 |
| EP | 2789470 A1 | 10/2014 |
| EP | 2843014 A1 | 3/2015 |
| EP | 3608376 A1 | 2/2020 |
| JP | 05-255624 A | 10/1993 |
| JP | 2005-336411 A | 12/2005 |
| JP | 2013-7039 A | 1/2013 |
| JP | 2015-101103 A | 6/2015 |
| JP | 2017-001934 A | 1/2017 |
| JP | 2017-019934 A | 1/2017 |
| WO | 2015/114095 A1 | 8/2015 |
| WO | 2015/158748 A1 | 10/2015 |
| WO | 2016/152254 A1 | 9/2016 |

OTHER PUBLICATIONS

English language translation of the following: Office action dated Feb. 9, 2021 from the JPO in a Japanese patent application No. 2019-532418 corresponding to the instant patent application. This office action translation is submitted now in order to supplement the understanding of the cited references which are being disclosed in the instant Information Disclosure Statement.
English language translation of the following: Office action dated Dec. 3, 2021 from the SIPO in a Chinese patent application No. 201880049318.5 corresponding to the instant patent application. This office action translation is submitted now in order to supplement the understanding of the cited references which are being disclosed in the instant Information Disclosure Statement.
Extended European Search Report dated Jun. 23, 2020, issued in corresponding EP Patent Application No. 18837913.5.
International Search Report issued in International Application No. PCT/JP2018/021547 dated Aug. 28, 2018.
Written Opinion of the ISA issued in International Application No. PCT/JP2018/021547 dated Aug. 28, 2018.
Kushi, Yoshinori, "Introduction to Dispersant for Pigment Dispersion", J. Jpn. Soc. Colour Mater., 78 (3), Feb. 21, 2005, pp. 141-148.

* cited by examiner

*Primary Examiner* — Patrick D Niland
(74) *Attorney, Agent, or Firm* — Solaris Intellectual Property Group, PLLC

(57) ABSTRACT

Provided are an ink composition including water, particles including a polymer having at least one selected from the group consisting of a urethane group and a urea group, and a gelling agent having a hydrogen-bonding group; a method for producing the ink composition; and an image-forming method.

14 Claims, 1 Drawing Sheet

INK COMPOSITION, METHOD FOR PRODUCING THE SAME, AND IMAGE-FORMING METHOD

CROSS-REFERENCE TO RELATED APPLICATIONS

This application is a continuation application of International Application No. PCT/JP2018/021547, filed Jun. 5, 2018, the disclosure of which is incorporated herein by reference in its entirety. Further, this application claims priority from Japanese Patent Application No. 2017-144936, filed Jul. 26, 2017, the disclosure of which is incorporated herein by reference in its entirety.

BACKGROUND OF THE INVENTION

1. Field of the Invention

The present disclosure relates to an ink composition, a method for producing the ink composition, and an image-forming method.

2. Description of the Related Art

There are known ink compositions including a polymer such as polyurethane or polyurea, and water.

For example, an aqueous UV ink jet ink has been disclosed that includes at least one photopolymerization initiator and capsules constituted by cores and shells surrounding the cores and composed of a crosslinked polymer, wherein the cores include a UV curable compound (for example, refer to WO2015/158748A). This WO2015/158748A states that, in Paragraph 0081, the shells are preferably composed of polyurethane, polyurea, or a combination of these.

On the other hand, for ink compositions other than ink compositions including water, a technique of using a gelling agent has been studied.

For example, there is a known ink composition for fusible ink that is usable for a printing apparatus configured to eject ink droplets through ink ducts, and that contains a substance reversibly crosslinkable with liquid ink, wherein the substance includes a gelling agent (for example, refer to JP2013-7039A). This JP2013-7039A describes, in its Abstract, "when ink droplets having been transferred onto a printing medium are turned into gel during a cooling process, the viscosity of the molten ink droplets considerably increases, so that the droplets are relatively fixed. Therefore, the ink droplets no longer flow into the paper uncontrollably. Thus, such an ink is applicable to both of porous printing media and smooth printing media. In addition, it has been found that such an ink is also applicable to printing apparatuses configured to subject printing media after printing to heating-post-treatment".

There is also a known oil-based pigment ink for ballpoint pens that enables smooth writing and also has high ink leakage resistance with the nib down, the ink at least including 15 to 40 mass % of a pigment, 35 to 80 mass % of an organic solvent, and 2 to 30 mass % of a resin, wherein the ink has a viscosity of 1,500 to 4,000 mPa·s, the ink further contains gel particles, and these gel particles include particles of 30 μm or less and 5 μm or more (for example, refer to JP2005-336411A). This JP2005-336411A describes, as a method for producing the oil-based pigment ink for ballpoint pens, a method of mixing a gelling agent and a single solvent to prepare a gel solution in advance, and mixing the gel solution with another component having been separately mixed in advance, to achieve homogeneous dispersion.

SUMMARY OF THE INVENTION

There are cases where images having higher scratch resistance need to be formed from an ink composition containing water and particles including a polymer having at least one of a urethane group or a urea group (for example, the ink composition described in WO2015/158748A).

An object of the present disclosure is to provide an ink composition capable of forming an image having high scratch resistance, a method for producing the ink composition, and an image-forming method using this ink composition.

Specific means for achieving the object includes the following embodiments.

<1> An ink composition, including:
water;
particles including a polymer having at least one selected from the group consisting of a urethane group and a urea group; and
a gelling agent having a hydrogen-bonding group.

<2> The ink composition according to <1>, wherein the hydrogen-bonding group is at least one selected from the group consisting of a hydroxy group, an ether group, a polyoxyalkylene group, an ester group, an amide group, a urea group, and a urethane group.

<3> The ink composition according to <2>, wherein the gelling agent is at least one selected from the group consisting of a hydrogelling agent and an amphiphilic gelling agent,
the hydrogelling agent is at least one selected from the group consisting of a polysaccharide, a protein, an acrylic resin having the hydrogen-bonding group, a vinyl resin having the hydrogen-bonding group, and a polyoxyalkylene resin, and
the amphiphilic gelling agent has the hydrogen-bonding group that is at least one selected from the group consisting of an ester group, an amide group, a urea group, and a urethane group, and a hydrophobic group that is at least one selected from the group consisting of a linear alkyl group and a linear alkylene group.

<4> The ink composition according to <3>, wherein the gelling agent includes the hydrogelling agent, and
the hydrogelling agent is at least one selected from the group consisting of agarose, agaropectin, amylose, amylopectin, gum arabic, sodium alginate, propylene glycol alginate, methylcellulose, ethylcellulose, ethylhydroxyethylcellulose, curdlan, carrageenan, carboxymethylcellulose, carboxymethyl starch, agar, xanthan gum, guar gum, quince seeds, glucomannan, keratan sulfate, hydroxyethylcellulose, hydroxypropylcellulose, pectin, methyl starch, locust bean gum, dextrin, cyclodextrin, gelatin, poly(N-isopropylacrylamide), polyvinyl alcohol, polymethyl vinyl ether, polyethylene glycol, polyethylene glycol monomethyl ether, a polyethylene glycol-polypropylene glycol block copolymer, a polyethylene glycol-polypropylene glycol-polyethylene glycol block copolymer, and a polypropylene glycol-polyethylene glycol-polypropylene glycol block copolymer.

<5> The ink composition according to <3> or <4>, wherein the gelling agent includes the hydrogelling agent, and
the hydrogelling agent forms helixes or hydrogen bonds to form hydrogel.

<6> The ink composition according to any one of <3> to <5>, wherein the gelling agent includes the hydrogelling agent, and the hydrogelling agent is at least one selected from the group consisting of agarose, agaropectin, amylose, amylopectin, curdlan, carrageenan, agar, and gelatin.

<7> The ink composition according to any one of <3> to <6>, wherein the gelling agent includes the hydrogelling agent, and the hydrogelling agent has a gel point of 100° C. or less.

<8> The ink composition according to <3>, wherein the gelling agent includes the amphiphilic gelling agent, the hydrogen-bonding group of the amphiphilic gelling agent is at least one selected from the group consisting of an amide group, a urea group, and a urethane group, and the hydrophobic group of the amphiphilic gelling agent is at least one selected from the group consisting of a linear alkyl group having 10 or more carbon atoms and a linear alkylene group having 10 or more carbon atoms.

<9> The ink composition according to <3> or <8>, wherein the gelling agent includes the amphiphilic gelling agent, and the hydrogen-bonding group of the amphiphilic gelling agent is at least one selected from the group consisting of a urea group and a urethane group.

<10> The ink composition according to any one of <3>, <8>, and <9>, wherein the gelling agent includes the amphiphilic gelling agent, and the amphiphilic gelling agent has a molecular weight of less than 2000.

<11> The ink composition according to any one of <1> to <10>, wherein the gelling agent is included in the particles.

<12> The ink composition according to any one of <1> to <11>, wherein a content of the gelling agent relative to a total solid content of the particles is 0.1 mass % to 2.5 mass %.

<13> The ink composition according to any one of <1> to <12>, wherein the particles have a polymerizable group.

<14> A method for producing the ink composition according to any one of <1> to <13>, the method including:

mixing and emulsifying an oil-phase component including an organic solvent, the gelling agent, and the polymer, or an oil-phase component including an organic solvent, the gelling agent, and a tri- or higher functional isocyanate compound, and an aqueous-phase component including water, to form the particles.

<15> An image-forming method, including:

applying the ink composition according to any one of <1> to <13> onto a substrate to form an ink film; and heating the ink film.

The present disclosure provides an ink composition capable of forming an image having high scratch resistance, a method for producing the ink composition, and an image-forming method using this ink composition.

BRIEF DESCRIPTION OF THE DRAWING

FIG. 1 illustrates a character image used for evaluation of the definition of images in EXAMPLES.

DESCRIPTION OF THE PREFERRED EMBODIMENTS

In this Specification, ranges defined by a value "to" a value include these values as the minimum value and the maximum value.

In this Specification, the amount of each of components in a composition means, when the composition contains a plurality of substances belonging to such a component, the total amount of the plurality of substances in the composition unless otherwise specified.

In this Specification, among ranges described in series, the upper limit value or the lower limit value of a range may be replaced by the upper limit value or the lower limit value of one of other ranges described in series, or may be replaced by a value described in Examples.

In this Specification, the term "step" includes not only an independent step, but also a step that is not clearly distinguished from another step but that achieves the intended result of the step.

In this Specification, "*" in chemical formulas denote bonding positions.

In this Specification, "images" mean any ink films formed from ink. The concept of "images" encompasses, in addition to patterned images (such as characters, symbols, and FIGURES), solid images.

In this Specification, "light" is a concept that encompasses actinic energy rays such as γ-rays, β-rays, electron beams, ultraviolet radiation, and visible radiation.

In this Specification, ultraviolet radiation is also referred to as "UV (Ultra Violet) light".

In this Specification, light emitted from an LED (Light Emitting Diode) light source is also referred to as "LED light".

In this Specification, "(meth)acrylic acid" is a concept that encompasses both of acrylic acid and methacrylic acid; "(meth)acrylate" is a concept that encompasses both of acrylate and methacrylate; and "(meth)acryloyl group" is a concept that encompasses both of an acryloyl group and a methacryloyl group.

In this Specification, the ether group, the polyoxyalkylene group, the ester group, the amide group, the urea group, and the urethane group respectively mean an ether bond, a polyoxyalkylene bond, an ester bond, an amide bond, a urea bond, and a urethane bond.

Ink Composition

The ink composition according to the present disclosure (hereafter, also simply referred to as "ink") contains water, particles (hereafter, also referred to as "specified particles") including a polymer having at least one of a urethane group or a urea group (hereafter, also referred to as "specified polymer"), and a gelling agent having a hydrogen-bonding group (hereafter, also referred to as "specified gelling agent").

In the ink according to the present disclosure, the gelling agent having a hydrogen-bonding group may or may not be included in the specified particles.

In other words, the ink according to the present disclosure contains water, the specified particles, and at least one of a specified gelling agent included in the specified particles or a specified gelling agent not included in the specified particles.

The concept of "specified gelling agent is included in the specified particles" encompasses both of a configuration in which a specified gelling agent is present within the specified particles, and a configuration in which a specified gelling agent is present on the surface portions of the specified particles.

The concept of "specified gelling agent is not included in the specified particles" means that the specified gelling agent is present outside of the specified particles.

When the specified gelling agent is included in the specified particles, the specified gelling agent serves as one of the components of the specified particles. Naturally, when the specified gelling agent is not included in the specified particles, the specified gelling agent is not a component of the specified particles.

In this Specification, a configuration in which a specified gelling agent is included in the specified particles may be referred to as "internal addition"; and a configuration in which a specified gelling agent is not included in the specified particles may be referred to as "external addition".

The ink according to the present disclosure is capable of forming an image having high scratch resistance.

The mechanism of providing such advantages is inferred as described below; however, the ink according to the present disclosure is not limited to the following mechanism.

In the ink film formed by applying the ink according to the present disclosure onto a substrate, a hydrogen-bonding group of the specified gelling agent and at least one of a urethane group or a urea group of the specified polymer inferentially interact (specifically, bonded via a hydrogen bond), to form a pseudo-crosslinked structure. The pseudo-crosslinked structure can be formed in at least one timing of before heating of the ink film, during heating of the ink film, or after heating of the ink film.

On the other hand, when the ink film is heated, the gelation function of the specified gelling agent inferentially causes gelation (specifically thickening) of the ink film.

Thus, in the case where the ink according to the present disclosure is applied onto the substrate to form an ink film, and this ink film is heated (this case encompasses a case where the ink according to the present disclosure is applied to a heated substrate to form an ink film. Hereafter, the same applies to the following description.), the formation of the above-described pseudo-crosslinked structure and the above-described gelation of the ink film inferentially synergistically cause an effective increase in the strength of the ink film. This inferentially results in higher scratch resistance of the ink film (namely, an image).

The ink according to the present disclosure enables formation of high-definition images.

The mechanism of this is inferred as follows: in a case where the ink according to the present disclosure is used to form a plurality of ink droplets on a substrate, and these plurality of ink droplets are heated to form a high-definition image (this case encompasses a case where the ink according to the present disclosure is used to form a plurality of ink droplets on a heated substrate to form an image), the above-described pseudo-crosslinked structure and the above-described gelation of the ink film synergistically suppress coalescence of the ink droplets on the substrate; as a result, the high-definition of the image can be maintained.

The ink droplets are an example of the ink film.

In general, compared with images formed from ink containing, as liquid components, a polymerizable monomer and/or an organic solvent, images formed from ink containing water as a liquid component tend to resist removal of the liquid component, so that the images tend to have lower strength (namely, scratch resistance of the images) and lower definition.

However, as described above, the ink according to the present disclosure enables, in spite of containing water as a liquid component, formation of images having high scratch resistance and high definition.

Hereinafter, components that can be included in the ink according to the present disclosure will be described.

Specified Gelling Agent

The ink according to the present disclosure contains the specified gelling agent (namely, a gelling agent having a hydrogen-bonding group).

The ink according to the present disclosure may contain a single or two or more specified gelling agents.

The hydrogen-bonding group of the specified gelling agent is not particularly limited as long as it interacts with, via a hydrogen bond, at least one of a urethane group or a urea group of the specified polymer.

Examples of the hydrogen-bonding group include a hydroxy group, an ether group, a polyoxyalkylene group, an ester group, an amide group, a urea group, and a urethane group.

The specified gelling agent may have a single or two or more hydrogen-bonding group species.

The specified gelling agent is, from the viewpoint of using the ink to form an image having higher scratch resistance, preferably at least one of a hydrogelling agent or an amphiphilic gelling agent.

The hydrogelling agent is preferably at least one selected from the group consisting of polysaccharides, proteins, acrylic resins having a hydrogen-bonding group, vinyl resins having a hydrogen-bonding group, and polyoxyalkylene resins.

The amphiphilic gelling agent preferably has at least one hydrogen-bonding group selected from the group consisting of an ester group, an amide group, a urea group, and a urethane group, and at least one hydrophobic group selected from the group consisting of linear alkyl groups and linear alkylene groups.

The hydrogelling agent exerts, upon heating of the ink film, a function of forming gel containing water (namely, hydrogel).

On the other hand, the amphiphilic gelling agent also exerts, upon heating of the ink film, the function of forming gel. The gel is formed from the amphiphilic gelling agent inferentially in the following manner: when the ink film is heated to evaporate at least a portion of water from the ink film, hydrophobic groups of the amphiphilic gelling agent molecules are brought close to each other and the amphiphilic gelling agent molecules aggregate.

In both of the case of gelation (namely, formation of hydrogel) caused by a hydrogelling agent serving as the specified gelling agent, and the case of gelation caused by an amphiphilic gelling agent serving as the specified gelling agent, the gelation and the above-described pseudo-crosslinked structure synergistically cause an effective increase in the strength of the ink film, which results in higher scratch resistance of the ink film.

Hydrogelling Agent

Among specified gelling agents, the hydrogelling agent is, from the viewpoint of using the ink to form an image having higher scratch resistance, preferably at least one selected from the group consisting of polysaccharides, proteins, acrylic resins having a hydrogen-bonding group, vinyl resins having a hydrogen-bonding group, and polyoxyalkylene resins, more preferably at least one selected from the group consisting of agarose, agaropectin, amylose, amylopectin, gum arabic, sodium alginate, propylene glycol alginate, methylcellulose, ethylcellulose, ethylhydroxyethylcellulose, curdlan, carrageenan, carboxymethylcellulose, carboxymethyl starch, agar, xanthan gum, guar gum, quince seeds, glucomannan, keratan sulfate, hydroxyethylcellulose, hydroxypropylcellulose, pectin, methyl starch, locust bean gum, dextrin, cyclodextrin, gelatin, poly(N-isopropylacrylamide), polyvinyl alcohol, polymethyl vinyl ether, polyethylene glycol, polyethylene glycol monomethyl ether, polyethylene glycol-polypropylene glycol block copolymers, polyethylene glycol-polypropylene glycol-polyethylene glycol block copolymers, and polypropylene glycol-polyethylene glycol-polypropylene glycol block copolymers.

The gel point of the hydrogelling agent is, from the viewpoint that the ink according to the present disclosure, which is an ink including water, effectively exerts the gelation function, preferably 100° C. or less, more preferably 80° C. or less.

The gel point of the hydrogelling agent is preferably 0° C. or more, more preferably 10° C. or more, more preferably 20° C. or more.

In this Specification, the gel point means the temperature determined by the following method.

The hydrogelling agent is dissolved or suspended in water. The resultant aqueous solution or aqueous suspension is measured for specific viscosities under various temperature conditions. A graph indicating the relation between temperature and specific viscosity is created. In the obtained graph, the temperature at which the specific viscosity sharply increases is defined as the gel point.

The specific viscosity is a value calculated using the following Formula (1).

$$sp = (\eta - \eta s)/\eta s \qquad \text{Formula (1)}$$

In Formula (1), $\eta$ represents the viscosity of the aqueous solution or aqueous suspension prepared by dissolving or suspending the hydrogelling agent in water; and $\eta s$ represents the viscosity of water.

The weight-average molecular weight (Mw) of the hydrogelling agent is not particularly limited.

The weight-average molecular weight (Mw) of the hydrogelling agent is, for example, 1,000 to 100,000,000, preferably 5,000 to 10,000,000, more preferably 10,000 to 100,000.

In this Specification, the weight-average molecular weight (Mw) and the number-average molecular weight (Mn) are values measured by gel permeation chromatography (GPC). However, when the molecular weight Mw of a compound is too low to be accurately measured by GPC, the molecular weight determined from the chemical structure of the compound is employed as the Mw of the compound. The same applies to Mn.

In this Specification, measurement by gel permeation chromatography (GPC) can be performed with a measurement device of an HLC (registered trademark)-8020GPC (Tosoh Corporation), three columns of TSKgel (registered trademark) Super Multipore HZ-H (4.6 mm ID×15 cm, Tosoh Corporation), and an eluent that is THF (tetrahydrofuran). The measurement conditions are a sample concentration of 0.45 mass %, a flow rate of 0.35 ml/min, a sample injection amount of 10 μl, a measurement temperature of 40° C., and use of a differential refractive index (RI) detector.

The calibration curve is created with "Standard samples TSK standard, polystyrene" from Tosoh Corporation: 8 samples of "F-40", "F-20", "F-4", "F-1", "A-5000", "A-2500", "A-1000", and "n-propylbenzene".

Such a polysaccharide serving as the hydrogelling agent has, as the hydrogen-bonding group, at least one of a hydroxy group or an ether group. The polysaccharide may have another hydrogen-bonding group. The polysaccharide may have a single or two or more hydrogen-bonding group species.

Examples of the polysaccharide include agarose, agaropectin, amylose, amylopectin, gum arabic, sodium alginate, propylene glycol alginate, methylcellulose, ethylcellulose, ethylhydroxyethyl cellulose, curdlan, carrageenan, carboxymethylcellulose, carboxymethyl starch, agar, xanthan gum, guar gum, quince seeds, glucomannan, keratan sulfate, hydroxyethylcellulose, hydroxypropylcellulose, pectin, methyl starch, locust bean gum, dextrin, and cyclodextrin.

The weight-average molecular weight (Mw) of the polysaccharide is not particularly limited.

The weight-average molecular weight (Mw) of the polysaccharide is, for example, 1,000 to 100,000,000, preferably 5,000 to 10,000,000, more preferably 10,000 to 100,000.

Such a protein serving as the hydrogelling agent has, as the hydrogen-bonding group, an amide group. The protein may have another hydrogen-bonding group. The protein may have a single or two or more hydrogen-bonding group species.

The protein may be gelatin.

The weight-average molecular weight (Mw) of the protein is not particularly limited.

The weight-average molecular weight (Mw) of the protein is, for example, 1,000 to 100,000,000, preferably 5,000 to 10,000,000, more preferably 10,000 to 100,000.

In such an acrylic resin having a hydrogen-bonding group and serving as the hydrogelling agent, examples of the hydrogen-bonding group include a hydroxy group, an ether group, a polyoxyalkylene group, an ester group, an amide group, a urea group, and a urethane group; preferred is an amide group.

The acrylic resin having a hydrogen-bonding group may have a single or two or more hydrogen-bonding group species.

The acrylic resin having a hydrogen-bonding group may be poly(N-isopropylacrylamide).

The weight-average molecular weight (Mw) of the acrylic resin having a hydrogen-bonding group is not particularly limited.

The weight-average molecular weight (Mw) of the acrylic resin having a hydrogen-bonding group is, for example, 1,000 to 500,000, preferably 5,000 to 100,000, more preferably 10,000 to 50,000.

In such a vinyl resin having a hydrogen-bonding group serving as the hydrogelling agent, examples of the hydrogen-bonding group include a hydroxy group, an ether group, a polyoxyalkylene group, an ester group, an amide group, a urea group, and a urethane group; preferred is a hydroxy group.

The vinyl resin having a hydrogen-bonding group may have a single or two or more hydrogen-bonding group species.

Examples of the vinyl resin having a hydrogen-bonding group include polyvinyl alcohol and polymethyl vinyl ether.

The weight-average molecular weight (Mw) of the vinyl resin having a hydrogen-bonding group is not particularly limited.

The weight-average molecular weight (Mw) of the vinyl resin having a hydrogen-bonding group is, for example, 1,000 to 500,000, preferably 5,000 to 100,000, more preferably 10,000 to 50,000.

Such a polyoxyalkylene resin serving as the hydrogelling agent has, as the hydrogen-bonding group, a polyoxyalkylene group. The polyoxyalkylene resin may have another hydrogen-bonding group. The polyoxyalkylene resin may have a single or two or more hydrogen-bonding group species.

Examples of the polyoxyalkylene resin include polyethylene glycol, polyethylene glycol monomethyl ether, polyethylene glycol-polypropylene glycol block copolymers, polyethylene glycol-polypropylene glycol-polyethylene glycol block copolymers, and polypropylene glycol-polyethylene glycol-polypropylene glycol block copolymers.

The weight-average molecular weight (Mw) of the polyoxyalkylene resin is not particularly limited.

The weight-average molecular weight (Mw) of the polyoxyalkylene resin is, for example, 500 to 500,000, preferably 1,000 to 100,000, more preferably 2,000 to 10,000.

As described above, the hydrogelling agent exerts, upon heating of the ink film, the function of forming gel containing water (namely, hydrogel).

The detailed mechanism by which hydrogel is formed with a hydrogelling agent varies depending on the species of the hydrogelling agent.

Hydrogelling agents can be classified, in terms of the mechanism of formation of hydrogel, into, for example, hydrogelling agents that form helixes to form hydrogel, hydrogelling agents that form hydrogen bonds to form hydrogel, hydrogelling agents that cause hydrophobic interaction to form hydrogel, and hydrogelling agents that form, for example, ionic bonds or coordinate bonds to form hydrogel.

Examples of the hydrogelling agents that form helixes to form hydrogel include agarose, agaropectin, amylose, amylopectin, curdlan, carrageenan, agar, and gelatin.

Examples of the hydrogelling agents that form hydrogen bonds to form hydrogel include gum arabic, ethylcellulose, ethylhydroxyethylcellulose, xanthan gum, quince seeds, keratan sulfate, hydroxyethylcellulose, hydroxypropylcellulose, poly(N-isopropylacrylamide), polyvinyl alcohol, polymethyl vinyl ether, and locust bean gum.

Examples of the hydrogelling agents that cause hydrophobic interaction to form hydrogel include methylcellulose and methyl starch.

Examples of the hydrogelling agents that form, for example, ionic bonds or coordinate bonds to form hydrogel include sodium alginate, propylene glycol alginate, carboxymethylcellulose, carboxymethyl starch, guar gum, glucomannan, and pectin.

Hydrogelling agents are, from the viewpoint of using the ink to form an image having higher scratch resistance, preferably hydrogelling agents that form helixes or hydrogen bonds to form hydrogel, more preferably hydrogelling agents that form helixes to form hydrogel.

Such a hydrogelling agent is particularly preferably, from the viewpoint of using the ink to form an image having higher scratch resistance, at least one selected from the group consisting of agarose, agaropectin, amylose, amylopectin, curdlan, carrageenan, agar, and gelatin.

Amphiphilic Gelling Agent

Among specified gelling agents, the amphiphilic gelling agent is, from the viewpoint of using the ink to form an image having higher scratch resistance, preferably an amphiphilic gelling agent having at least one hydrogen-bonding group selected from the group consisting of an ester group, an amide group, a urea group, and a urethane group, and at least one hydrophobic group selected from the group consisting of linear alkyl groups and linear alkylene groups.

The hydrogen-bonding group of the amphiphilic gelling agent is, from the viewpoint of using the ink to form an image having higher scratch resistance, more preferably at least one selected from the group consisting of an amide group, a urea group, and a urethane group, particularly preferably at least one selected from the group consisting of a urea group and a urethane group.

The hydrophobic group of the amphiphilic gelling agent is, from the viewpoint of using the ink to form an image having higher scratch resistance, preferably at least one selected from the group consisting of linear alkyl groups having 10 or more carbon atoms and linear alkylene groups having 10 or more carbon atoms.

The phrase "the hydrophobic group of the amphiphilic gelling agent is at least one selected from the group consisting of linear alkyl groups having 10 or more carbon atoms and linear alkylene groups having 10 or more carbon atoms" also naturally encompasses a case where the amphiphilic gelling agent has at least one selected from the group consisting of linear alkyl groups having 10 or more carbon atoms and linear alkylene groups having 10 or more carbon atoms, and at least one selected from the group consisting of linear alkyl groups having less than 9 carbon atoms and linear alkylene groups having less than 9 carbon atoms.

The linear alkyl groups more preferably have 15 or more carbon atoms, particularly preferably 18 or more carbon atoms.

The upper limit of the number of carbon atoms of the linear alkyl groups is not particularly limited. The upper limit of the number of carbon atoms of the linear alkyl groups is, for example, 30, preferably 25.

The linear alkylene groups more preferably have 15 or more carbon atoms, particularly preferably 18 or more carbon atoms.

The upper limit of the number of carbon atoms of the linear alkylene groups is not particularly limited. The upper limit of the number of carbon atoms of the linear alkylene groups is, for example, 30, preferably 25.

The molecular weight of the amphiphilic gelling agent is not particularly limited.

The molecular weight of the amphiphilic gelling agent is preferably less than 2000, more preferably 1500 or less, particularly preferably 1100 or less.

The molecular weight of the amphiphilic gelling agent is preferably 300 or more, more preferably 400 or more, particularly preferably 500 or more.

The amphiphilic gelling agent is, from the viewpoint of more effectively exerting the gelation function in the ink film, preferably solid at room temperature (25° C.).

From this viewpoint, the melting point of the amphiphilic gelling agent is preferably 40° C. or more, more preferably 60° C. or more, still more preferably 80° C. or more, particularly preferably 100° C. or more.

The upper limit of the melting point of the amphiphilic gelling agent is, from the viewpoint of production suitability of the amphiphilic gelling agent, preferably 200° C. or less.

Specific examples of the amphiphilic gelling agent include gel-01 to gel-09 described later in EXAMPLES.

The examples include, in addition to gel-01 to gel-09 described later in EXAMPLES, the following compounds. These compounds are each illustrated with the description of the molecular weight (MW) and the melting point (mp).

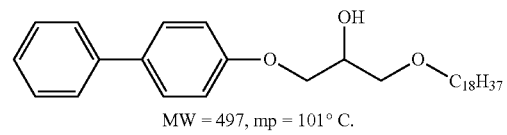

MW = 497, mp = 101° C.

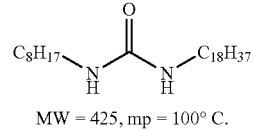

MW = 425, mp = 100° C.

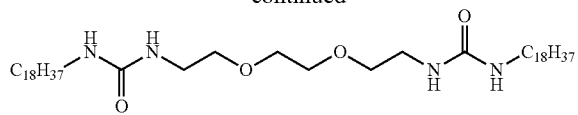

MW = 739, mp = 134° C.

The amphiphilic gelling agent can be synthesized by a commonly used synthesis method such as:

a synthesis method of reacting a long-chain alkyl isocyanate with a polyalkylene diol or a polyalkylenediamine;

a synthesis method of reacting an alkylene diisocyanate with a long-chain alkyl alcohol or a long-chain alkylamine; or a synthesis method of reacting a long-chain alkylene dicarboxylic acid chloride with an alcohol or an amine.

The amphiphilic gelling agent may be selected from among the gelling agents described in JP2013-7039A: amphiphilic gelling agents having at least one hydrogen-bonding group selected from the group consisting of an ester group, an amide group, a urea group, and a urethane group, and at least one hydrophobic group selected from the group consisting of linear alkyl groups and linear alkylene groups.

As described above, the specified gelling agent may be included in the specified particles (in other words, may be contained, in the internal addition manner, in the ink), or may not be included in the specified particles (in other words, may be contained, in the external addition manner, in the ink).

The specified gelling agent is, from the viewpoint of providing higher ejection stability in the case of ejecting the ink through ink jet nozzles (hereafter, also referred to as "ink ejection stability"), preferably included in the specified particles (in other words, contained, in the internal addition manner, in the ink).

In the present disclosure, when the amount of the specified gelling agent included in the specified particles relative to the total amount of the specified gelling agent in the ink is defined as the enclosure ratio (mass %) of the specified gelling agent, the enclosure ratio (mass %) of the specified gelling agent is, from the viewpoint of ink ejection stability, preferably 10 mass % or more, more preferably 50 mass % or more, still more preferably 70 mass % or more, still more preferably 80 mass % or more, still more preferably 90 mass % or more, still more preferably 95 mass % or more, still more preferably 97 mass % or more, particularly preferably 99 mass % or more.

When the ink includes two or more specified gelling agents, at least one specified gelling agent preferably has an enclosure ratio satisfying such a preferred range.

The enclosure ratio (mass %) of the specified gelling agent is determined in the following manner.

Method of Measuring Enclosure Ratio (Mass %) of Specified Gelling Agent

The following procedures are performed under a condition of a liquid temperature of 25° C.

When the ink contains no pigments, this ink is directly treated by the following procedures. When the ink contains a pigment, the ink is first centrifuged to remove the pigment, and the ink from which the pigment has been removed is treated by the following procedures.

From the ink, two samples of the same mass (hereafter, referred to as "Sample 1" and "Sample 2") are first obtained.

To Sample 1, tetrahydrofuran (THF) in an amount of 100 times the mass of the total solid content of Sample 1 is added, and mixing is performed to prepare a diluted solution. The obtained diluted solution is centrifuged at 80000 rpm (round per minute) for 40 minutes. A supernatant liquid generated by the centrifugation (hereafter, referred to as "Supernatant liquid 1") is collected. As a result of this procedure, the entirety of the specified gelling agent included in Sample 1 is inferentially extracted to Supernatant liquid 1. The mass of the specified gelling agent included in the collected Supernatant liquid 1 is measured by liquid chromatography (for example, with a liquid chromatography apparatus from Waters Corporation). The determined mass of the specified gelling agent is defined as the "total amount of specified gelling agent".

Sample 2 is centrifuged under the same conditions as in the centrifugation performed for the diluted solution. A supernatant liquid generated by the centrifugation (hereafter, referred to as "Supernatant liquid 2") is collected. As a result of this procedure, the specified gelling agent not enclosed within microcapsules (in other words, in a free state) in Sample 2 is inferentially extracted to Supernatant liquid 2. The mass of the specified gelling agent included in the collected Supernatant liquid 2 is determined by liquid chromatography (for example, a liquid chromatography apparatus from Waters Corporation). The determined mass of the specified gelling agent is defined as the "amount of free specified gelling agent".

From the "total amount of specified gelling agent" and the "amount of free specified gelling agent", the enclosure ratio (mass %) of the specified gelling agent is calculated with the following formula.

Enclosure ratio (mass %) of specified gelling agent=
((Total amount of specified gelling agent−
Amount of free specified gelling agent)/Total
amount of specified gelling agent)×100

When the ink includes two or more specified gelling agents, the enclosure ratio of the entirety of the two or more specified gelling agents may be calculated from the total amount of the two or more specified gelling agents being determined as the "total amount of specified gelling agent", and the total amount of two or more free specified gelling agents being determined as the "amount of free specified gelling agent"; alternatively, the enclosure ratio of any one of the specified gelling agents may be calculated from the amount of any one of the specified gelling agents being determined as the "total amount of specified gelling agent", and the amount of any one of the free specified gelling agents being determined as the "amount of free specified gelling agent".

Incidentally, the enclosure ratio of a component other than the specified gelling agent (for example, a polymerizable compound described later) can also be determined by the same method as in the enclosure ratio of the specified gelling agent.

However, regarding a compound having a molecular weight of 1000 or more, the masses of the compound included in the above-described Supernatant liquid 1 and Supernatant liquid 2 are measured by gel permeation chromatography (GPC) as the "total amount of compound" and the "amount of free compound", and the enclosure ratio (mass %) of the compound is determined.

The conditions of GPC are the same as those described above.

The specified gelling agent content relative to the total solid content of the specified particles is preferably 0.1 mass % to 10 mass %.

When the specified gelling agent content relative to the total solid content of the specified particles is 0.1 mass % or more, the image has higher scratch resistance. From the viewpoint of providing an image having higher scratch resistance, the specified gelling agent content relative to the total solid content of the specified particles is more preferably 0.3 mass % or more, more preferably 0.5 mass % or more, particularly preferably 0.7 mass % or more.

When the specified gelling agent content relative to the total solid content of the specified particles is 10 mass % or less, higher ink ejection stability is provided. From the viewpoint of providing higher ink ejection stability, the specified gelling agent content relative to the total solid content of the specified particles is more preferably 5.0 mass % or less, still more preferably 2.5 mass % or less, particularly preferably 2.0 mass % or less.

As described above, from the viewpoint of providing higher ink ejection stability, in a preferred example, the specified gelling agent content relative to the total solid content of the specified particles is 0.1 mass % to 2.5 mass %.

In this Specification, the total solid content of the specified particles means, in a case where the specified particles do not include solvents, the total amount of the specified particles, and, in a case where the specified particles include a solvent, the total amount of the specified particles except for the solvent.

In this Specification, when the specified particles include the specified gelling agent, the total solid content of the specified particles includes the content of the specified gelling agent included in the specified particles.

The specified gelling agent content relative to the total amount of the ink is preferably 0.01 mass % to 1.5 mass %.

When the specified gelling agent content relative to the total amount of the ink is 0.01 mass % or more, the image has higher scratch resistance. From the viewpoint of providing an image having higher scratch resistance, the specified gelling agent content relative to the total amount of the ink is more preferably 0.05 mass % or more, still more preferably 0.1 mass % or more.

When the specified gelling agent content relative to the total amount of the ink is 1.5 mass % or less, higher ink ejection stability is provided. From the viewpoint of providing higher ink ejection stability, the specified gelling agent content relative to the total amount of the ink is more preferably 0.8 mass % or less, still more preferably 0.5 mass % or less, particularly preferably 0.3 mass % or less.

Specified Particles

The specified particles include a specified polymer (specifically, a polymer having at least one of a urethane group or a urea group).

Specified Polymer

The specified particles include at least one specified polymer.

The specified polymer has at least one of a urethane group or a urea group.

The specified polymer may be a linear polymer not having a crosslinked structure (hereafter, also referred to as "specified chain polymer"), or may be a polymer having a crosslinked structure (for example, a three-dimensional crosslinked structure) (hereafter, also referred to as "specified crosslinked polymer").

The chain polymer may include, in the main chain, a cyclic structure such as an aliphatic ring, an aromatic ring, or a heterocycle.

Regarding the three-dimensional crosslinked structure optionally present in the specified crosslinked polymer, reference may be made to three-dimensional crosslinked structures described in WO2016/052053A.

Specified Chain Polymer

The specified chain polymer is preferably a reaction product of at least one selected from the group consisting of bifunctional isocyanate compounds, and at least one selected from the group consisting of compounds intramolecularly having two active hydrogen groups and water, or a reaction product of at least one selected from the group consisting of bifunctional isocyanate compounds, at least one selected from the group consisting of compounds intramolecularly having two active hydrogen groups and water, and another compound.

In this Specification, such an active hydrogen group means a hydroxy group, a primary amino group, a secondary amino group, or a thiol group.

Examples of such a compound intramolecularly having two active hydrogen groups include diol compounds, diamine compounds, and dithiol compounds.

For example, a reaction of a bifunctional isocyanate compound and a diol compound forms urethane groups.

A reaction of a bifunctional isocyanate compound and a diamine compound forms urea groups.

A reaction of a bifunctional isocyanate compound and water forms urea groups.

Examples of the other compound include:

among polymerizable-group-introducing compounds described later, compounds including a single active hydrogen group alone, among polymerizable-group-introduced isocyanate compounds described later, compounds including a single isocyanate group alone, among hydrophilic-group-introducing compounds described later, compounds including a single active hydrogen group alone, and among hydrophilic-group-introduced isocyanate compounds described later, compounds including a single isocyanate group alone.

Examples of the bifunctional isocyanate compounds for forming the specified chain polymer include the following Compounds (1-1) to (1-20).

(1-1)

IPDI

(1-2)

HXDI

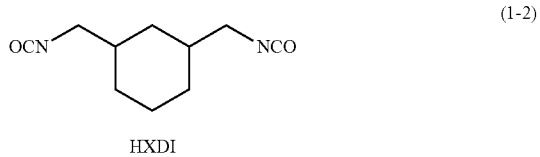

(1-3)

NBDI

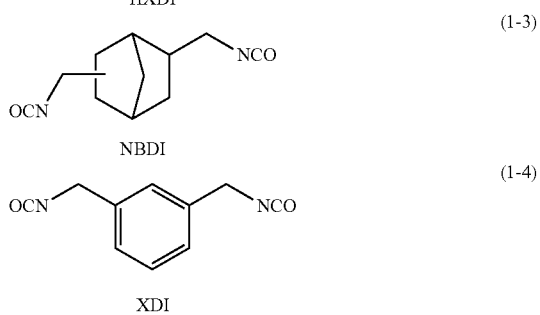

(1-4)

XDI

-continued
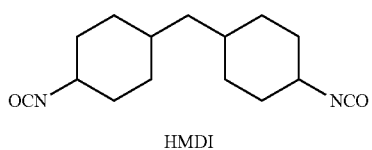
HMDI
(1-5)
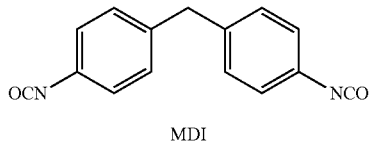
MDI
(1-6)
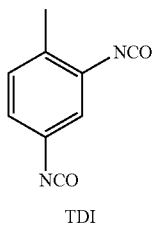
TDI
(1-7)
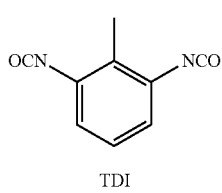
TDI
(1-8)
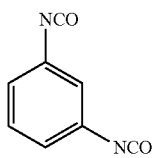
(1-9)
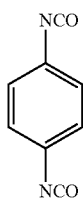
(1-10)
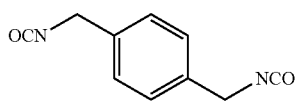
(1-11)
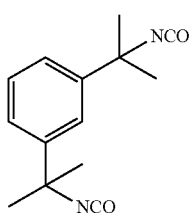
(1-12)
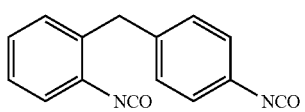
(1-13)
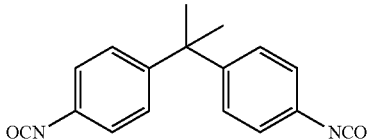
(1-14)
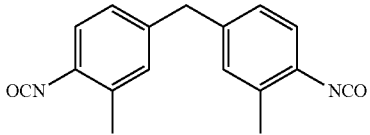
(1-15)
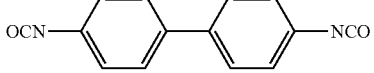
(1-16)
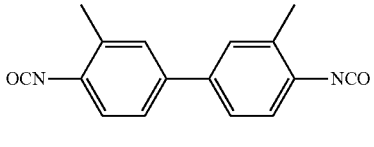
(1-17)
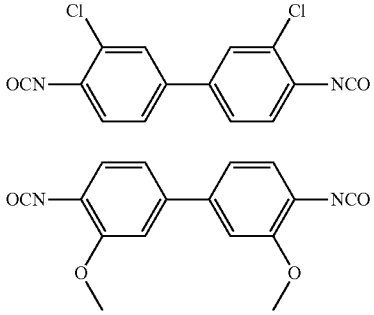
(1-18)
(1-19)
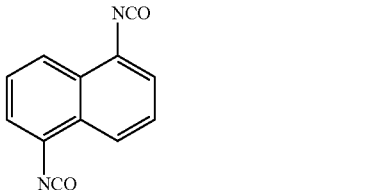
(1-20)
Examples of the compounds intramolecularly having two active hydrogen groups and used for forming the specified chain polymer include the following Compounds (2-1) to (2-24).
(2-1)
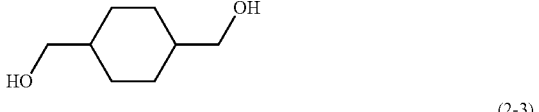
(2-2)
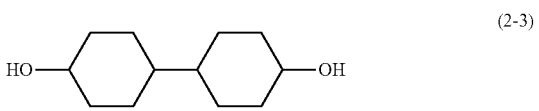
(2-3)

-continued
(2-4)
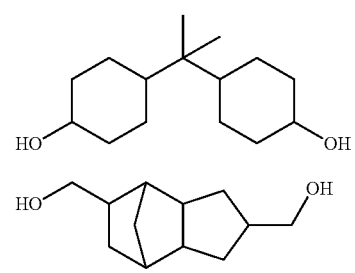
(2-5)
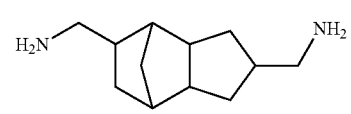
(2-6)
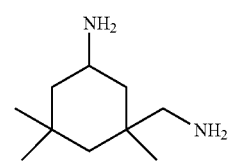
(2-7)
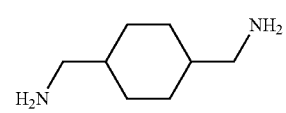
(2-8)
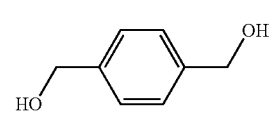
(2-9)
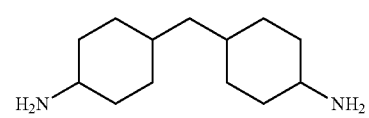
(2-10)
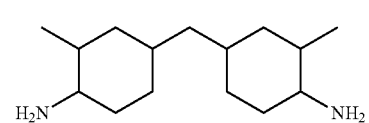
(2-11)
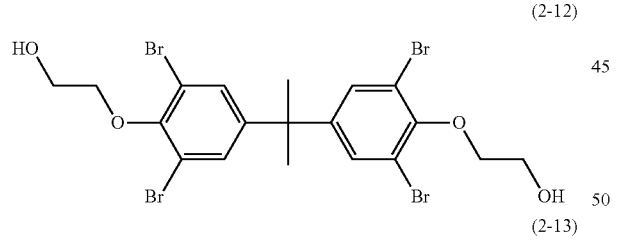
(2-12)
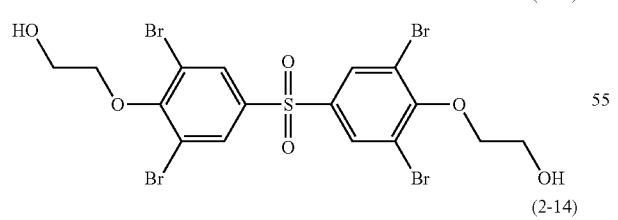
(2-13)
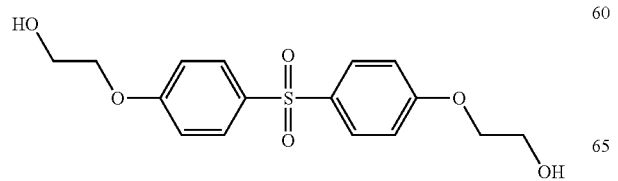
-continued
(2-15)
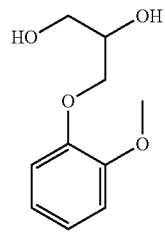
(2-16)
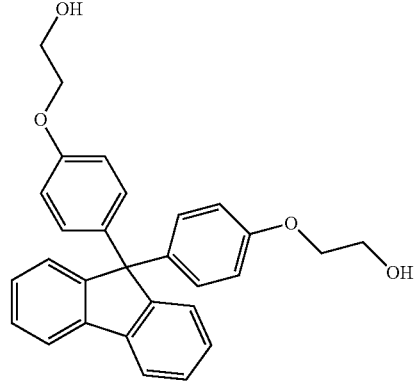
(2-17)
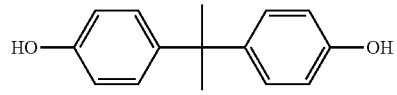
(2-18)
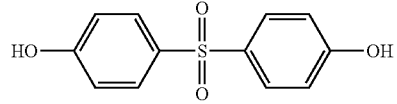
(2-19)
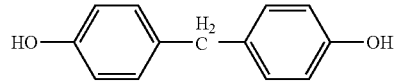
(2-20)
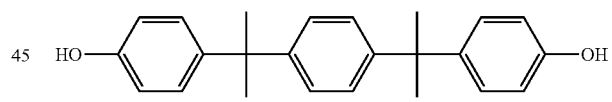
(2-21)
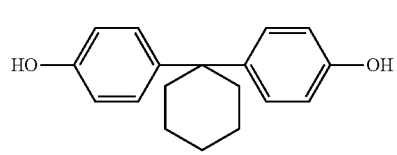
(2-22)
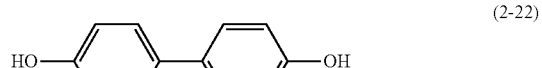
(2-23)
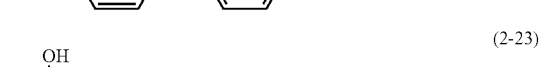

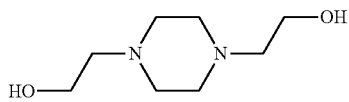

(2-24)

Other examples of the compounds intramolecularly having two active hydrogen groups and used for forming the specified chain polymer include, among polymerizable-group-introducing compounds described later, compounds including two active hydrogen groups, and, among hydrophilic-group-introducing compounds described later, compounds including two active hydrogen groups.

Specified Crosslinked Polymer

The specified crosslinked polymer is preferably a reaction product of at least one selected from the group consisting of tri- or higher functional isocyanate compounds, and at least one selected from the group consisting of compounds intramolecularly having two or more active hydrogen groups and water, or a reaction product of at least one selected from the group consisting of tri- or higher functional isocyanate compounds, at least one selected from the group consisting of compounds intramolecularly having two or more active hydrogen groups and water, and another compound.

Examples of the other compound include:

among polymerizable-group-introducing compounds described later, compounds including a single active hydrogen group alone, among polymerizable-group-introduced isocyanate compounds described later, compounds including a single isocyanate group alone, among hydrophilic-group-introducing compounds described later, compounds including a single active hydrogen group alone, and among hydrophilic-group-introduced isocyanate compounds described later, compounds including a single isocyanate group alone.

When the specified particles include the specified crosslinked polymer, the specified particles preferably include microcapsules (hereafter, "MC") including a shell composed of the specified crosslinked polymer and a core.

Examples of the compound used for forming the specified crosslinked polymer and intramolecularly having two or more active hydrogen groups include, as in the above-described compound intramolecularly having two active hydrogen groups and used for forming the specified chain polymer, diol compounds, diamine compounds, and dithiol compounds.

Other examples of the compound used for forming the specified crosslinked polymer and intramolecularly having two or more active hydrogen groups include tri- or higher functional polyol compounds, tri- or higher functional polyamine compounds, and tri- or higher functional polythiol compounds.

Such a tri- or higher functional isocyanate compound for forming the specified crosslinked polymer is preferably a reaction product of at least one selected from the group consisting of bifunctional isocyanate compounds, and at least one selected from the group consisting of compounds intramolecularly having three or more active hydrogen groups (such as tri- or higher functional polyol compounds, tri- or higher functional polyamine compounds, and tri- or higher functional polythiol compounds).

The number of moles (the number of molecules) of such a bifunctional isocyanate compound that is to react with such a compound intramolecularly having three or more active hydrogen groups is preferably 0.6 or more times, more preferably 0.6 times to 5 times, still more preferably 0.6 times to 3 times, still more preferably 0.8 times to 2 times, the number of moles of the active hydrogen groups (the number of equivalents of the active hydrogen groups) of the compound intramolecularly having three or more active hydrogen groups.

Examples of the bifunctional isocyanate compound for forming the tri- or higher functional isocyanate compound include the same as those described above for the bifunctional isocyanate compound for forming the specified chain polymer.

Examples of the compound intramolecularly having three or more active hydrogen groups for forming the tri- or higher functional isocyanate compound include compounds having structures represented by the following (T-1) to (T-13). In the following structures, n represents an integer selected from 1 to 100.

(T-1)

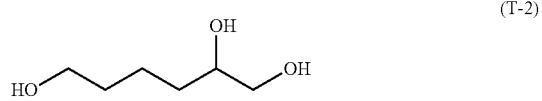

(T-2)

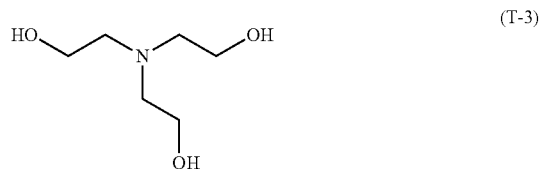

(T-3)

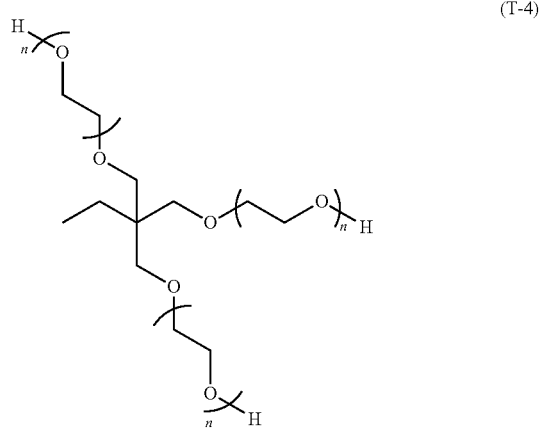

(T-4)

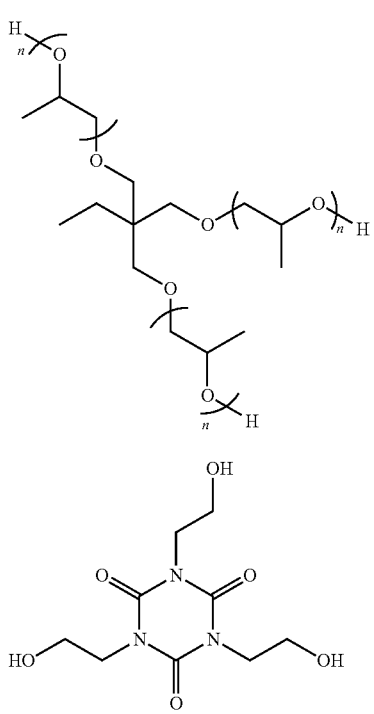
(T-5)

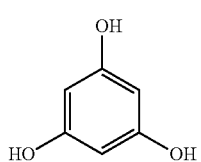
(T-6)

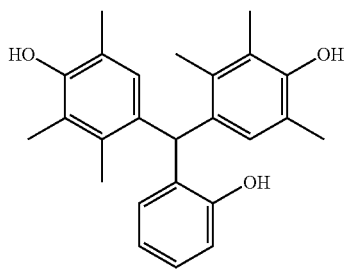
(T-7)

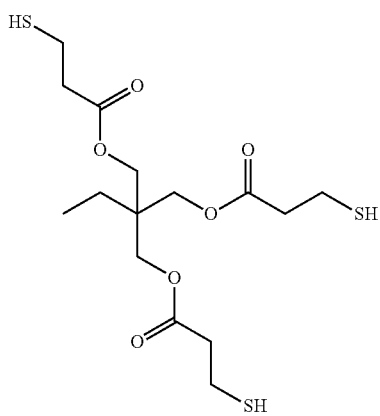
(T-8)

(T-9)

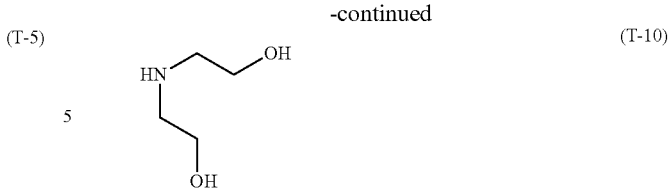
(T-10)

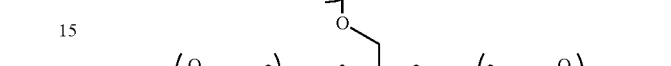
(T-11)

(T-12)

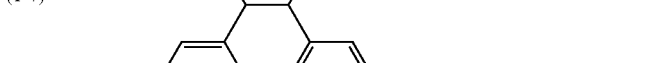
(T-13)

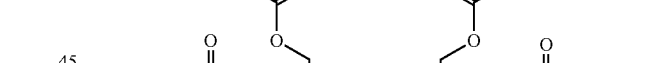

Examples of the tri- or higher functional isocyanate compound for forming the specified crosslinked polymer include adduct-type tri- or higher functional isocyanate compounds, isocyanurate-type tri- or higher functional isocyanate compounds, and biuret-type tri- or higher functional isocyanate compounds.

Examples of the commercially available products of the adduct-type tri- or higher functional isocyanate compounds include TAKENATE (registered trademark) D-102, D-103, D-103H, D-103M2, P49-75S, D-110N, D-120N, D-140N, D-160N (all from Mitsui Chemicals, Inc.), DESMODUR (registered trademark) L75, UL57SP (Sumika Bayer Urethane Co., Ltd.), CORONATE (registered trademark) HL, HX, L (Nippon Polyurethane Industry Co., Ltd.), and P301-75E (Asahi Kasei Corporation).

Examples of the commercially available products of the isocyanurate-type tri- or higher functional isocyanate compounds include TAKENATE (registered trademark) D-127N, D-170N, D-170HN, D-172N, D-177N (all from Mitsui Chemicals, Inc.), SUMIDUR N3300, DESMODUR (registered trademark) N3600, N3900, Z4470BA (all from Sumika Bayer Urethane Co., Ltd.), CORONATE (registered trademark) HX, HK (all from Nippon Polyurethane Industry Co., Ltd.), and DURANATE (registered trademark) TPA-100, TKA-100, TSA-100, TSS-100, TLA-100, and TSE-100 (all from Asahi Kasei Corporation). Examples of the commercially available products of the biuret-type tri- or higher functional isocyanate compounds include TAKENATE (registered trademark) D-165N, NP1100 (all from Mitsui Chemicals, Inc.), DESMODUR (registered trademark) N3200 (Sumika Bayer Urethane Co., Ltd.), and DURANATE (registered trademark) 24A-100 (Asahi Kasei Corporation).

When the specified particles include MC (namely, microcapsules) including a shell composed of the specified crosslinked polymer and a core, the specified particles may contain, as a dispersing agent for MC, among the above-described specified chain polymers, a specified chain polymer having a hydrophilic group. In this case, in the ink, at least peripheral portions of the shells of MC can be covered with the specified chain polymer serving as a dispersing agent. In this case, an interaction between a urethane group and/or a urea group of the shells of MC and a urethane group and/or a urea group of the dispersing agent (specified chain polymer), and the dispersing effect exerted by the hydrophilic group of the dispersing agent synergistically provide higher dispersion stability of the specified particles.

In this case, the ratio of the amount of the dispersing agent to the total solid-content amount of MC (hereafter, also referred to as the mass ratio [dispersing agent/MC solid content]) is preferably 0.005 to 1.000, more preferably 0.05 to 0.7.

When the mass ratio [dispersing agent/MC solid content] is 0.005 or more, the specified particles exhibit higher dispersion stability.

When the mass ratio [dispersing agent/MC solid content] is 1.000 or less, the image has higher hardness.

Preferred Weight-Average Molecular Weight (Mw) of Specified Polymer

The weight-average molecular weight (Mw) of the specified polymer is, from the viewpoint of the dispersion stability of the ink (specifically, the dispersion stability of the specified particles), preferably 5000 or more, more preferably 7000 or more, still more preferably 8000 or more, particularly preferably 10000 or more.

The upper limit of Mw of the specified polymer is not particularly limited. The upper limit of Mw of the specified polymer is, for example, 150000, 100000, 70000, or 50000.

The specified polymer content relative to the solid-content amount of the specified particles is preferably 10 mass % or more, more preferably 20 mass % or more.

When the specified polymer content relative to the solid-content amount of the specified particles is 10 mass % or more, the ink has higher dispersion stability (specifically, the dispersion stability of the specified particles).

The specified polymer content relative to the solid-content amount of the specified particles may be 100 mass %, but is preferably 80 mass % or less, more preferably 70 mass % or less, particularly preferably 50 mass % or less.

Polymerizable Group

The specified particles preferably have at least one polymerizable group species.

The polymerizable group optionally included in the specified particles contributes to curing of an image caused by, for example, light, heat, or infrared radiation.

The polymerizable group optionally included in the specified particles may covalently bond to the specified polymer, or may not covalently bond to the specified polymer. Stated another way, the specified polymer may have a polymerizable group, or the specified polymer may not have a polymerizable group.

The specified particles having a polymerizable group not covalently bonding to the specified polymer mean that the specified particles include a compound having a polymerizable group (namely, a polymerizable compound).

The specified particles including a polymerizable group covalently bonding to the specified polymer mean that the specified polymer itself has a polymerizable group.

The polymerizable group is preferably a photopolymerizable group or a thermal-polymerizable group.

The photopolymerizable group is preferably a radical-polymerizable group, more preferably a group including an ethylenically double bond, still more preferably a (meth)acryloyl group, an allyl group, a styryl group, or a vinyl group. The radical-polymerizable group is, from the viewpoint of radical polymerization reactivity and the hardness of a film to be formed, particularly preferably a (meth)acryloyl group.

The thermal-polymerizable group is preferably an epoxy group, an oxetanyl group, an aziridinyl group, an azetidinyl group, a ketone group, an aldehyde group, or a blocked isocyanate group.

The specified particles may contain one polymerizable group species alone, or may contain two or more polymerizable group species.

The fact that the specified particles have a polymerizable group can be confirmed by, for example, Fourier transform infrared spectroscopy (FT-IR).

In the ink of the present disclosure, from the viewpoint of providing an image having higher hardness, the specified particles preferably include a polymerizable compound (specifically, a photopolymerizable compound or a thermal-polymerizable compound).

Preferred examples of the polymerizable compound included in the specified particles will be described later.

In this Specification, inks containing specified particles having a photopolymerizable group are sometimes referred to as "photocurable inks", and inks containing specified particles having a thermal-polymerizable group are sometimes referred to as "thermosetting inks".

Polymerizable-Group-Introducing Compound

In the case of the specified polymer having a polymerizable group, the polymerizable group can be introduced into the specified polymer by using a polymerizable-group-introducing compound.

The polymerizable-group-introducing compound may be a compound having a polymerizable group and an active hydrogen group.

The polymerizable-group-introducing compound is preferably a compound having one or more polymerizable groups and two or more active hydrogen groups.

The method of introducing a polymerizable group into the specified polymer is not particularly limited. A particularly preferred method is, during synthesis of the specified polymer, to cause a reaction of at least one selected from the group consisting of bifunctional isocyanate compounds, at least one selected from the group consisting of water, diol compounds, diamine compounds, and dithiol compounds, and at least one polymerizable-group-introducing compound (and optionally at least one hydrophilic-group-introducing compound).

Such polymerizable-group-introducing compound species may be used alone or in combination of two or more thereof.

Other examples of the polymerizable-group-introducing compound include compounds described in Paragraphs 0075 to 0089 of WO2016/052053A.

The polymerizable-group-introducing compound is preferably a compound represented by the following formula (ma).

$$L^1 Lc_m Z_n \quad \text{(ma)}$$

In the formula (ma), $L^1$ represents an m+n-valent linking group; m and n each independently represent an integer selected from 1 to 100; Lc represents a monovalent ethylenically unsaturated group; and Z represents an active hydrogen group.

$L^1$ preferably represents a di- or higher valent aliphatic group, a di- or higher valent aromatic group, a di- or higher valent heterocyclic group, —O—, —S—, —NH—, —N<, —CO—, —SO—, —SO$_2$—, or a combination of the foregoing.

m and n each independently represent preferably 1 to 50, more preferably 2 to 20, still more preferably 3 to 10, particularly preferably 3 to 5.

Examples of the monovalent ethylenically unsaturated group represented by Lc include an allyl group, a vinyl group, an acryloyl group, and a methacryloyl group.

The active hydrogen group represented by Z is more preferably a hydroxy group or a primary amino group, still more preferably a hydroxy group.

The following are examples of the polymerizable-group-introducing compound; however, the polymerizable-group-introducing compound is not limited to the following examples. Incidentally, n's in Compounds (a-3) and (a-14) represent, for example, an integer selected from 1 to 90.

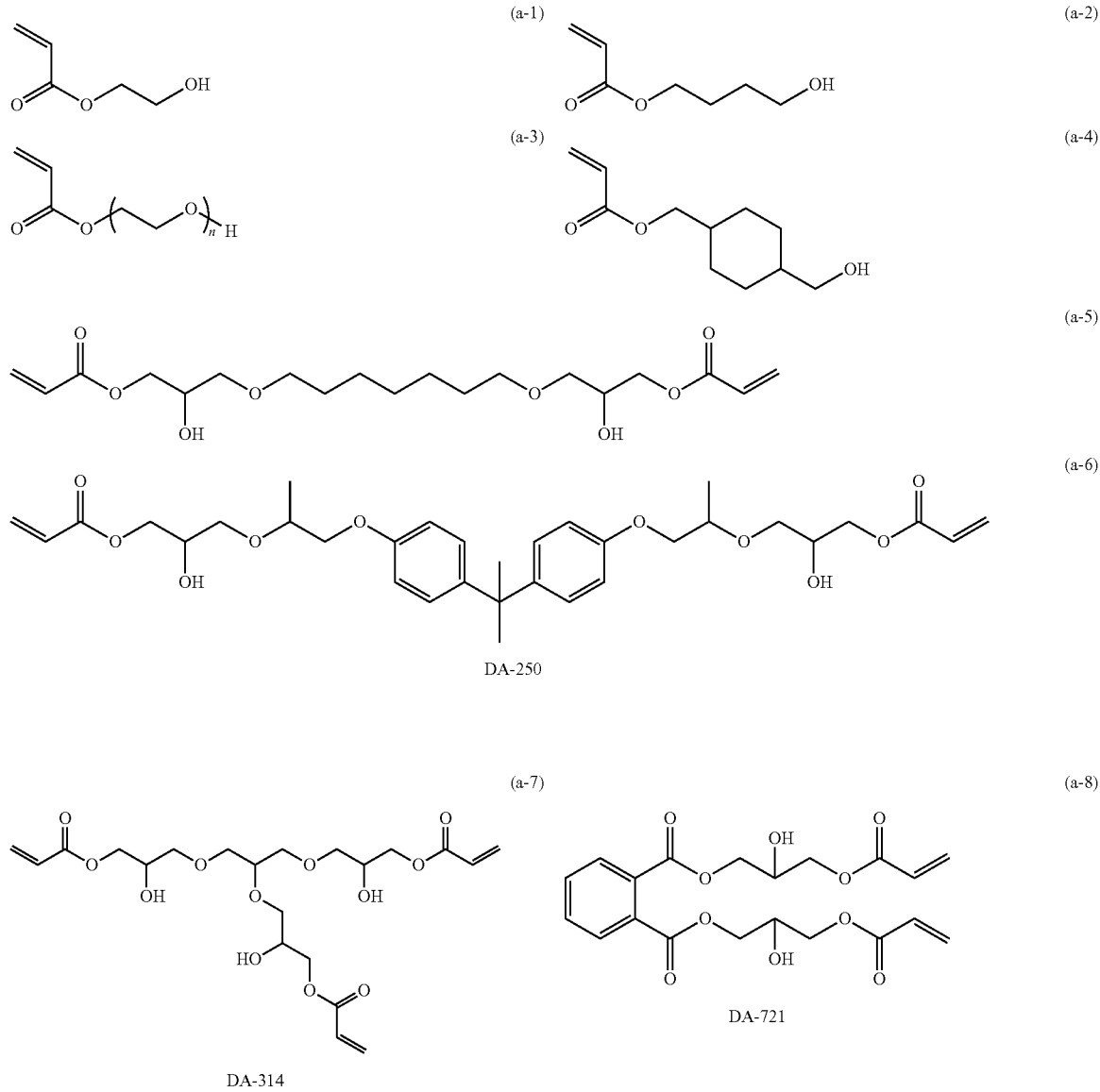

(a-9)
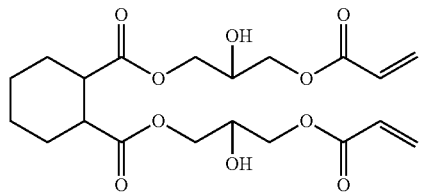
DA-722
(a-10)
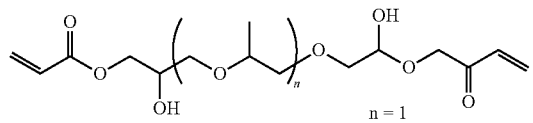
DA-911M  n = 1
(a-11)
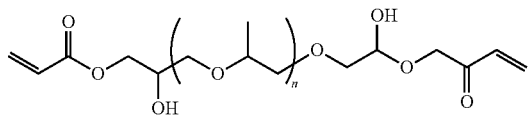
DA-920  n = 3
(a-12)
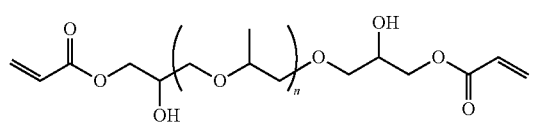
DA-931  n = 11
(a-13)
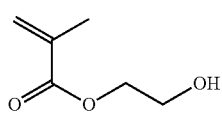
(a-14)
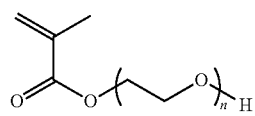
(a-15)
(a-16)
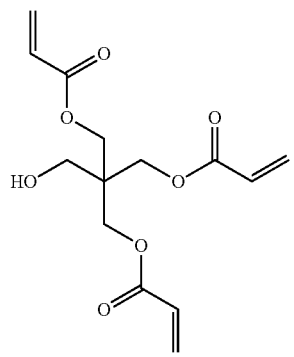
A-TMM-3L
(a-17)
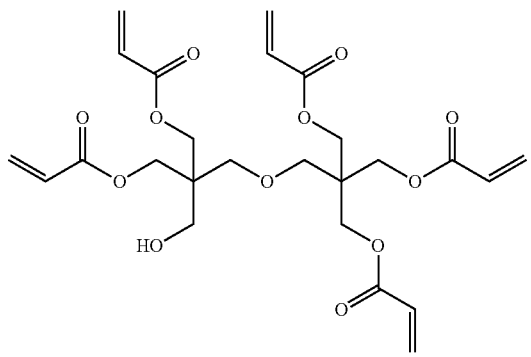
SR399E
(a-18)
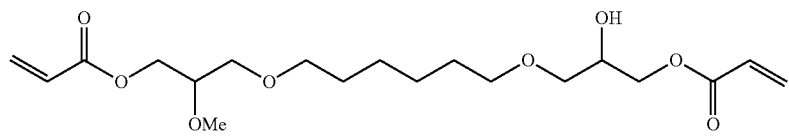
(a-19)
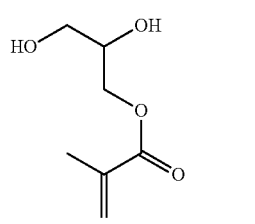
(a-20)
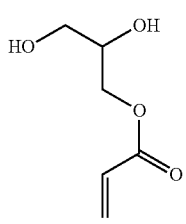

(a-21)

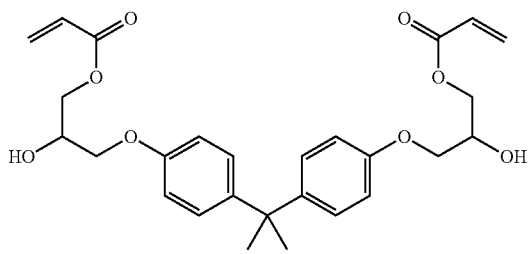

(a-22)

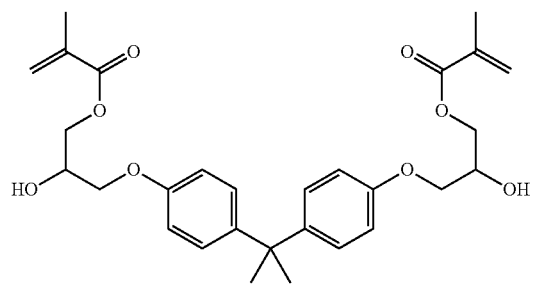

Polymerizable-Group-Introduced Isocyanate Compound

In the case of the specified polymer having a polymerizable group, the polymerizable group can also be introduced into the specified polymer by using a polymerizable-group-introduced isocyanate compound.

Examples of the polymerizable-group-introduced isocyanate compound include:

a reaction product of at least one of the above-described polymerizable-group-introducing compounds, and at least one of bifunctional isocyanate compounds;

a reaction product of at least one of the above-described polymerizable-group-introducing compounds, and at least one of tri- or higher functional isocyanate compounds; and a reaction product of at least one of the above-described polymerizable-group-introducing compounds, at least one of bifunctional isocyanate compounds, and at least one selected from the group consisting of tri- or higher functional polyol compounds, tri- or higher functional polyamine compounds, and tri- or higher functional polythiol compounds.

Hydrophilic Group

The specified particles may have at least one hydrophilic group species.

When the specified particles have a hydrophilic group, the ink has higher dispersion stability (for example, storage stability and ejection stability).

The hydrophilic group is preferably an anionic group or a nonionic group, and, from the viewpoint of a strong effect of providing higher dispersion stability, preferably an anionic group.

For example, a comparison between an anionic group and a nonionic group of the same molecular weight reveals that the anionic group exerts a stronger effect of providing higher dispersion stability. Thus, an anionic group (particularly preferably at least one selected from the group consisting of a carboxy group and salts of a carboxy group), even in the case of having a low molecular weight, can sufficiently exert the effect of providing higher dispersion stability.

The nonionic group may be a group having a polyether structure, preferably a monovalent group including a polyalkyleneoxy group.

The anionic group may be an unneutralized anionic group, or may be a neutralized anionic group.

Examples of the unneutralized anionic group include a carboxy group, a sulfo group, a sulfuric acid group, a phosphonic acid group, and a phosphoric acid group.

Examples of the neutralized anionic group include salts of a carboxy group, salts of a sulfo group, salts of a sulfuric acid group, salts of a phosphonic acid group, and salts of a phosphoric acid group.

In this Specification, "a carboxy group is neutralized" means that a carboxy group as an anionic group is turned into the form of a "salt" (for example, "—COONa"). The same applies to, as anionic groups, a sulfo group, a sulfuric acid group, a phosphonic acid group, and a phosphoric acid group.

The neutralization may be achieved by using, for example, an alkali metal hydroxide (for example, sodium hydroxide or potassium hydroxide) or an organic amine (for example, triethylamine).

The anionic group that may be included in the specified particles is, from the viewpoint of dispersion stability, preferably at least one selected from the group consisting of a carboxy group, salts of a carboxy group, a sulfo group, salts of a sulfo group, a sulfuric acid group, salts of a sulfuric acid group, a phosphonic acid group, salts of a phosphonic acid group, a phosphoric acid group, and salts of a phosphoric acid group, more preferably at least one selected from the group consisting of a carboxy group and salts of a carboxy group.

In the above-described salts of a carboxy group, salts of a sulfo group, salts of a sulfuric acid group, salts of a phosphonic acid group, and salts of a phosphoric acid group, "salts" are preferably alkali metal salts or organic amine salts, more preferably alkali metal salts.

In the alkali metal salts, the alkali metal is preferably K or Na.

When the specified particles have a neutralized anionic group, the neutralization degree of the anionic group (such as a carboxy group) of the specified particles is preferably 50% to 100%.

In this Specification, the "neutralization degree of the anionic group" means, for all the anionic groups of the specified particles, a ratio of the number of moles of neutralized anionic groups to the total of the number of moles of neutralized anionic groups and the number of moles of unneutralized anionic groups [Number of moles of neutralized anionic groups/(Number of moles of neutralized anionic groups+Number of moles of unneutralized anionic groups)].

When the neutralization degree of the anionic group is 50% or more, the specified particles have higher dispersion stability.

The neutralization degree of the anionic group is preferably 50% to 95%, more preferably 80% to 95%, still more preferably 90% to 95%.

The neutralized anionic group (specifically, the anionic group in the form of salt) exhibits basicity. When the neutralization degree of the anionic group is 95% or less, hydrolysis of a urethane group and/or a urea group of the specified polymer can be further suppressed.

The neutralization degree can be determined by neutralization titration.

Hydrophilic-Group-Introducing Compound

In the case of the specified particles in which the specified polymer has a hydrophilic group, the hydrophilic group can be introduced into the specified polymer by using a hydrophilic-group-introducing compound.

The hydrophilic-group-introducing compound may be a compound having a hydrophilic group and an active hydrogen group.

The hydrophilic-group-introducing compound is preferably a compound having one or more hydrophilic groups and two or more active hydrogen groups.

Among hydrophilic-group-introducing compounds, examples of anionic-group-introducing compounds include amino acids such as α-amino acids (specifically, lysine, alanine, arginine, asparagine, aspartic acid, cysteine, glutamine, glutamic acid, glycine, histidine, isoleucine, leucine, methionine, phenylalanine, proline, serine, threonine, tryptophan, tyrosine, and valine).

Specific examples of the anionic-group-introducing compound include, in addition to the above-described α-amino acids, the following.

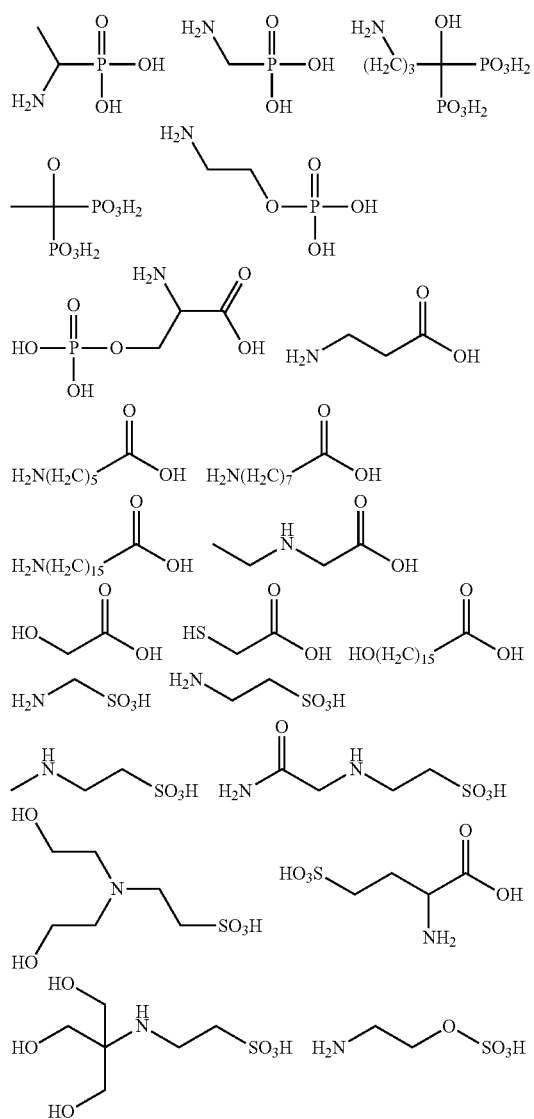

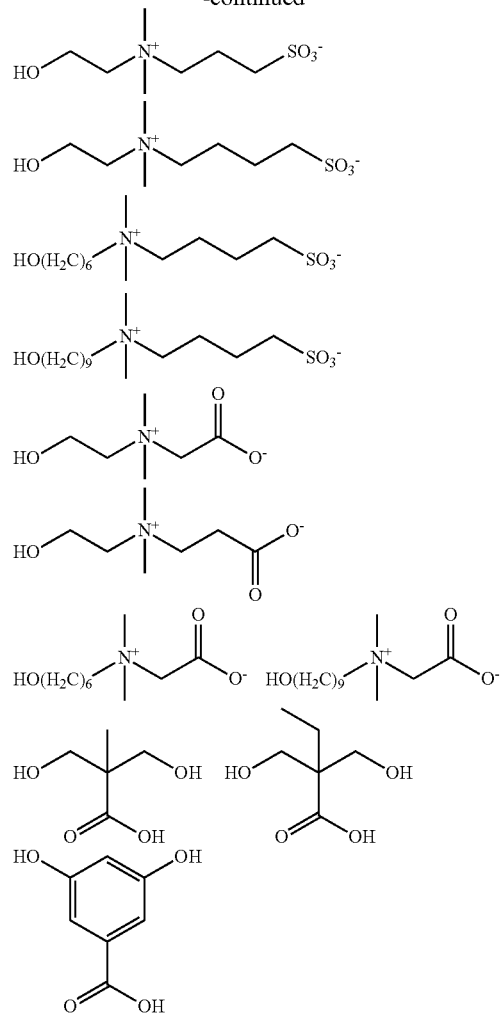

In such an anionic-group-introducing compound, the anionic group may be at least partially neutralized using, for example, an inorganic base such as sodium hydroxide or potassium hydroxide, or an organic base such as triethylamine.

Among the hydrophilic-group-introducing compounds, the nonionic-group-introducing compound is preferably a compound having a polyether structure, more preferably a compound having a polyoxyalkylene group.

Hydrophilic-Group-Introduced Isocyanate Compound

In the case of the specified particles in which the specified polymer has a hydrophilic group, the hydrophilic group can also be introduced into the specified polymer by using a hydrophilic-group-introduced isocyanate compound.

Examples of the hydrophilic-group-introduced isocyanate compound include:

a reaction product of at least one of the above-described hydrophilic-group-introducing compounds, and at least one of bifunctional isocyanate compounds;

a reaction product of at least one of the above-described hydrophilic-group-introducing compounds, and at least one of tri- or higher functional isocyanate compounds; and a reaction product of at least one of the above-described hydrophilic-group-introducing compounds, at least one of bifunctional isocyanate compounds, and at least one selected from the group consisting of tri- or higher functional polyol compounds, tri- or higher functional polyamine compounds, and tri- or higher functional polythiol compounds.

Specific examples of the hydrophilic-group-introduced isocyanate compound include adducts of trimethylolpropane (TMP), m-xylylene diisocyanate (XDI), and polyethylene glycol monomethyl ether (EO) (for example, TAKENATE (registered trademark) D-116N, manufactured by Mitsui Chemicals, Inc.).

Polymerizable Compound

The specified particles preferably include, as a compound having a polymerizable group (such as a photopolymerizable group or a thermal-polymerizable group), a polymerizable compound (such as a photopolymerizable compound or a thermal-polymerizable compound). In this case, an image having higher hardness is provided.

When the specified particles include a polymerizable compound, the specified particles may include a single polymerizable compound alone, or two or more polymerizable compounds. When the specified particles include a polymerizable compound, the polymerizable group of the polymerizable compound functions as the polymerizable group of the specified particles.

Incidentally, in the case of the specified particles including a polymerizable compound, the specified polymer may have a polymerizable group.

The polymerizable compound that can be included in the specified particles may be compounds described in Paragraphs 0097 to 0105 of WO2016/052053A.

The polymerizable compound that can be included in the specified particles is preferably a photopolymerizable compound, which is polymerized upon irradiation with light, or a thermal-polymerizable compound, which is polymerized upon heating or irradiation with infrared radiation. The photopolymerizable compound is preferably a radical-polymerizable compound having an ethylenically double bond that enables radical polymerization.

The polymerizable compound that can be included in the specified particles may be any one of a polymerizable monomer, a polymerizable oligomer, and a polymerizable polymer, but is preferably a polymerizable monomer from the viewpoint of providing a film having higher curing sensitivity and higher hardness. In particular, more preferred polymerizable compounds are photopolymerizable monomers encompassed within the concept of photopolymerizable compounds and thermal-polymerizable monomers encompassed within the concept of thermal-polymerizable compounds.

When the specified particles include, as a polymerizable compound, a photopolymerizable compound, the specified particles preferably further include a photopolymerization initiator described later.

When the specified particles include, as a polymerizable compound, a thermal-polymerizable compound, the specified particles preferably further include a photothermal conversion agent, a thermal curing accelerator, or a photothermal conversion agent and a thermal curing accelerator described later.

The content (total content in the case of including two or more species) of the polymerizable compound (preferably a polymerizable monomer. The same applies to the following description.) that can be included in the specified particles relative to the solid-content amount of the specified particles is, from the viewpoint of providing a film having higher curing sensitivity and higher hardness, preferably 10 mass % to 90 mass %, more preferably 20 mass % to 80 mass %, still more preferably 30 mass % to 70 mass %.

From the viewpoint of providing an image having higher adhesion to the substrate, at least one polymerizable compound (such as a photopolymerizable compound) that can be included in the specified particles is preferably a polymerizable compound having a cyclic structure (hereafter, also referred to as "cyclic polymerizable compound").

From the viewpoint of providing an image having higher adhesion to the substrate, at least one polymerizable compound (such as a photopolymerizable compound) that can be included in the specified particles is preferably a polymerizable compound including, in a single molecule, one or more cyclic structures and two or more (meth)acryloyl groups (hereafter, also referred to as "bi- or higher functional cyclic polymerizable compound").

Examples of the bi- or higher functional cyclic polymerizable compound include:

tricyclodecanedimethanol di(meth)acrylate, bisphenol A ethylene oxide (EPO) adduct di(meth)acrylate, bisphenol A propylene oxide (PO) adduct di(meth)acrylate, ethoxylated bisphenol A di(meth)acrylate, alkoxylated dimethyloltricyclodecane di(meth)acrylate, alkoxylated cyclohexanonedimethanol di(meth)acrylate, and cyclohexanonedimethanol di(meth)acrylate.

When the specified particles include a polymerizable compound, the percentage of a bi- or higher functional cyclic polymerizable compound relative to the whole polymerizable compound is preferably 10 mass % to 100 mass %, more preferably 30 mass % to 100 mass %, particularly preferably 40 mass % to 100 mass %.

The specified particles may include a bi- or lower functional polymerizable compound (preferably a bi- or lower functional polymerizable monomer. The same applies to the following description.), and a tri- or higher functional polymerizable compound (preferably a tri- or higher functional polymerizable monomer. The same applies to the following description.).

When the specified particles include a bi- or lower functional polymerizable compound and a tri- or higher functional polymerizable compound, the bi- or lower functional polymerizable compound inferentially contributes to adhesion of the film to the substrate, and the tri- or higher functional polymerizable compound inferentially contributes to higher hardness of the film.

The molecular weight of the polymerizable compound is preferably a weight-average molecular weight (Mw) of 100 to 100000, more preferably 100 to 30000, still more preferably 100 to 10000, still more preferably 100 to 4000, still more preferably 100 to 2000, still more preferably 100 to 1000, still more preferably 100 to 900, still more preferably 100 to 800, particularly preferably 150 to 750.

Polymerizable Monomer

The polymerizable monomer that can be included in the specified particles may be a photopolymerizable monomer, which is polymerized and cured upon irradiation with light, or a thermal-polymerizable monomer, which is polymerized and cured upon heating or irradiation with infrared radiation.

In the case of including, as a polymerizable compound, the photopolymerizable monomer, a photopolymerization initiator described later is preferably included. In the case of including, as a polymerizable compound, the thermal-polymerizable monomer, a photothermal conversion agent, a thermal curing accelerator, or a photothermal conversion agent and a thermal curing accelerator described later are preferably included.

Photopolymerizable Monomer

The photopolymerizable monomer can be selected from the group consisting of a polymerizable monomer having an ethylenically unsaturated bond that enables radical polymerization (namely, a radical-polymerizable monomer) and a polymerizable monomer having a cationic-polymerizable group that enables cationic polymerization (namely, a cationic-polymerizable monomer).

Examples of the radical-polymerizable monomer include an acrylate compound, a methacrylate compound, a styrene compound, a vinylnaphthalene compound, an N-vinyl heterocyclic compound, unsaturated polyester, unsaturated polyether, unsaturated polyamide, and unsaturated urethane.

The radical-polymerizable monomer is preferably a compound having an ethylenically unsaturated group.

When the specified particles include the radical-polymerizable monomer, the specified particles may include a single radical-polymerizable monomer species alone, or may include two or more radical-polymerizable monomer species.

Examples of the acrylate compound include monofunctional acrylate compounds such as 2-hydroxyethyl acrylate, butoxyethyl acrylate, carbitol acrylate, cyclohexyl acrylate, tetrahydrofurfuryl acrylate, benzyl acrylate, tridecyl acrylate, 2-phenoxyethyl acrylate (PEA), bis(4-acryloxypolyethoxyphenyl)propane, oligoester acrylate, epoxy acrylate, isobornyl acrylate (IBOA), dicyclopentenyl acrylate, dicyclopentenyloxyethyl acrylate, dicyclopentanyl acrylate, cyclic trimethylolpropane formal acrylate, 2-(2-ethoxyethoxy)ethyl acrylate, 2-(2-vinyloxyethoxy)ethyl acrylate, octyl acrylate, decyl acrylate, isodecyl acrylate, lauryl acrylate, 3,3,5-trimethylcyclohexyl acrylate, 4-t-butylcyclohexyl acrylate, isoamyl acrylate, stearyl acrylate, isoamyl stil acrylate, isostearyl acrylate, 2-ethylhexyldiglycol acrylate, 2-hydroxybutyl acrylate, 2-acryloyloxyethylhydrophthalic acid, ethoxy diethylene glycol acrylate, methoxy diethylene glycol acrylate, methoxypolyethylene glycol acrylate, methoxy propylene glycol acrylate, 2-hydroxy-3-phenoxypropyl acrylate, vinyl ether acrylate, 2-acryloyloxyethylsuccinic acid, 2-acryloyloxyphthalic acid, 2-acryloxyethyl-2-hydroxyethylphthalic acid, lactone-modified acrylate, acryloyl morpholine, acrylamide, and substituted acrylamide (such as N-methylol acrylamide, and diacetone acrylamide);

bifunctional acrylate compounds such as polyethylene glycol diacrylate, polypropylene glycol diacrylate, polytetramethylene glycol diacrylate, 1,3-butylene glycol diacrylate, 1,4-butanediol diacrylate, 1,6-hexanediol diacrylate (HDDA), 1,9-nonanediol diacrylate (NDDA), 1,10-decanediol diacrylate (DDDA), 3-methylpentanediol diacrylate (3MPDDA), neopentyl glycol diacrylate, tricyclodecanedimethanol diacrylate, bisphenol A ethylene oxide (EO) adduct diacrylate, bisphenol A propylene oxide (PO) adduct diacrylate, ethoxylated bisphenol A diacrylate, hydroxy neopentyl glycol diacrylate, propoxylated neopentyl glycol diacrylate, alkoxylated dimethyloltricyclodecane diacrylate, polytetramethylene glycol diacrylate, alkoxylated cyclohexanonedimethanol diacrylate, alkoxylated hexanediol diacrylate, dioxane glycol diacrylate, cyclohexanonedimethanol diacrylate, diethylene glycol diacrylate, neopentyl glycol diacrylate, tetraethylene glycol diacrylate, dipropylene glycol diacrylate, tripropylene glycol diacrylate (TPGDA), and neopentyl glycol propylene oxide adduct diacrylate; and tri- or higher functional acrylate compounds such as trimethylolpropane triacrylate, pentaerythritol triacrylate, dipentaerythritol tetraacrylate, ethoxylated isocyanurate triacrylate, ε-caprolactone-modified tris-(2-acryloxyethyl) isocyanurate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, caprolactone-modified trimethylolpropane triacrylate, pentaerythritol tetraacrylate, pentaerythritolethoxy tetraacrylate, glycerolpropoxy triacrylate, ethoxylated dipentaerythritol hexaacrylate, caprolactam-modified dipentaerythritol hexaacrylate, propoxylated glycerol triacrylate, ethoxylated trimethylolpropane triacrylate, and propoxylated trimethylolpropane triacrylate.

Examples of the methacrylate compound include monofunctional methacrylate compounds such as methyl methacrylate, n-butyl methacrylate, allyl methacrylate, glycidyl methacrylate, benzyl methacrylate, dimethylaminomethyl methacrylate, methoxypolyethylene glycol methacrylate, methoxytriethylene glycol methacrylate, hydroxyethyl methacrylate, phenoxyethyl methacrylate, and cyclohexyl methacrylate; and bifunctional methacrylate compounds such as polyethylene glycol dimethacrylate, polypropylene glycol dimethacrylate, 2,2-bis(4-methacryloxypolyethoxyphenyl)propane, and tetraethylene glycol dimethacrylate.

Examples of the styrene compound include styrene, p-methylstyrene, p-methoxystyrene, β-methylstyrene, p-methyl-β-methyl styrene, ca-methyl styrene, and p-methoxy-β-methyl styrene.

Examples of the vinylnaphthalene compound include 1-vinylnaphthalene, methyl-1-vinylnaphthalene, β-methyl-1-vinylnaphthalene, 4-methyl-1-vinylnaphthalene, and 4-methoxy-1-vinylnaphthalene.

Examples of the N-vinyl heterocyclic compound include N-vinylcarbazole, N-vinylpyrrolidone, N-vinylethylacetamide, N-vinylpyrrole, N-vinylphenothiazine, N-vinylacetanilide, N-vinyl ethylacetamide, N-vinylsuccinimide, N-vinylphthalimide, N-vinylcaprolactam, and N-vinylimidazole.

Other examples of the radical-polymerizable monomer include allyl glycidyl ether, diallyl phthalate, triallyl trimellitate, and N-vinylamide such as N-vinylformamide.

Of these radical-polymerizable monomers, the bi- or lower functional radical-polymerizable monomer is preferably at least one selected from the group consisting of 1,6-hexanediol diacrylate (HDDA), 1,9-nonanediol diacrylate (NDDA), 1,10-decanediol diacrylate (DDDA), 3-methylpentanediol diacrylate (3MPDDA), neopentyl glycol diacrylate, tricyclodecanedimethanol diacrylate, diethylene glycol diacrylate, tetraethylene glycol diacrylate, dipropylene glycol diacrylate, tripropylene glycol diacrylate (TPGDA), cyclohexanonedimethanol diacrylate, alkoxylated hexanediol diacrylate, polyethylene glycol diacrylate, and polypropylene glycol diacrylate.

The tri- or higher functional radical-polymerizable monomer is preferably at least one selected from the group consisting of trimethylolpropane triacrylate, pentaerythritol triacrylate, dipentaerythritol tetraacrylate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, caprolactone-modified trimethylolpropane triacrylate, pentaerythritol tetraacrylate, pentaerythritolethoxy tetraacrylate, glycerolpropoxy triacrylate, ethoxylated dipentaerythritol hexaacrylate, caprolactam-modified dipentaerythritol hexaacrylate, propoxylated glycerol triacrylate, ethoxylated trimethylolpropane triacrylate, and propoxylated trimethylolpropane triacrylate.

The combination of the bi- or lower functional radical-polymerizable monomer and the tri- or higher functional radical-polymerizable monomer is, for example, the combination of a bifunctional acrylate compound and a trifunctional acrylate compound, the combination of a bifunctional acrylate compound and a pentafunctional acrylate compound, or the combination of a monofunctional acrylate compound and a tetrafunctional acrylate compound.

The radical-polymerizable monomer is preferably a monomer having a cyclic structure;

more preferably the above-described preferred compound group of bi- or higher functional cyclic polymerizable compounds, cyclohexyl acrylate, tetrahydrofurfuryl acrylate, benzyl acrylate, isobornyl acrylate, dicyclopentenyl acrylate, dicyclopentenyloxyethyl acrylate, dicyclopentanyl acrylate, ethoxylated isocyanurate triacrylate, or ε-caprolactone-modified tris-(2-acryloxyethyl) isocyanurate;

still more preferably the above-described preferred compound group of bi- or higher functional cyclic polymerizable compounds, dicyclopentenyl acrylate, dicyclopentenyloxyethyl acrylate, or dicyclopentanyl acrylate; or particularly preferably the above-described preferred compound group of bi- or higher functional cyclic polymerizable compounds.

In addition to the above-described radical-polymerizable monomers, there are other usable radical-polymerizable monomers such as commercially available products described in, for example, "Crosslinking agent handbook", edited by Shinzo YAMASHITA (1981, TAISEISHA LTD.); "UV/EB curing handbook (raw material)", edited by Kiyomi KATO (1985, Kobunshi Kankokai); "Applications and markets of UV/EB curing techniques", edited by RadTech Japan, p. 79 (1989, CMC Publishing Co., Ltd.); and "Polyester resin handbook", written by Eiichiro TAKIYAMA (1988, THE NIKKAN KOGYO SHIMBUN, LTD.); and radical-polymerizable and crosslinkable monomers publicly known in industry.

Examples of the cationic-polymerizable monomer include an epoxy compound, a vinyl ether compound, and an oxetane compound.

The cationic-polymerizable monomer is preferably a compound having at least one olefin, thioether, acetal, thioxane, thietane, aziridine, N heterocycle, O heterocycle, S heterocycle, P heterocycle, aldehyde, lactam, or cyclic ester group.

The cationic-polymerizable monomer may be compounds described in J. V. Crivello et al. "Advances in Polymer Science", 62, pages 1 to 47 (1984); Lee et al. "Handbook of Epoxy Resins", McGraw Hill Book Company, New York (1967); and P. F. Bruins et al. "Epoxy Resin Technology" (1968).

There are also photopolymerizable monomers that are photocurable polymerizable monomers used for photopolymerizable compositions and described in patent publications such as JP1995-159983A (JP-H7-159983A), JP1995-31399B (JP-H7-31399B), JP1996-224982A (JP-H8-224982A), JP1998-863A (JP-H10-863A), JP1997-134011A (JP-H9-134011A), and JP2004-514014A. These monomers are also applicable as polymerizable monomers that can be included in the specified particles.

The photopolymerizable monomer may be a commercially available product on the market.

Examples of the commercially available product of the photopolymerizable monomer include AH-600 (bifunctional), AT-600 (bifunctional), UA-306H (hexafunctional), UA-306T (hexafunctional), UA-306I (hexafunctional), UA-510H (decafunctional), UF-8001G (bifunctional), DAUA-167 (bifunctional), LIGHT ACRYLATE NPA (bifunctional), LIGHT ACRYLATE 3EG-A (bifunctional) (all from Kyoeisha Chemical Co., Ltd.), SR339A (PEA, monofunctional), SR506 (IBOA, monofunctional), CD262 (bifunctional), SR238 (HDDA, bifunctional), SR341 (3MPDDA, bifunctional), SR508 (bifunctional), SR306H (bifunctional), CD560 (bifunctional), SR833S (bifunctional), SR444 (trifunctional), SR454 (trifunctional), SR492 (trifunctional), SR499 (trifunctional), CD501 (trifunctional), SR502 (trifunctional), SR9020 (trifunctional), CD9021 (trifunctional), SR9035 (trifunctional), SR494 (tetrafunctional), SR399E (pentafunctional) (all from Sartomer), A-NOD-N (NDDA, bifunctional), A-DOD-N (DDDA, bifunctional), A-200 (bifunctional), APG-400 (bifunctional), A-BPE-10 (bifunctional), A-BPE-20 (bifunctional), A-9300 (trifunctional), A-9300-1CL (trifunctional), A-TMPT (trifunctional), A-TMM-3L (trifunctional), A-TMMT (tetrafunctional), AD-TMP (tetrafunctional) (all from Shin Nakamura Chemical Co., Ltd.), UV-7510B (trifunctional) (The Nippon Synthetic Chemical Industry Co., Ltd.), KAYARAD DPCA-30 (hexafunctional), and KAYARAD DPEA-12 (hexafunctional) (all from Nippon Kayaku Co., Ltd.).

In addition, preferred examples of the polymerizable monomer include commercially available products such as NPGPODA (neopentyl glycol propylene oxide adduct diacrylate), SR531, SR285, SR256 (all from Sartomer), A-DHP (dipentaerythritol hexaacrylate, Shin Nakamura Chemical Co., Ltd.), ARONIX (registered trademark) M-156 (TOAGOSEI CO., LTD.), V-CAP (BASF), and VISCOAT #192 (OSAKA ORGANIC CHEMICAL INDUSTRY LTD.).

Among these commercially available products, in particular, preferred are photopolymerizable monomers having a cyclic structure that are SR506, SR833S, A-9300, and A-9300-CL, particularly preferred is SR833S.

Thermal-Polymerizable Monomer

The thermal-polymerizable monomer can be selected from the group consisting of polymerizable monomers that can be polymerized by being heated or irradiated with infrared radiation. Examples of the thermal-polymerizable monomer include compounds such as epoxy, oxetane, aziridine, azetidine, ketone, aldehyde, and blocked isocyanate.

Of these, examples of the epoxy compound include bi- or lower functional epoxy compounds such as 1,4-butanediol diglycidyl ether, 3-(bis(glycidyloxymethyl)methoxy)-1,2-propanediol, limonene oxide, 2-biphenyl glycidyl ether, 3,4-epoxycyclohexylmethyl-3',4'-epoxycyclohexanecarboxylate, epichlorohydrin-bisphenol S-derived epoxide, epoxidated styrene, epichlorohydrin-bisphenol F-derived epoxide, epichlorohydrin-bisphenol A-derived epoxide, epoxidated novolac, and alicyclic diepoxide; and tri- or higher functional epoxy compounds such as polyglycidyl ester of polybasic acid, polyglycidyl ether of polyol, polyglycidyl ether of polyoxyalkylene glycol, polyglycidyl ester of aromatic polyol, urethane polyepoxy compounds, and polyepoxy polybutadiene.

Examples of the oxetane compound include 3-ethyl-3-hydroxymethyl-1-oxetane, 1,4bis[3-ethyl-3-oxetanylmethoxy)methyl]benzene, 3-ethyl-3-phenoxymethyl-oxetane, bis([1-ethyl(3-oxetanyl)]methyl) ether, 3-ethyl-3-[(2-ethylhexyloxy)methyl]oxetane, 3-ethyl-[(triethoxysilylpropoxy)methyl]oxetane, and 3,3-dimethyl-2-(p-methoxyphenyl)-oxetane.

Examples of the blocked isocyanate compound include compounds obtained by deactivating isocyanate compounds with a blocking agent (active-hydrogen-containing compound).

Preferred examples of such an isocyanate compound include commercially available isocyanates such as hexamethylene diisocyanate, isophorone diisocyanate, toluyl diisocyanate, xylylene diisocyanate, hexamethylene diisocyanate trimer, trimethylhexylylene diisocyanate, diphenylmethane diisocyanate, dicyclohexylmethane diisocyanate, hydrogenated xylylene diisocyanate, TAKENATE (registered trademark; Mitsui Chemicals, Inc.), DURANATE (registered trademark; Asahi Kasei Corporation), and BAYHYDUR (registered trademark; Bayer AG); and bi- or higher functional isocyanates that are combinations of the foregoing.

Examples of the blocking agent include lactam [such as ε-caprolactam, δ-valerolactam, and γ-butyrolactam], oxime [such as acetoxime, methyl ethyl ketoxime (MEK oxime), methyl isobutyl ketoxime (MIBK oxime), and cyclohexanone oxime], amine [such as aliphatic amine (dimethylamine, diisopropylamine, di-n-propylamine, and diisobutylamine), alicyclic amine (such as methylhexylamine and dicyclohexylamine), and aromatic amine (such as aniline and diphenylamine)], aliphatic alcohol [such as methanol, ethanol, 2-propanol, and n-butanol], phenol and alkylphenol [such as phenol, cresol, ethylphenol, n-propylphenol, isopropylphenol, n-butylphenol, octylphenol, nonylphenol, xylenol, diisopropylphenol, and di-t-butylphenol], imidazole [such as imidazole and 2-methylimidazole], pyrazole [such as pyrazole, 3-methylpyrazole, and 3,5-dimethylpyrazole], imine [such as ethyleneimine and polyethyleneimine], active methylene [such as dimethyl malonate, diethyl malonate, diisopropyl malonate, acetylacetone, methyl acetoacetate, and ethyl acetoacetate], blocking agents described in JP2002-309217A and JP2008-239890A, and mixtures of two or more of the foregoing. In particular, the blocking agent is preferably oxime, lactam, pyrazole, active methylene, or amine.

The blocked isocyanate compound may be a commercially available product on the market. Preferred examples include TRIXENE (registered trademark) BI7982, BI7641, BI7642, BI7950, BI7960, and BI7991 (Baxenden Chemicals LTD), and BAYHYDUR (registered trademark; Bayer AG). There are also other preferred examples that are a compound group described in Paragraph 0064 in WO2015/158654A.

The specified particles including a polymerizable monomer can be produced by, for example, mixing an oil-phase component including a specified chain polymer and a polymerizable monomer, and an aqueous-phase component, and emulsifying the resultant mixture.

The polymerizable monomer preferably has a molecular weight that is a weight-average molecular weight (Mw) of 100 to 4000, more preferably 100 to 2000, still more preferably 100 to 1000, still more preferably 100 to 900, still more preferably 100 to 800, particularly preferably 150 to 750.

Photopolymerization Initiator

The specified particles may include at least one photopolymerization initiator.

When the specified particles have, as a polymerizable group, a photopolymerizable group (preferably a radical-polymerizable group) (in particular, when the specified particles include a photopolymerizable compound (more preferably a radical-polymerizable compound)), the specified particles preferably include at least one photopolymerization initiator.

When the specified particles include a photopolymerization initiator, the resultant image has higher sensitivity to an actinic energy ray, hence has higher hardness and higher adhesion to the substrate.

Specifically, when the specified particles include a photopolymerization initiator, each specified particle has both of a polymerizable group and a photopolymerization initiator. Thus, the polymerizable group and the photopolymerization initiator are in close proximity to each other, so that, compared with the cases of using existing photocurable compositions, the film has higher curing sensitivity (hereafter, also simply referred to as "sensitivity"). As a result, the resultant film has higher hardness and higher adhesion to the substrate.

When the specified particles include a photopolymerization initiator, photopolymerization initiators that have high sensitivity but have low dispersibility or low solubility in water and hence have been difficult to use become usable (for example, a photopolymerization initiator having a solubility of 1.0 mass % or less in water at 25° C.). As a result, photopolymerization initiators used can be selected with a higher degree of freedom, which results in an increase in the degree of freedom of selecting light sources used. This can provide higher curing sensitivity.

The above-described photopolymerization initiators that have high sensitivity but have low dispersibility or low solubility in water and hence have been difficult to use are, for example, specifically carbonyl compounds and acylphosphine oxide compounds described later, preferably acylphosphine oxide compounds.

In this way, in the ink according to the present disclosure, the specified particles are prepared so as to include a substance having a low solubility in water, so that the substance is contained in the ink according to the present disclosure, which is an aqueous composition. This is another advantage of the ink according to the present disclosure.

The ink according to the embodiment in which the specified particles include a photopolymerization initiator also has higher storage stability than existing photocurable compositions. The probable reason for this is that the photopolymerization initiator is included in the specified particles, to thereby suppress aggregation or sedimentation of the photopolymerization initiator.

The photopolymerization initiator that can be included in the specified particles may be appropriately selected from publicly known photopolymerization initiators.

The photopolymerization initiator is a compound that absorbs light (namely, an actinic energy ray) to generate a radical serving as a polymerization initiation species.

The photopolymerization initiator may be a publicly known compound. Preferred examples of the photopolymerization initiator include (a) carbonyl compounds such as aromatic ketones, (b) acylphosphine oxide compounds, (c) aromatic onium salt compounds, (d) organic peroxides, (e) thio compounds, (f) hexaarylbiimidazole compounds, (g) ketoxime ester compounds, (h) borate compounds, (i) azinium compounds, (j) metallocene compounds, (k) active ester compounds, (l) compounds having a carbon-halogen bond, and (m) alkylamine compounds.

As the photopolymerization initiator, the above-described compounds (a) to (m) may be used alone or in combination of two or more thereof.

Preferred examples of (a) carbonyl compounds, (b) acylphosphine oxide compounds, and (e) thio compounds include compounds having a benzophenone skeleton or a thioxanthone skeleton and described in "RADIATION CURING IN POLYMER SCIENCE AND TECHNOLOGY", J. P. FOUASSIER, J. F. RABEK (1993), pp. 77 to 117.

More preferred examples include α-thiobenzophenone compounds described in JP1972-6416B (JP-S47-6416B), benzoin ether compounds described in JP1972-3981B (JP-S47-3981B), α-substituted benzoin compounds described in JP1972-22326B (JP-S47-22326B), benzoin derivatives described in JP1972-23664B (JP-S47-23664B), aroyl phosphonate described in JP1982-30704A (JP-S57-30704A), dialkoxybenzophenone described in JP1985-26483B (JP-S60-26483B), benzoin ethers described in JP1985-26403B (JP-S60-26403B) and JP1987-81345A (JP-S62-81345A), α-aminobenzophenones described in JP1989-34242B (JP-H1-34242B), U.S. Pat. No. 4,318,791A, and EP0284561A1, p-di(dimethylaminobenzoyl)benzene described in JP1990-211452A (JP-H2-211452A), thio-substituted aromatic ketone described in JP1986-194062A (JP-S61-194062A), acylphosphine sulfide described in JP1990-9597B (JP-H2-9597B), acylphosphine described in JP1990-9596B (JP-H2-9596B), thioxanthones described in JP1988-61950B (JP-S63-61950B), and coumarins described in JP1984-42864B (JP-S59-42864B).

Also preferred are polymerization initiators described in JP2008-105379A and JP2009-114290A.

Examples of commercially available products of the photopolymerization initiator include IRGACURE (registered trademark) 184, 369, 500, 651, 819, 907, 1000, 1300, 1700, 1870, DAROCUR (registered trademark) 1173, 2959, 4265, ITX, LUCIRIN (registered trademark) TPO [all manufactured by BASF], ESACURE (registered trademark) KTO37, KTO46, KIP150, EDB [all manufactured by Lamberti S.p.A.], H-Nu (registered trademark) 470, 470X [all manufactured by Spectra Group Limited], OMNIPOL TX, 9210 [all manufactured by IGM Resins B.V.], and SPEEDCURE 7005, 7010, and 7040 [all manufactured by LAMB SON Limited].

Among these photopolymerization initiators, more preferred are (a) carbonyl compounds or (b) acylphosphine oxide compounds; specific examples include bis(2,4,6-trimethylbenzoyl)-phenylphosphine oxide (such as IRGACURE (registered trademark) 819, manufactured by BASF), 2-(dimethylamino)-1-(4-morpholinophenyl)-2-benzyl-1-butanone (such as IRGACURE (registered trademark) 369, manufactured by BASF), 2-methyl-1-(4-methylthiophenyl)-2-morpholinopropan-1-one (such as IRGACURE (registered trademark) 907, manufactured by BASF), 1-hydroxycyclohexyl-phenyl-ketone (such as IRGACURE (registered trademark) 184, manufactured by BASF), and 2,4,6-trimethylbenzoyl-diphenyl-phosphine oxide (such as DAROCUR (registered trademark) TPO and LUCIRIN (registered trademark) TPO (both manufactured by BASF)).

Of these, from the viewpoint of, for example, higher sensitivity and suitability for LED light, the photopolymerization initiator internally included is preferably the (b) acylphosphine oxide compound, more preferably a monoacylphosphine oxide compound (particularly preferably, 2,4,6-trimethylbenzoyl-diphenyl-phosphine oxide), or a bisacylphosphine oxide compound (particularly preferably, bis(2,4,6-trimethylbenzoyl)-phenylphosphine oxide).

The LED light preferably has a wavelength of 355 nm, 365 nm, 385 nm, 395 nm, or 405 nm.

Alternatively, from the viewpoint of suppression of migration, the photopolymerization initiator is preferably a polymeric photopolymerization initiator.

Examples of the polymeric photopolymerization initiator include the above-described Omnipol TX and 9210; and SPEEDCURE 7005, 7010, and 7040.

The specified particles including a photopolymerization initiator can be produced by, for example, mixing an oil-phase component including a specified chain polymer and a photopolymerization initiator, and an aqueous-phase component, and emulsifying the resultant mixture.

The photopolymerization initiator content relative to the solid-content amount of the specified particles is preferably 0.1 mass % to 25 mass %, more preferably 0.5 mass % to 20 mass %, still more preferably 1 mass % to 15 mass %.

Sensitizer

The specified particles may include at least one sensitizer.

When the specified particles include at least one photopolymerization initiator, the specified particles preferably include at least one sensitizer.

When the specified particles contain a sensitizer, decomposition of the photopolymerization initiator caused by irradiation with an actinic energy ray can be further promoted.

The sensitizer is a substance that absorbs a specific actinic energy ray to shift to an electroexcitation state. The sensitizer in the electroexcitation state comes into contact with the photopolymerization initiator to cause an effect such as electron transfer, energy transfer, or generation of heat. This promotes a chemical change of the photopolymerization initiator, specifically, for example, decomposition, or generation of a radical, acid, or base.

Examples of the sensitizer include benzophenone, thioxanthone, isopropylthioxanthone, anthraquinone, 3-acylcoumarin derivative, terphenyl, styryl ketone, 3-(aroylmethylene)thiazoline, camphorquinone, eosine, rhodamine, and erythrosine.

Other preferred examples of the sensitizer include compounds represented by General formula (i) in JP2010-24276A, and compounds represented by General formula (I) in JP1994-107718A (JP-H6-107718A).

Of these, from the viewpoint of suitability for LED light and reactivity to a photopolymerization initiator, the sensitizer is preferably at least one selected from the group consisting of thioxanthone, isopropylthioxanthone, and benzophenone, more preferably at least one selected from the group consisting of thioxanthone and isopropylthioxanthone, still more preferably isopropylthioxanthone.

When the specified particles include a sensitizer, such sensitizers may be included alone or in combination of two or more thereof.

When the specified particles include a sensitizer, the sensitizer content relative to the solid-content amount of the specified particles is preferably 0.1 mass % to 20 mass %, more preferably 0.2 mass % to 15 mass %, still more preferably 0.3 mass % to 10 mass %.

The specified particles including a photopolymerization initiator and a sensitizer can be produced by, for example, mixing an oil-phase component including a specified chain polymer, a photopolymerization initiator, and a sensitizer, and an aqueous-phase component, and emulsifying the resultant mixture.

Photothermal Conversion Agent

When the specified particles include, as a polymerizable compound, a thermal-polymerizable compound (preferably a thermal-polymerizable monomer), the specified particles may include at least one photothermal conversion agent.

The photothermal conversion agent is a compound that absorbs infrared radiation or the like to generate heat, to polymerize and cure a thermal-polymerizable compound. The photothermal conversion agent may be a publicly known compound.

The photothermal conversion agent is preferably an infrared absorbent. Examples of the infrared absorbent include polymethylindolium, indocyanine green, polymethine pigment, croconium pigment, cyanine pigment, merocyanine pigment, squarylium pigment, chalcogenopyryloallylidene pigment, metal thiolate complex pigment, bis(chalcogenopyrylo)polymethine pigment, oxyindolizine pigment, bisaminoallylpolymethine pigment, indolizine pigment, pyrylium pigment, quinoid pigment, quinone pigment, phthalocyanine pigment, naphthalocyanine pigment, azo pigment, azomethine pigment, and carbon black.

The specified particles including a photothermal conversion agent can be produced by, for example, mixing an oil-phase component including a specified chain polymer and a photothermal conversion agent, and an aqueous-phase component, and emulsifying the resultant mixture.

Such photothermal conversion agents may be used alone or in combination of two or more thereof.

The photothermal conversion agent content relative to the solid-content amount of the specified particles is preferably 0.1 mass % to 25 mass %, more preferably 0.5 mass % to 20 mass %, still more preferably 1 mass % to 15 mass %.

Thermal Curing Accelerator

When the specified particles include, as the polymerizable compound, a thermal-polymerizable compound (preferably a thermal-polymerizable monomer), the specified particles may include at least one thermal curing accelerator.

The thermal curing accelerator is a compound that catalytically promotes the thermosetting reaction of the thermal-polymerizable compound (preferably a thermal-polymerizable monomer).

The thermal curing accelerator may be a publicly known compound. The thermal curing accelerator is preferably acid or base, or a compound that generates acid or base under heating. Examples include carboxylic acid, sulfonic acid, phosphoric acid, aliphatic alcohol, phenol, aliphatic amine, aromatic amine, imidazole (such as phenylimidazole or 2-methylimidazole), and pyrazole.

The specified particles including a thermal curing accelerator can be produced by, for example, mixing an oil-phase component including a specified chain polymer and a thermal curing accelerator, and an aqueous-phase component, and emulsifying the resultant mixture.

Such thermal curing accelerators may be used alone or in combination of two or more thereof.

The thermal curing accelerator content relative to the solid-content amount of the specified particles is preferably 0.1 mass % to 25 mass %, more preferably 0.5 mass % to 20 mass %, still more preferably 1 mass % to 15 mass %.

In the ink according to the present disclosure, the solid-content amount of the specified particles relative to the solid-content amount of the ink is preferably 50 mass % or more, more preferably 60 mass % or more, still more preferably 70 mass % or more, still more preferably 80 mass % or more, still more preferably 85 mass % or more.

This provides higher dispersion stability and higher adhesion between the image and the substrate.

In the ink according to the present disclosure, the solid-content amount of the specified particles relative to the total amount of the ink is preferably 1 mass % to 50 mass %, more preferably 3 mass % to 40 mass %, still more preferably 5 mass % to 30 mass %.

When the solid-content amount of the specified particles relative to the total amount of the ink is 1 mass % or more, higher adhesion between the image and the substrate is provided.

When the solid-content amount of the specified particles relative to the total amount of the ink is 50 mass % or less, the ink has higher dispersion stability.

The volume-average dispersed-particle size of the specified particles is not particularly limited, but is, from the viewpoint of dispersion stability, preferably 0.01 µm to 10.0 µm, more preferably 0.01 µm to 5 µm, still more preferably 0.05 µm to 1 µm, still more preferably 0.05 µm to 0.5 µm, still more preferably 0.05 µm to 0.3 µm.

In this Specification, the "volume-average dispersed-particle size" means a value measured by a light scattering method. The measurement of the volume-average dispersed-particle size of the specified particles by the light scattering method is performed with, for example, LA-960 (HORIBA, Ltd.).

Water

The ink according to the present disclosure contains water.

The water serves as a disperse medium of the specified particles (dispersoid).

The water content of the ink according to the present disclosure is not particularly limited. The water content relative to the total amount of the ink is preferably 10 mass % to 99 mass %, more preferably 20 mass % to 95 mass %, still more preferably 30 mass % to 90 mass %, particularly preferably 50 mass % to 90 mass %.

Coloring Material

The ink according to the present disclosure may be an ink containing at least one coloring material (what is called "color ink"), or may be an ink not containing any coloring material (what is called "clear ink").

When the ink contains a coloring material, the coloring material is preferably contained outside of the specified particles (in other words, the specified particles do not include the coloring material).

The coloring material is not particularly limited, and can be freely selected from publicly known coloring materials such as pigments, water-soluble dyes, and disperse dyes. Of these, more preferably, pigments are included because of high weather resistance and high color reproducibility.

The pigments are not particularly limited, and may be appropriately selected in accordance with the purpose. Examples of the pigments include publicly known organic pigments and inorganic pigments. Other examples of the pigments include resin particles dyed with dyes, commercially available pigment dispersions, and surface-treated pigments (such as a pigment dispersed in a dispersion medium such as water, a liquid compound, or an insoluble resin, and a pigment surface-treated with, for example, a resin or a pigment derivative).

Examples of the organic pigments and inorganic pigments include yellow pigments, red pigments, magenta pigments, blue pigments, cyan pigments, green pigments, orange pigments, violet pigments, brown pigments, black pigments, and white pigments.

When a pigment is used as the coloring material, a pigment dispersing agent may be optionally used.

When a pigment is used as the coloring material, the pigment may be a self-dispersible pigment in which the surfaces of pigment particles have a hydrophilic group.

For the coloring materials and the pigment dispersing agent, reference may be appropriately made to Paragraphs 0180 to 0200 of JP2014-040529A and Paragraphs 0122 to 0129 of WO2016/052053A.

When the ink according to the present disclosure contains a coloring material, the coloring material content relative to the total amount of the ink is preferably 0.1 mass % to 20 mass %, more preferably 0.5 mass % to 10 mass %, particularly preferably 0.5 mass % to 5 mass %.

Other Components

The ink according to the present disclosure may contain, as needed, other components different from the above-described components.

Such other components may be included in the specified particles, or may not be included in the specified particles.

Organic Solvent

The ink according to the present disclosure may contain an organic solvent.

When the ink according to the present disclosure contains an organic solvent, higher adhesion between the image and the substrate can be provided.

When the ink according to the present disclosure contains an organic solvent, the organic solvent content relative to the total amount of the ink is preferably 0.1 mass % to 10 mass %, more preferably 0.1 mass % to 5 mass %.

Specific examples of the organic solvent are as follows:

alcohols (such as methanol, ethanol, propanol, isopropanol, butanol, isobutanol, secondary butanol, tertiary butanol, pentanol, hexanol, cyclohexanol, and benzyl alcohol), polyhydric alcohols (such as ethylene glycol, diethylene glycol, triethylene glycol, polyethylene glycol, propylene glycol, dipropylene glycol, polypropylene glycol, butylene glycol, hexanediol, pentanediol, glycerol, hexanetriol, thiodiglycol, and 2-methylpropanediol), polyhydric alcohol ethers (such as ethylene glycol monomethyl ether, ethylene glycol monoethyl ether, ethylene glycol monobutyl ether, diethylene glycol monoethyl ether, diethylene glycol monomethyl ether, diethylene glycol monobutyl ether, propylene glycol monomethyl ether, propylene glycol monobutyl ether, tripropylene glycol monomethyl ether, dipropylene glycol monomethyl ether, dipropylene glycol dimethyl ether, ethylene glycol monomethyl ether acetate, triethylene glycol monomethyl ether, triethylene glycol monoethyl ether, triethylene glycol monobutyl ether, ethylene glycol monophenyl ether, and propylene glycol monophenyl ether), amines (such as ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, and tetramethylpropylenediamine), amides (such as formamide, N,N-dimethylformamide, and N,N-dimethylacetamide), heterocycles (such as 2-pyrrolidone, N-methyl-2-pyrrolidone, cyclohexylpyrrolidone, 2-oxazolidone, 1,3-dimethyl-2-imidazolidinone, and γ-butyrolactone), sulfoxides (such as dimethyl sulfoxide), sulfones (such as sulfolane), and others (such as urea, acetonitrile, and acetone).

Surfactant

The ink according to the present disclosure may contain at least one surfactant.

When the ink according to the present disclosure contains a surfactant, the ink exhibits higher wettability to the substrate.

Examples of the surfactant include higher fatty acid salt, alkyl sulfate, alkyl ester sulfate, alkyl sulfonate, alkylbenzene sulfonate, sulfosuccinate, naphthalenesulfonate, alkyl phosphate, polyoxyalkylene alkyl ether phosphate, polyoxyalkylene alkyl phenyl ether, polyoxyethylene polyoxypropylene glycol, glycerol ester, sorbitan ester, polyoxyethylene fatty acid amide, and amine oxide.

Of these, the surfactant is preferably at least one surfactant selected from the group consisting of alkyl sulfate, alkyl sulfonate, and alkylbenzene sulfonate, particularly preferably alkyl sulfate.

The surfactant is, from the viewpoint of dispersibility of the specified particles, preferably an alkyl sulfate having an alkyl chain length of 8 to 18, more preferably at least one selected from the group consisting of sodium dodecyl sulfate (SDS, alkyl chain length: 12) and sodium cetyl sulfate (SCS, alkyl chain length: 16).

In addition to the above-described surfactants, there are other surfactants including those described in JP1987-173463A (JP-S62-173463A) and JP1987-183457A (JP-S62-183457A). Examples of the other surfactants include nonionic surfactants such as polyoxyethylene alkyl ethers, polyoxyethylene alkylaryl ethers, acetylene glycols, polyoxyethylene/polyoxypropylene block copolymers, and siloxanes.

Other examples of the surfactant include fluoroorganic compounds.

The fluoroorganic compounds are preferably hydrophobic. The fluoroorganic compounds include fluorosurfactants, oily fluorocompounds (such as fluorinated oil), and solid fluorocompound resins (such as tetrafluoroethylene resin); examples include fluoroorganic compounds described in JP1982-9053B (JP-S57-9053B) (8th column to 17th column) and JP1987-135826A (JP-S62-135826A).

Incidentally, the ink according to the present disclosure may contain substantially no surfactants (for example, anionic surfactants).

Herein, "contain substantially no" means that the content relative to the total amount of the ink is less than 1 mass % (preferably less than 0.1 mass %).

The embodiment in which the ink contains substantially no anionic surfactants has an advantage of suppressing foaming of the ink, an advantage of providing an image having higher water resistance, and an advantage of suppressing post-formation blushing of an image due to bleed out, for example. In particular, in the case of using, for preparation of the ink, a pigment dispersion having an anionic dispersible group, there is also the following advantage: degradation of dispersibility of the pigment is suppressed, the degradation being caused because an anionic surfactant causes an increase in the ion concentration of the system to cause a decrease in the degree of electrolytic dissociation of the anionic pigment dispersing agent.

Polymerization Inhibitor

The ink according to the present disclosure may contain a polymerization inhibitor.

When the ink according to the present disclosure contains a polymerization inhibitor, the ink can have higher storage stability.

Examples of the polymerization inhibitor include p-methoxyphenol, quinones (such as hydroquinone, benzoquinone, and methoxybenzoquinone), phenothiazine, catechols, alkylphenols (such as dibutylhydroxytoluene (BHT)), alkylbisphenols, zinc dimethyldithiocarbamate, copper dimethyldithiocarbamate, copper dibutyldithiocarbamate, copper salicylate, thiodipropionates, mercaptobenzimidazole, phosphites, 2,2,6,6-tetramethylpiperidine-1-oxyl (TEMPO), 2,2,6,6-tetramethyl-4-hydroxypiperidine-1-oxyl (TEMPOL), cupferron Al, and tris(N-nitroso-N-phenylhydroxylamine) aluminum salt.

Of these, preferred is at least one selected from the group consisting of p-methoxyphenol, catechols, quinones, alkylphenols, TEMPO, TEMPOL, cupferron Al, and tris(N-nitroso-N-phenylhydroxylamine) aluminum salt; more preferred is at least one selected from the group consisting of p-methoxyphenol, hydroquinone, benzoquinone, BHT, TEMPO, TEMPOL, cupferron Al, and tris(N-nitroso-N-phenylhydroxylamine) aluminum salt.

Ultraviolet Absorbent

The ink according to the present disclosure may contain an ultraviolet absorbent.

When the ink according to the present disclosure contains an ultraviolet absorbent, it can provide an image having higher weather resistance, for example.

Examples of the ultraviolet absorbent include publicly known ultraviolet absorbents such as benzotriazole-based compounds, benzophenone-based compounds, triazine-based compounds, and benzoxazole-based compounds.

The ink according to the present disclosure may optionally contain, from the viewpoint of hardness of the image, adhesion between the image and the substrate, and control of ink ejection stability, outside of the specified particles, a polymerizable compound, a photopolymerization initiator, and a resin, for example.

These components preferably have water-solubility or water-dispersibility.

Herein, the "water-solubility" is a property in which such a component having been dried at 105° C. for 2 hours has a solubility of more than 1 g in 100 g of distilled water at 25° C.

The "water-dispersibility" is a property in which such a component is water-insoluble and is dispersed in water. This term "water-insoluble" is a property in which such a component having been dried at 105° C. for 2 hours has a solubility of 1 g or less in 100 g of distilled water at 25° C.

The phrase "ink contains a polymerizable compound outside of the specified particles" means that the ink contains a polymerizable compound not included in the specified particles. The same applies to a photopolymerization initiator, a water-soluble resin, a water-dispersible resin, or the like contained outside of the specified particles.

Examples of the polymerizable compound that can be contained outside of the specified particles include polymerizable compounds described in Paragraphs 0148 to 0156 of WO2016/052053A.

Examples of the polymerizable compound that can be contained outside of the specified particles include radical-polymerizable compounds such as a compound having an ethylenically unsaturated group, acrylonitrile, styrene, unsaturated polyester, unsaturated polyether, unsaturated polyamide, and unsaturated urethane.

Of these, the polymerizable compound that can be contained outside of the specified particles is preferably a compound having an ethylenically unsaturated group, particularly preferably a compound having a (meth)acryloyl group.

From the viewpoint of water-solubility or water-dispersibility, the polymerizable compound that can be contained outside of the specified particles is preferably a compound having at least one selected from the group consisting of an amide structure, a polyethylene glycol structure, a polypropylene glycol structure, a carboxyl group, and a salt of a carboxy group.

From the viewpoint of water-solubility or water-dispersibility, the polymerizable compound that can be contained outside of the specified particles is, for example, preferably at least one selected from the group consisting of (meth)acrylic acid, sodium (meth)acrylate, potassium (meth)acrylate, N,N-dimethylacrylamide, N,N-diethyl acryl amide, morpholineacrylamide, N-2-hydroxyethyl(meth)acrylamide, N-vinylpyrrolidone, N-vinylcaprolactam, 2-hydroxyethyl (meth)acrylate, 3-hydroxypropyl (meth)acrylate, 2-hydroxypropyl (meth)acrylate, glycerol monomethacrylate, N-[tris(3-acryloylaminopropyloxymethylene)methyl]acrylamide, diethylene glycol bis(3-acryloylaminopropyl) ether, polyethylene glycol di(meth)acrylate, polypropylene glycol di(meth)acrylate, compounds represented by General formula (a) to General formula (d) below, and ethoxylated trimethylolpropane triacrylate (such as SR9035 manufactured by Sartomer); more preferably, at least one selected from the group consisting of (meth)acrylic acid, N,N-dimethylacrylamide, N-2-hydroxyethyl(meth)acrylamide, 2-hydroxyethyl (meth)acrylate, glycerol monomethacrylate, N-[tris(3-acryloylaminopropyloxymethylene)methyl]acrylamide, diethylene glycol bis(3-acryloylaminopropyl) ether, polyethylene glycol di(meth)acrylate, polypropylene glycol di(meth)acrylate, compounds represented by General formula (a) to General formula (d) below, and ethoxylated trimethylolpropane triacrylate (such as SR9035 manufactured by Sartomer).

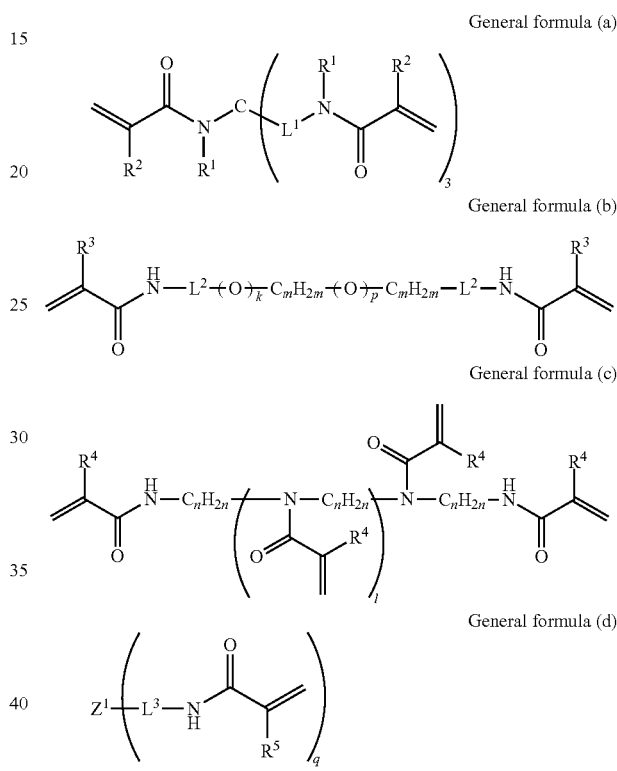

In General formula (a), the plurality of R's each independently represent a hydrogen atom, an alkyl group, an aryl group, or a heterocyclic group; the plurality of $R^2$'s each independently represent a hydrogen atom or a methyl group; and the plurality of $L^1$'s each independently represent a single bond or a divalent linking group.

In General formula (b), the plurality of $R^3$'s each independently represent a hydrogen atom or a methyl group; the plurality of $L^2$'s each independently represent an alkylene group having 1 to 8 carbon atoms; the plurality of k's and p each independently represent 0 or 1; the plurality of m's each independently represent an integer of 0 to 8; however, at least one of k's or p is 1.

In General formula (c), the plurality of $R^4$'s each independently represent a hydrogen atom or a methyl group; the plurality of n's each independently represent an integer of 1 to 8; and l represents an integer of 0 or 1.

In General formula (d), $Z^1$ represents a residue of polyol in which q hydrogen atoms have been removed from the hydroxyl groups; q represents an integer of 3 to 6; the plurality of $R^5$'s each independently represent a hydrogen atom or a methyl group; and the plurality of $L^3$'s each independently represent an alkylene group having 1 to 8 carbon atoms.

Specific examples of compounds represented by General formula (a) to General formula (d) include compounds represented by the following AM-1 to AM-4.

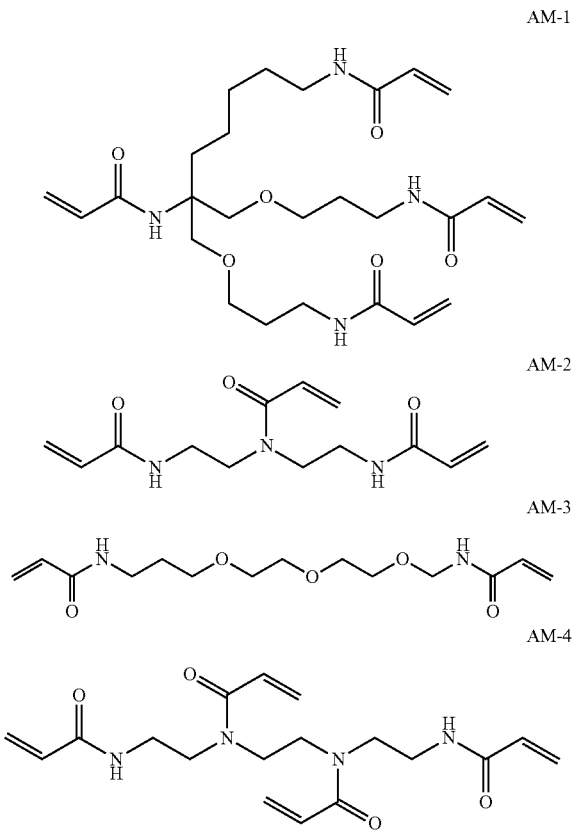

AM-1 to AM-4 above can be synthesized by the method described in JP5591858B.

Regarding the photopolymerization initiator and the resin that can be contained outside of the specified resin, reference can be appropriately made to Paragraphs 0139 to 0147 and 0157 in WO2016/052053A.

Preferred Properties of Ink

When the ink according to the present disclosure is set at 25° C. to 50° C., the ink preferably has a viscosity of 3 mPa·s to 15 mPa·s, more preferably 3 mPa·s to 13 mPa·s. In particular, when the ink according to the present disclosure is set at 25° C., the ink preferably has a viscosity of 50 mPa·s or less. When the viscosity of the ink satisfies such a range, higher ejection stability can be achieved.

Incidentally, the viscosity of the ink is a value measured with a viscometer (VISCOMETER TV-22, Toki Sangyo Co., Ltd.).

Specific Example 1 of Method for Producing Ink (Production Method A)

The method for producing the ink according to the present disclosure is not particularly limited, but is preferably the following Production method A.

The Production method A has a step of mixing an oil-phase component including an organic solvent, a specified gelling agent, and a specified polymer, or an oil-phase component including an organic solvent, a specified gelling agent, and a tri- or higher functional isocyanate compound, and an aqueous-phase component including water, and performing emulsification to thereby form specified particles.

This Production method A enables production of an ink for forming an image having high scratch resistance.

This Production method A facilitates production of an ink according to an embodiment in which the specified gelling agent is included in the specified polymer.

In the step of forming the specified particles, the above-described oil-phase component and the aqueous-phase component are mixed and the resultant mixture is emulsified to thereby form the specified particles. The formed specified particles function as a dispersoid in the ink produced.

Water in the aqueous-phase component functions as a disperse medium in the ink produced.

Examples of the organic solvent included in the oil-phase component include ethyl acetate and methyl ethyl ketone.

The organic solvent is preferably at least partially removed during formation of the specified particles or after formation of the specified particles.

The oil-phase component may include, in addition to the above-described components, for example, a polymerizable compound, a photopolymerization initiator, a sensitizer, a polymerizable-group-introducing compound (preferably, a compound having a polymerizable group and an active hydrogen group), a polymerizable-group-introduced isocyanate compound, and a hydrophilic-group-introduced isocyanate compound.

The aqueous-phase component is not particularly limited as long as it includes water, and may be water alone.

The aqueous-phase component may include, in addition to water, another component.

For example, the aqueous-phase component may include a hydrophilic-group-introducing compound (preferably a compound having a hydrophilic group and an active hydrogen group).

The aqueous-phase component may contain, as a neutralizer for an unneutralized anionic group (such as a carboxy group, a sulfo group, a phosphoric acid group, a phosphonic acid group, or a sulfuric acid group), a basic compound. This enables, during formation of the specified particles, formation of a neutralized anionic group (specifically, an anionic group in the form of salt such as a salt of a carboxy group, a salt of a sulfo group, a salt of a phosphoric acid group, a salt of a phosphonic acid group, or a salt of a sulfuric acid group).

When the basic compound (neutralizer) is used, the basic compound (neutralizer) is preferably contained at least in the aqueous-phase component.

Examples of the basic compound include inorganic bases such as sodium hydroxide and potassium hydroxide, and organic bases such as triethylamine. Of these, preferred basic compounds are inorganic bases such as sodium hydroxide and potassium hydroxide.

Examples of the salt of the anionic group in the form of salt include alkali metal salts such as sodium salts and potassium salts; and organic amine salts such as triethylamine salts. Of these, preferred salts of the anionic group in the form of salt are alkali metal salts such as sodium salts and potassium salts.

In the Production method A, the total amount of the oil-phase component and the aqueous-phase component except for the organic solvent and water corresponds to the solid-content amount of the specified particles in the ink produced.

Regarding preferred ranges of the amounts of components used for the Production method A, reference can be made to the above-described section "Ink". This reference is made such that, in the section "Ink", "content" and "the solid-content amount of the specified particles" are respectively replaced by "usage amount" and "total amount of the oil-phase component and the aqueous-phase component except for the organic solvent and water".

In the step of forming the specified particles, the method of mixing the oil-phase component and the aqueous-phase component is not particularly limited, but is, for example, mixing by stirring.

In the step of forming the specified particles, the method of performing emulsification is not particularly limited, but is, for example, emulsification using an emulsification device such as a homogenizer (for example, a dispersing device).

In the emulsification, the number of revolutions in the dispersing device is, for example, 5000 rpm to 20000 rpm, preferably 10000 rpm to 15000 rpm.

In the emulsification, the time for revolutions is, for example, 1 minute to 120 minutes, preferably 3 minutes to 60 minutes, more preferably 3 minutes to 30 minutes, still more preferably 5 minutes to 15 minutes.

In the step of forming the specified particles, emulsification may be performed under heating.

The emulsification under heating enables more efficient formation of the specified particles.

In addition, the emulsification under heating facilitates, from the mixture, removal of at least a portion of the organic solvent in the oil-phase component.

The heating temperature in the case of emulsification under heating is preferably 35° C. to 70° C., more preferably 40° C. to 60° C.

The step of forming the specified particles may include an emulsification stage of emulsifying the mixture (at a temperature of less than 35° C., for example), and a heating stage of heating (at a temperature of 35° C. or more, for example) the emulsion obtained by the emulsification stage.

Such an embodiment including the emulsification stage and the heating stage enables, particularly in the heating stage, more efficient formation of the specified particles.

In addition, the embodiment including the emulsification stage and the heating stage facilitates, particularly in the heating stage, removal, from the mixture, at least a portion of the organic solvent in the oil-phase component.

The heating temperature in the heating stage is preferably 35° C. to 70° C., more preferably 40° C. to 60° C.

In the heating stage, the heating time is preferably 6 hours to 50 hours, more preferably 12 hours to 40 hours, still more preferably 15 hours to 35 hours.

The Production method A may have, in addition to the step of forming the specified particles, another step as needed.

The other step may be a step of adding other components (such as a pigment) after the step of forming the specified particles.

The other components (such as a pigment) added are the same as the above-described other components that can be contained in the ink.

Specific Example 2 of Method for Producing Ink (Production Method B)

Another method for producing the ink according to the present disclosure may be the following Production method B.

The Production method B has:

a step of mixing an oil-phase component including an organic solvent and a specified polymer, or an oil-phase component including an organic solvent and a tri- or higher functional isocyanate compound, and an aqueous-phase component including water, and performing emulsification, to obtain an aqueous dispersion including specified particles, and a step of adding a specified gelling agent to the obtained aqueous dispersion.

In the addition step of the Production method B, to the aqueous dispersion, in addition to the specified gelling agent, other components (such as a pigment) may be added.

This Production method B also enables production of an ink for forming an image having high scratch resistance.

This Production method B facilitates production of an ink according to an embodiment in which the specified gelling agent is not included in the specified polymer.

In the Production method B, the components that can be included in the oil-phase component and the aqueous-phase component are the same as the components that can be included in the oil-phase component and the aqueous-phase component in the Production method A.

The preferred conditions of the Production method B are also the same as the preferred conditions of the Production method A.

Image-Forming Method

The image-forming method according to the present disclosure has a step of applying, onto a substrate, the above-described ink according to the present disclosure to form an ink film (hereafter, also referred to as "application step"), and a step of heating the ink film (hereafter, also referred to as "heating step").

The image-forming method according to the present disclosure may optionally have another step.

The image-forming method according to the present disclosure forms an image having high scratch resistance on the substrate.

Application Step

The application step is a step of applying the ink according to the present disclosure onto a substrate to form an ink film.

The mode of applying the ink onto the substrate may be any one of modes using publicly known processes such as a coating process, an immersion process, or an ink jet process. In particular, the ink jet process is preferred because it enables formation of films (such as images) on various substrates (including recording media).

The substrate is not particularly limited and may be appropriately selected from, for example, publicly known substrates provided as support bodies and recording media.

Examples of the substrate include paper, paper laminated with plastic (such as polyethylene, polypropylene, or polystyrene), metal plates (plates of metals such as aluminum, zinc, or copper), plastic films [films of, for example, polyvinyl chloride (PVC: Polyvinyl Chloride) resin, cellulose diacetate, cellulose triacetate, cellulose propionate, cellulose butyrate, cellulose acetate butyrate, cellulose nitrate, polyethylene terephthalate (PET: Polyethylene Terephthalate), polyethylene (PE: Polyethylene), polystyrene (PS: Polystyrene), polypropylene (PP: Polypropylene), polycarbonate (PC: Polycarbonate), polyvinyl acetal, or acrylic resin], paper laminated with or vapor-deposition-coated with the foregoing metals, and plastic films laminated with or vapor-deposition-coated with the foregoing metals.

Other examples of the substrate include textile substrates.

Examples of the raw materials of the textile substrates include natural fibers such as cotton, silk, hemp, and wool; chemical fibers such as viscose rayon and lyocell; synthetic fibers such as polyester, polyamide, and acrylic; and mixtures of at least two species selected from the group consisting of natural fibers, chemical fibers, and synthetic fibers. The textile substrates may be textile substrates described in Paragraphs 0039 to 0042 of WO2015/158592A.

Preferred examples of the substrate include plastic substrates such as polyvinyl chloride (PVC) substrates, polystyrene (PS) substrates, polycarbonate (PC) substrates, polyethylene terephthalate (PET) substrates, polypropylene (PP) substrates, and acrylic resin substrates.

The application of the ink by an ink jet process can be performed with a publicly known ink jet recording apparatus.

The ink jet recording apparatus is not particularly limited, and a publicly known ink jet recording apparatus that provides a target resolution can be freely selected and used.

Such an ink jet recording apparatus is, for example, an apparatus including an ink supply device, a temperature sensor, and heating means.

The ink supply device includes, for example, a source tank including the ink according to the present disclosure, supply pipes, an ink supply tank disposed immediately upstream of an ink jet head, a filter, and a piezo ink jet head. The piezo ink jet head may be operated so as to eject multisize dots of preferably 1 pl to 100 pl, more preferably 8 pl to 30 pl, at a resolution of preferably 320 dpi (dot per inch)×320 dpi to 4000 dpi×4000 dpi (dot per inch), more preferably 400 dpi×400 dpi to 1600 dpi×1600 dpi, still more preferably 720 dpi×720 dpi. Incidentally, "dpi" represents the number of dots for 2.54 cm (1 inch).

Alternatively, in the application step, the ink may be applied to a preheated substrate.

In the application step, when the ink is applied to a preheated substrate, the heated substrate can perform the following heating step (specifically, the heated substrate can heat the ink film).

Before the ink is applied, the substrate can be heated by, for example, heating means described as examples in the following heating step.

Heating Step

The heating step is a step of heating the ink film formed on the substrate.

In the heating step, the ink film is heated, so that, as described above, the specified gelling agent exerts the gelation function in the ink film, which provides an image having high scratch resistance.

In the image-forming method according to the present disclosure, in the case of using, as the ink according to the present disclosure, the above-described thermosetting ink (specifically, an ink according to the present disclosure containing specified particles having a thermal-polymerizable group), the heating step may be performed to heat-cure the ink film (namely, thermal polymerization using the thermal-polymerizable group).

The heating in the heating step may be performed by heating, by heating means, the ink applied onto the substrate.

Alternatively, as described above, when, in the application step, the ink is applied to a preheated substrate, the heating in the heating step may be performed by heating the ink with the heated substrate.

The heating means is not particularly limited, and examples include a heating drum, hot air, an infrared lamp, an infrared LED, an infrared heater, a heating oven, a heating plate, an infrared laser, and an infrared dryer. Of these, from the viewpoint that the ink can be efficiently heat-cured, preferred are a light-emitting diode (LED) having a maximum absorption wavelength in the wavelengths of 0.8 μm to 1.5 μm or 2.0 μm to 3.5 μm and having emission wavelengths from near-infrared radiation to far-infrared radiation; a heater that radiates near-infrared radiation to far-infrared radiation; a laser having lasing wavelengths from near-infrared radiation to far-infrared radiation; and a dryer that radiates near-infrared radiation to far-infrared radiation.

The heating temperature during the heating is, from the viewpoint that the specified gelling agent effectively exerts the gelation function, preferably 40° C. or more, more preferably 40° C. to 200° C., still more preferably 45° C. to 100° C., still more preferably 50° C. to 80° C., still more preferably 55° C. to 70° C.

The heating temperature is the temperature of the ink on the substrate, and can be measured with a thermograph using an infrared thermography apparatus H2640 (manufactured by Nippon Avionics Co., Ltd.).

The heating time can be appropriately set in accordance with, for example, the heating temperature, the composition of the ink, and printing speed. The heating time is preferably 5 seconds or more, more preferably 5 seconds to 5 minutes, more preferably 10 seconds to 1 minute, still more preferably 20 seconds to 1 minute.

Curing Step

In the image-forming method according to the present disclosure, in the case of using an ink according to the present disclosure containing specified particles having a polymerizable group (specifically, a photopolymerizable group or a thermal-polymerizable group), the image-forming method according to the present disclosure may have a curing step of curing the ink film having been heated by the heating step.

This curing step causes, in the ink film, a crosslinking reaction (namely, polymerization) of the specified particles having a polymerizable group to proceed. Thus, when the image-forming method according to the present disclosure has the curing step, the resultant image has higher hardness, which results in higher scratch resistance of the image.

In the image-forming method according to the present disclosure, in the case of using a photocurable ink (specifically, the ink according to an embodiment of the present disclosure containing the specified particles having a photopolymerizable group), the curing step can be a curing step (hereafter, "curing step A") of irradiating the ink film having been heated by the heating step, with an actinic energy ray (light), to photocure the ink film.

In the image-forming method according to the present disclosure, in the case of using a thermosetting ink (specifically, the ink according to an embodiment of the present disclosure containing the specified particles having a thermal-polymerizable group), the curing step can be a curing step (hereafter, "curing step B") of subjecting, to heating or irradiation with infrared radiation, the ink film having been heated by the heating step, to thermally cure the ink film.

However, in the case of using the thermosetting ink, instead of performing this curing step B (that is, the curing step B performed in addition to the above-described heating step), the above-described heating step may be performed to achieve gelation and thermal curing of the ink film.

In other words, in the image-forming method according to the present disclosure, in the case of using the thermosetting ink, the heating step of achieving gelation of the ink film and the curing step B of thermally curing the ink film may be individually performed; alternatively, a single heating step of achieving both of gelation and thermal curing of the ink film may be performed.

Curing Step A

The curing step A is a step of irradiating, with an actinic energy ray, the ink film having been heated by the heating step, to cure the ink film.

In the curing step A, the ink film having been heated by the heating step is irradiated with an actinic energy ray, to cause a photocrosslinking reaction (namely, photopolymerization) of the specified particles in the ink film to proceed, to thereby provide higher strength of the ink film.

Examples of the actinic energy ray usable in the curing step A include ultraviolet radiation (UV light), visible light, and an electron beam. Of these, preferred is UV light.

The actinic energy ray (light) preferably has a peak wavelength of 200 nm to 405 nm, more preferably 220 nm to 390 nm, still more preferably 220 nm to 385 nm.

The peak wavelength is also preferably 200 nm to 310 nm, also preferably 200 nm to 280 nm.

During the irradiation with an actinic energy ray (light), the illuminance at the exposed surface is, for example, 10 mW/cm$^2$ to 2000 mW/cm$^2$, preferably 20 mW/cm$^2$ to 1000 mW/cm$^2$.

During the irradiation with an actinic energy ray (light), the exposure energy is, for example, 10 mJ/cm$^2$ to 2000 mJ/cm$^2$, preferably 20 mJ/cm$^2$ to 1000 mJ/cm$^2$.

As sources for emitting an actinic energy ray (light), there are widely known sources such as a mercury lamp, a metal halide lamp, a UV fluorescent lamp, a gas laser, and a solid-state laser.

These light sources listed as examples may be replaced by semiconductor ultraviolet emission devices, which is industrially and environmentally advantageous.

Among semiconductor ultraviolet emission devices, LEDs (Light Emitting Diodes) and LDs (Laser Diodes), which are small, have long longevity and high efficiency, and are inexpensive, are considered as promising light sources.

Preferred light sources are a metal halide lamp, an ultrahigh pressure mercury lamp, a high pressure mercury lamp, a medium pressure mercury lamp, and a low pressure mercury lamp, an LED, and a blue-violet laser.

Of these, in the case of using a sensitizer and a photopolymerization initiator in combination, more preferred is an ultrahigh pressure mercury lamp that emits light at a wavelength of 365 nm, 405 nm, or 436 nm, a high pressure mercury lamp that emits light at a wavelength of 365 nm, 405 nm, or 436 nm, or an LED that emits light at a wavelength of 355 nm, 365 nm, 385 nm, 395 nm, or 405 nm; most preferred is an LED that emits light at a wavelength of 355 nm, 365 nm, 385 nm, 395 nm, or 405 nm.

In the curing step A, the time for irradiating the ink applied onto the substrate with an actinic energy ray is, for example, 0.01 seconds to 120 seconds, preferably 0.1 seconds to 90 seconds.

As the irradiation conditions and the basic irradiation method, the irradiation conditions and the irradiation method disclosed in JP1985-132767A (JP-S60-132767A) can be similarly used.

A preferred mode of irradiation with an actinic energy ray is specifically a mode in which both sides of a head unit including an ink ejection device are equipped with light sources, and the head unit and the light sources are used to perform scanning by, what is called, the shuttle mode; or a mode of irradiation with an actinic energy ray using another light source without being driven.

The irradiation with an actinic energy ray is preferably performed after the lapse of a certain time (for example, 0.01 seconds to 120 seconds, preferably 0.01 seconds to 60 seconds) from landing and heat-drying of the ink.

Curing Step B

The curing step B is a step of subjecting, to heating or irradiation with infrared radiation, the ink film having been heated by the heating step, to thereby thermally cure the ink film.

In the curing step B, the ink film having been heated by the heating step is subjected to heating or irradiation with infrared radiation to cause a thermal crosslinking reaction of the specified particles in the ink (namely, thermal polymerization) to proceed. This provides higher strength of the ink film.

Preferred conditions of the curing step B are the same as the preferred conditions of the heating step.

EXAMPLES

Hereinafter, the present invention will be specifically described with reference to Examples. However, the present invention is not limited to the following Examples.

In the following description, "parts" mean parts by mass unless otherwise specified.

"*" in chemical formulas represent bonding positions.

Example 1: Photocurable Ink with Hydrogelling Agent (Internal Addition) Synthesis of Specified Polymer In accordance with the following reaction scheme, the following Polymer 1 was synthesized as the specified polymer.

The following Polymer 1 has a structure in which a structure unit derived from IPDI (isophorone diisocyanate) and other structure units are bonded together to form urethane groups.

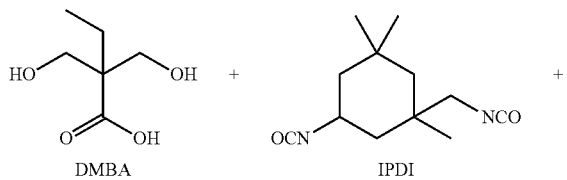

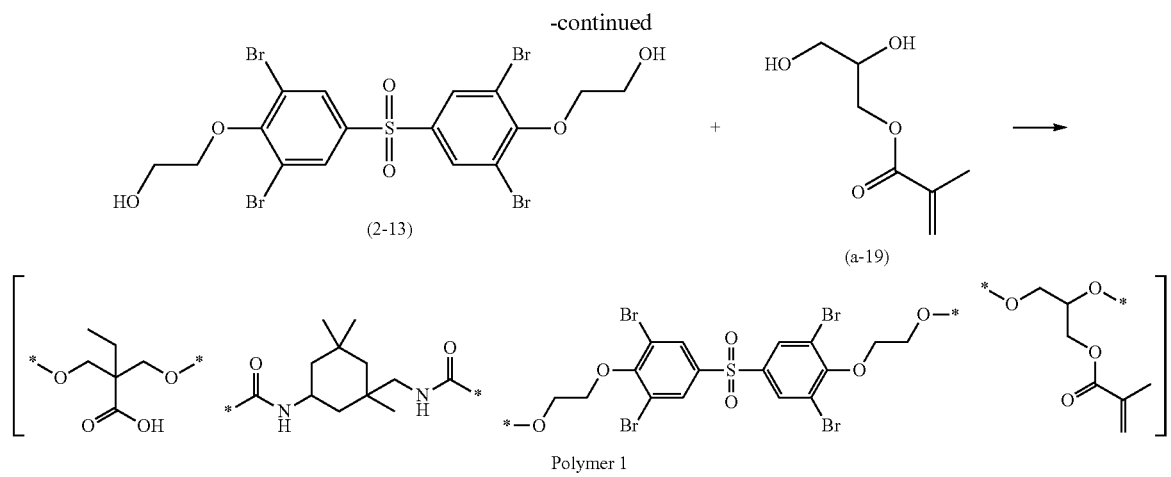

Polymer 1

Into a three-neck flask, IPDI (47.8 g), DMBA (2,2-bis(hydroxymethyl)butyric acid) (9.1 g), Compound (2-13) (26.7 g), Compound (a-19) (16.4 g), and ethyl acetate (100 g) were charged and heated at 70° C. To this, 0.2 g of NEOSTANN U-600 (manufactured by Nitto Kasei Co., Ltd., inorganic bismuth catalyst; hereafter, also referred to as "U-600") was added and stirred at 70° C. for 15 hours.

Subsequently, to this, isopropyl alcohol (70.0 g) and ethyl acetate (63.3 g) were added, and stirred at 70° C. for 3 hours. After stirring for 3 hours, the reaction solution was left to cool to room temperature, and subsequently subjected to adjustment of the concentration using ethyl acetate to thereby obtain a 30 mass % solution of Polymer 1 (the solvent was a mixed solution of ethyl acetate/isopropyl alcohol).

Polymer 1 was found to have a weight-average molecular weight (Mw) of 20000.

Preparation of Aqueous Dispersion
Preparation of Oil-Phase Component
  Ethyl acetate,
  the 30 mass % solution of Polymer 1 (the amount of Polymer 1 was 53 parts by mass),
  a photopolymerizable compound SR833S manufactured by Sartomer (20.5 parts by mass; hereafter also referred to as "S833"),
  a photopolymerizable compound SR399E manufactured by Sartomer (22 parts by mass; hereafter, also referred to as "S399"),
  a photopolymerization initiator IRGACURE (registered trademark) 819 manufactured by BASF (2.5 parts by mass; hereafter, also referred to as "IRG819"),
  as a sensitizer, 2-isopropylthioxanthone manufactured by Tokyo Chemical Industry Co., Ltd. (0.5 parts by mass; hereafter, also referred to as "ITX"), and
  as a gelling agent (specifically a hydrogelling agent), agarose (1.5 parts by mass, manufactured by Sigma-Aldrich Corporation),
were mixed and stirred for 15 minutes, to obtain 45.7 g of an oil-phase component having a solid content of 30 mass %.

The details of the agarose (classification, species of the hydrogen-bonding group, gelling mechanism, and gel point) will be described in Table 1-1.

S833 is a bifunctional photopolymerizable compound having a cyclic structure (polymerizable monomer), specifically tricyclodecanedimethanol diacrylate.

S399 is a pentafunctional photopolymerizable compound not having any cyclic structure (polymerizable monomer), specifically dipentaerythritol pentaacrylate.

IRG819 is an acylphosphine oxide-based photopolymerization initiator, specifically bis(2,4,6-trimethylbenzoyl)-phenylphosphine oxide.
Preparation of Aqueous-Phase Component Distilled water (43.1 g) and sodium hydroxide serving as a neutralizer were mixed and stirred for 15 minutes, to prepare an aqueous-phase component.

The amount of sodium hydroxide used as a neutralizer was adjusted such that the particles to be produced would have a neutralization degree of 90%.

Specifically, the amount of sodium hydroxide was determined using the following mathematical formula.

Amount of sodium hydroxide (g)=Total amount of oil-phase component (g)×(Concentration of solid contents of oil-phase component (mass %)/100)×(Polymer 1 content relative to total solid-content amount of oil-phase component (mass %)/100)×Acid value of Polymer 1 (mmol/g)×0.9×Molecular weight of sodium hydroxide (g/mol)/1000

The acid value of Polymer 1 (mmol/g) is the number of millimoles of carboxy groups included in a mass of 1 g of Polymer 1. Polymer 1 has an acid value (mmol/g) of 0.61 mmol/g.

The oil-phase component and the aqueous-phase component were mixed, and the resultant mixture was emulsified at room temperature with a homogenizer at 12000 rpm for 10 minutes, to obtain an emulsion. The obtained emulsion was added to distilled water (15.3 g). The resultant liquid was heated at 50° C., and stirred at 50° C. for 5 hours, to drive off ethyl acetate from the liquid.

The liquid from which ethyl acetate had been driven off was diluted with distilled water such that the solid-content amount became 20 mass %, to obtain an aqueous dispersion of specified particles.
Preparation of Photocurable Ink Components were mixed so as to satisfy the following composition to prepare a photocurable ink.
Composition of Photocurable Ink
  The above-described aqueous dispersion: 82 parts
  Pigment dispersion liquid (Pro-jet Cyan APD1000 (manufactured by FUJIFILM Imaging Colorants, Inc.), pigment concentration: 14 mass %): 13 parts Fluorosurfactant (manufactured by E. I. du Pont de Nemours and Company, Capstone FS-31, solid content: 25 mass %): 0.3 parts 2-Methylpropanediol: 4.7 parts Evaluations The photocurable ink obtained above was evaluated as described below.

The results are described in Table 1-2.

Scratch Resistance of Cured Film

The photocurable ink stored at room temperature within 1 day from preparation was applied onto a substrate, to form, on the substrate, a coating film having a thickness of 12 μm.

The substrate employed was a polypropylene substrate CORREX, manufactured by DUROplastic Technologies.

The application was performed using the No. 2 bar of the K Hand Coater, manufactured by RK PRINT COAT INSTRUMENTS LTD.

Subsequently, the coating film was heated to dry at 60° C. for 3 minutes.

The dried coating film was irradiated with ultraviolet radiation (UV) to cure the coating film. Thus, a cured film was obtained.

The irradiation with ultraviolet radiation (UV) was performed with a laboratory UV mini conveyor apparatus CSOT (manufactured by GS Yuasa Power Supply Ltd.) including, as an exposure light source, an ozoneless metal halide lamp MAN250L, and set at a conveyor speed of 35 m/min and an exposure intensity of 1.0 W/cm$^2$. This irradiation with UV was performed at an exposure energy of 1000 mJ/cm$^2$.

The cured film formed above was subjected to a scratch test under the following conditions.

Conditions of Scratch Test

Instrument: Reciprocating Abraser "TYPE 30S", manufactured by HEIDON

Scratch stylus: an SUS (stainless steel) scratch stylus having a tip having a radius of curvature of 1.0 mm Load: two conditions of 100 g and 200 g Scratching speed: 3000 mm/min Number of scratching performed: 5 strokes After the scratch test was performed, the surface of the cured film was visually observed, and the scratch resistance of the cured film was evaluated in accordance with the following evaluation grades.

Among the following evaluation grades, A represents the highest scratch resistance of cured films.

Evaluation Grades of Scratch Resistance of Cured Film

A: No scratch marks were observed in the cured film under each of the load conditions of 100 g and 200 g.

B: No scratch marks were observed in the cured film under the load condition of 100 g; however, scratch marks were slightly observed in the cured film under the load condition of 200 g.

C: Scratch marks were slightly observed in the cured film under the load condition of 100 g.

D: Scratch marks were clearly observed in the cured film under the load condition of 100 g.

Ink Ejection Stability

The photocurable ink stored at room temperature within 1 day from preparation was ejected through the head of an ink jet printer (manufactured by Roland DG Corporation, SP-300V) for 30 minutes, and then the ejection was terminated.

After predetermined times (specifically, 5 minutes, 8 minutes, and 10 minutes) elapsed from the termination of ejection, the ink was again ejected through the head onto the substrate to form 5 cm×5 cm solid images.

These images were visually inspected for missing dots due to, for example, nozzles turned into a non-ejection state, and ink ejectability was evaluated in accordance with the following evaluation grades.

Among the following evaluation grades, A represents the highest ink ejectability.

Evaluation Grades of Ejectability

A: No missing dots due to, for example, nozzles turned into a non-ejection state were found even at the time of evaluation of ejection after 10 minutes elapsed from the termination of ejection, and good images were obtained.

B: No missing dots due to, for example, nozzles turned into a non-ejection state were found at the time of evaluation of ejection after 8 minutes elapsed from the termination of ejection, and good images were obtained; however, nozzles turned into a non-ejection state at the time of evaluation of ejection after 10 minutes elapsed from the termination of ejection, and missing dots were found.

C: No missing dots due to, for example, nozzles turned into a non-ejection state were found at the time of evaluation of ejection after 5 minutes elapsed from the termination of ejection, and good images were obtained; however, nozzles turned into a non-ejection state at the time of evaluation of ejection after 8 minutes elapsed from the termination of ejection, and missing dots were found.

D: Nozzles turned into a non-ejection state at the time of evaluation of ejection after 5 minutes elapsed from the termination of ejection, and missing dots were found.

Definition of Image

The substrate was heated with a print heater at 60° C. To the heated substrate, the photocurable ink was ejected through the head of the above-described ink jet printer, to form character images corresponding to FIG. 1 so as to have sizes of 5 points, 7 points, and 10 points.

The character images corresponding to FIG. 1 and formed with the sizes were observed with a craft loupe (manufactured by ETSUMI CO., LTD.) at a magnification of 10. The observation result was evaluated, in terms of definition of the image, in accordance with the following evaluation grades. Among the following evaluation grades, A represents the highest definition of images.

Evaluation Grades of Definition of Image

A: The character image corresponding to FIG. 1 and having the size of 5 points was formed without illegible lettering or blurring.

B: The character image corresponding to FIG. 1 and having the size of 7 points was formed without illegible lettering or blurring (however, B excludes cases evaluated as A).

C: The character image corresponding to FIG. 1 and having the size of 10 points was formed without illegible lettering or blurring (however, C excludes cases evaluated as A or B).

D: The character image corresponding to FIG. 1 and having the size of 10 points was formed illegible or blurry.

Examples 2 to 11: Photocurable Inks with Hydrogelling Agents (Internal Addition)

The same procedures as in Example 1 were performed except that the combination of the species of the gelling agent, the amount of the gelling agent, and the amounts of the photopolymerizable compounds was changed as described in Tables 1-1 and 1-2.

The results are described in Table 1-2.

Examples 12 and 13: Photocurable Inks with Hydrogelling Agents (External Addition)

The same procedures as in Example 1 were performed except for the following changes.
The results are described in Table 1-2.

Changes from Example 1

In the Preparation of aqueous dispersion, the gelling agent was not used.
In the Preparation of photocurable ink, the compositions of the photocurable inks further included gelling agents described in Table 1-2 in the amounts (mass %) described in Table 1-2 relative to the total solid content of the specified particles.
The amounts of aqueous dispersions were adjusted such that the total amounts of the compositions of the photocurable inks became 100 parts.

Comparative Example 1: Photocurable Ink with No Gelling Agent

The same procedures as in Example 1 were performed except that, in the Preparation of aqueous dispersion, the gelling agent was not used, and the amount of photopolymerizable compound (S833) was changed as described in Table 1-1.
The results are described in Table 1-2.

TABLE 1-1

Photocurable ink
Total solid content of particles (amounts are described in parts by mass)

|  | Polymer | | Photopolymerizable compound | | Photopolymerizable compound | | Photopolymerization initiator | | Sensitizer | |
| --- | --- | --- | --- | --- | --- | --- | --- | --- | --- | --- |
|  | Species | Amount | Species | Amount | Species | Amount | Species | Amount | Species | Amount |
| Example 1 | Polymer 1 | 53 | S833 | 20.5 | S399 | 22.0 | IRG819 | 2.5 | ITX | 0.5 |
| Example 2 | Polymer 1 | 53 | S833 | 20.5 | S399 | 22.0 | IRG819 | 2.5 | ITX | 0.5 |
| Example 3 | Polymer 1 | 53 | S833 | 20.5 | S399 | 22.0 | IRG819 | 2.5 | ITX | 0.5 |
| Example 4 | Polymer 1 | 53 | S833 | 20.5 | S399 | 22.0 | IRG819 | 2.5 | ITX | 0.5 |
| Example 5 | Polymer 1 | 53 | S833 | 20.0 | S399 | 22.0 | IRG819 | 2.5 | ITX | 0.5 |
| Example 6 | Polymer 1 | 53 | S833 | 20.0 | S399 | 22.0 | IRG819 | 2.5 | ITX | 0.5 |
| Example 7 | Polymer 1 | 53 | S833 | 20.0 | S399 | 22.0 | IRG819 | 2.5 | ITX | 0.5 |
| Example 8 | Polymer 1 | 53 | S833 | 20.0 | S399 | 22.0 | IRG819 | 2.5 | ITX | 0.5 |
| Example 9 | Polymer 1 | 53 | S833 | 20.0 | S399 | 22.0 | IRG819 | 2.5 | ITX | 0.5 |
| Example 10 | Polymer 1 | 53 | S833 | 20.5 | S399 | 22.0 | IRG819 | 2.5 | ITX | 0.5 |
| Example 11 | Polymer 1 | 53 | S833 | 20.5 | S399 | 22.0 | IRG819 | 2.5 | ITX | 0.5 |
| Example 12 | Polymer 1 | 53 | S833 | 20.5 | S399 | 22.0 | IRG819 | 2.5 | ITX | 0.5 |
| Example 13 | Polymer 1 | 53 | S833 | 20.5 | S399 | 22.0 | IRG819 | 2.5 | ITX | 0.5 |
| Comparative Example 1 | Polymer 1 | 53 | S833 | 22.0 | S399 | 22.0 | IRG819 | 2.5 | ITX | 0.5 |

Photocurable ink
Total solid content of particles (amounts are described in parts by mass)
Gelling agent (internal addition, hydrogelling agent)

|  | Species | Classification | Hydrogen-bonding group | Gelling mechanism | Gel point (° C.) | Amount |
| --- | --- | --- | --- | --- | --- | --- |
| Example 1 | Agarose | Polysaccharide | Hydroxy group | Formation of helixes | 40° C. | 1.5 |
| Example 2 | Gelatin | Protein | Amide group | Formation of helixes | 25° C. | 1.5 |
| Example 3 | Carrageenan | Polysaccharide | Hydroxy group | Formation of helixes | 40° C. | 1.5 |
| Example 4 | Agar | Polysaccharide | Hydroxy group | Formation of helixes | 40° C. | 1.5 |
| Example 5 | Curdlan | Polysaccharide | Hydroxy group | Formation of helixes | 60° C. | 2.0 |
| Example 6 | poly-NIPAM | Acrylic resin | Amide group | Hydrogen bond | 32° C. | 2.0 |
| Example 7 | Polymethyl vinyl ether | Vinyl resin | Ether group | Hydrogen bond | 36° C. | 2.0 |
| Example 8 | Hydroxypropyl cellulose | Polysaccharide | Hydroxy group | Hydrogen bond | 40° C. | 2.0 |
| Example 9 | Polyvinyl alcohol | Vinyl resin | Hydroxy group | Hydrogen bond | 65° C. | 2.0 |
| Example 10 | Methylcellulose | Polysaccharide | Ether group | Hydrophobic interaction | 60° C. | 1.5 |
| Example 11 | PLURONIC P103 | Polyoxyalkylene resin | Polyoxy alkylene group | Hydrogen bond | 48° C. | 1.5 |
| Example 12 | None | — | — | — | — | — |
| Example 13 | None | — | — | — | — | — |
| Comparative Example 1 | None | — | — | — | — | — |

TABLE 1-2

| | Photocurable ink | | | | | |
|---|---|---|---|---|---|---|
| | Gelling agent (external addition, hydrogelling agent) | | | Evaluation results | | |
| | Species | Amount (mass %) relative to total solid content of particles | Amount (mass %) of gelling agent relative to total amount of ink | Scratch resistance | Definition of image | Ejection stability |
| Example 1 | None | — | 0.2 | A | A | A |
| Example 2 | None | — | 0.2 | A | A | A |
| Example 3 | None | — | 0.2 | A | A | A |
| Example 4 | None | — | 0.2 | A | A | A |
| Example 5 | None | — | 0.3 | A | A | A |
| Example 6 | None | — | 0.3 | B | B | A |
| Example 7 | None | — | 0.3 | B | B | A |
| Example 8 | None | — | 0.3 | B | B | A |
| Example 9 | None | — | 0.3 | B | B | A |
| Example 10 | None | — | 0.2 | C | C | A |
| Example 11 | None | — | 0.2 | B | B | A |
| Example 12 | Agarose | 1.5 | 0.2 | A | A | C |
| Example 13 | Curdlan | 2.0 | 0.3 | A | A | C |
| Comparative Example 1 | None | — | 0 | D | D | A |

In Tables 1-1 and 1-2, all the gelling agents are hydrogelling agents, and the details thereof are described in Tables 1-1 and 1-2. The amounts of components in Table 1-1 are the amounts of solid contents. The gelling agents in Tables 1-1 and 1-2 are as follows.

Agarose, manufactured by Sigma-Aldrich Corporation, product name "Agarose BioReagent, for molecular biology, low EEO".

Gelatin, manufactured by Nitta Gelatin Inc., product name "Gelatin RR".

Carrageenan, manufactured by Sansho Co., Ltd., product name "GENUGEL (registered trademark) WG-108".

Agar, manufactured by Sigma-Aldrich Corporation, product name "Agar (agar)", mixture of agarose and agaropectin.

Curdlan, manufactured by Takeda Pharmaceutical Company Limited, product name "Curdlan", degree of polymerization: 400 to 500.

Poly-NIPAM, manufactured by Sigma-Aldrich Corporation, product name "poly-NIPAM", poly(N-isopropylacrylamide), number-average molecular weight (Mn)=30,000.

Polymethyl vinyl ether, manufactured by Sigma-Aldrich Corporation, product name "Poly(methyl vinyl ether) solution (50 wt % in $H_2O$)".

Hydroxypropylcellulose, manufactured by Wako Pure Chemical Industries, Ltd., product name "Hydroxypropylcellulose 150 to 400 cP".

Polyvinyl alcohol, manufactured by The Nippon Synthetic Chemical Industry Co., Ltd., product name "GOHSENOL (registered trademark) NH-18".

Methylcellulose, manufactured by TOMOE ENGINEERING CO., LTD., product name "Mecellose 40H".

PLURONIC P103, manufactured by BASF, product name "PLURONIC (registered trademark) P103", polyethylene glycol (PEG)-polypropylene glycol (PPG)-polyethylene glycol (PEG) block copolymer, PEG/PPG (mass ratio)=30/70, Mn=4950.

As described in Tables 1-1 and 1-2, Examples 1 to 13, which employ inks containing water, particles including a polymer having at least one of a urethane group or a urea group, and a gelling agent having a hydrogen-bonding group (hydrogelling agent), provide images having high scratch resistance, compared with Comparative Example 1, which employs an ink not containing gelling agents. These Examples 1 to 13 also provide high definition of the images and high ejection stability of the inks.

In addition, the results of Examples 1 to 13 have demonstrated the following: when the hydrogelling agent is a hydrogelling agent that forms helixes or hydrogen bonds to form hydrogel (Examples 1 to 9 and 11 to 13), the resultant images have higher scratch resistance.

Among Examples 1 to 9 and 11 to 13, when the hydrogelling agent is a hydrogelling agent that forms helixes to form hydrogel (Examples 1 to 5, 12 and 13), the resultant images have particularly high scratch resistance.

In addition, the results of Examples 1, 5, 12, and 13 have demonstrated the following: when the hydrogelling agent is included in the specified particles (Examples 1 and 5), the ink has higher ejection stability.

In each of the above-described Examples 1 to 13 and Comparative Example 1, the aqueous dispersion of the specified particles was measured for the volume-average dispersed-particle size of the specified particles.

As a result, in each of the Examples, the specified particles were found to have a volume-average dispersed-particle size in the range of 0.15 μm to 0.25 μm.

In addition, in each of the above-described Examples 1 to 13, the aqueous dispersion of the specified particles was measured for the enclosure ratio of the gelling agent in the specified particles.

As a result, in each of Examples 1 to 11, the enclosure ratio of the gelling agent was found to be 99 mass % or more, which demonstrated that the gelling agent was included in the specified particles (namely, in the internal addition manner).

In each of Examples 12 and 13, the enclosure ratio of the gelling agent was found to be 0 mass %, which demonstrated that the gelling agent was not included in the specified particles (namely, in the external addition manner).

Examples 101 to 109 and 112 to 116: Photocurable Inks with Amphiphilic Gelling Agents (Internal Addition)

The same procedures as in Example 1 were performed except that the combination of the species of the gelling agent, the amount of the gelling agent, and the amounts of the photopolymerizable compounds was changed as described in Tables 2-1 and 2-2.

The results are described in Table 2-2.

Examples 110 and 111: Photocurable Inks with Amphiphilic Gelling Agents (External Addition)

The same procedures as in Example 12 were performed except that the species of the gelling agent was changed as described in Tables 2-1 and 2-2.

The results are described in Table 2-2.

In Examples 101 to 116, as the gelling agents, the following amphiphilic gelling agents (gel-01 to gel-09) were employed. The details of gel-01 to gel-09 are described in Tables 2-1 and 2-2.

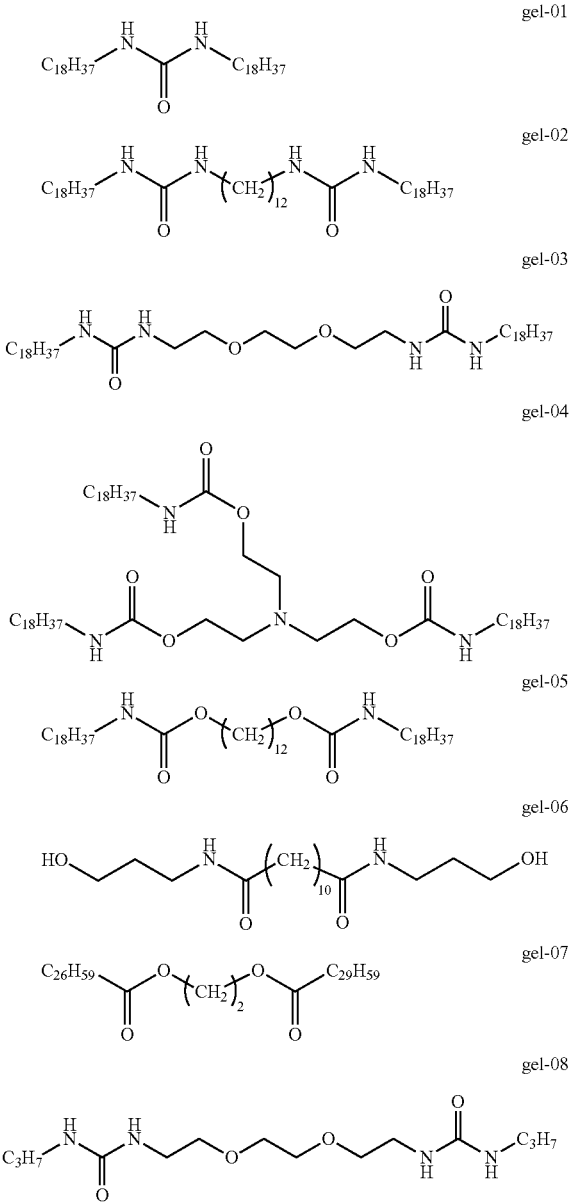

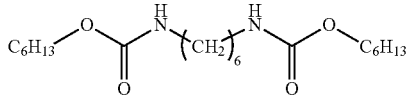

The gel-01 to gel-09 were individually synthesized in the following manner.

Synthesis of gel-01: In THF (tetrahydrofuran), 1 equivalent of stearyl isocyanate was caused to react with 1 equivalent of octadecylamine, subsequently acetone was added, and filtration was performed to collect the resultant solid. In this way, the target substance, gel-01 was obtained.

Synthesis of gel-02: In THF, 2 equivalents of stearyl isocyanate was caused to react with 1 equivalent of 1,12-diaminododecane, subsequently acetone was added, and filtration was performed to collect the resultant solid. In this way, the target substance, gel-02 was obtained.

Synthesis of gel-03: The same procedures as in Synthesis of gel-02 were performed except that 1 equivalent of 1,12-diaminododecane was changed to 1 equivalent of 1,2-bis(2-aminoethoxy)ethane. As a result, the target substance, gel-03 was obtained.

Synthesis of gel-04: The same procedures as in Synthesis of gel-01 were performed except that 1 equivalent of stearyl isocyanate and 1 equivalent of octadecylamine were respectively changed to 3 equivalents of stearyl isocyanate and 1 equivalent of triethanolamine. As a result, the target substance, gel-04 was obtained.

Synthesis of gel-05: The same procedures as in Synthesis of gel-02 were performed except that 1 equivalent of 1,12-diaminododecane was changed to 1 equivalent of 1,12-dodecanediol. As a result, the target substance, gel-05 was obtained.

Synthesis of gel-06: The same procedures as in Synthesis of gel-01 were performed except that 1 equivalent of stearyl isocyanate and 1 equivalent of octadecylamine were respectively changed to 5 equivalents (excess amount) of 3-amino-1-propanol and 1 equivalent of dodecanedioyl dichloride. As a result, the target substance, gel-06 was obtained.

Synthesis of gel-07: In toluene, 2 equivalents of melissic acid was caused to react with 1 equivalent of ethylene glycol in the presence of a sulfuric acid catalyst under dehydration conditions. From the resultant reaction solution, the solvent was driven off. Subsequently, an acetone/methanol solution was used to achieve recrystallization. As a result, the target substance, gel-07 was obtained.

Synthesis of gel-08: The same procedures as in Synthesis of gel-01 were performed except that 1 equivalent of stearyl isocyanate and 1 equivalent of octadecylamine were respectively changed to 2 equivalents of propyl isocyanate and 1 equivalent of 1,2-bis(2-aminoethoxy)ethane. As a result, the target substance, gel-08 was obtained.

Synthesis of gel-09: The same procedures as in Synthesis of gel-01 were performed except that 1 equivalent of stearyl isocyanate and 1 equivalent of octadecylamine were respectively changed to 2 equivalents of hexyl alcohol and 1 equivalent of hexamethylene diisocyanate. As a result, the target substance, gel-09 was obtained.

TABLE 2-1

Photocurable ink
Total solid content of particles (amounts are described in parts by mass)

| | Polymer | | Photopolymerizable compound | | Photopolymerizable compound | | Photopolymerization initiator | | Sensitizer |
|---|---|---|---|---|---|---|---|---|---|
| | Species | Amount | Species | Amount | Species | Amount | Species | Amount | Species |
| Example 101 | Polymer 1 | 53 | S833 | 20.5 | S399 | 22.0 | IRG819 | 2.5 | ITX |
| Example 102 | Polymer 1 | 53 | S833 | 20.5 | S399 | 22.0 | IRG819 | 2.5 | ITX |
| Example 103 | Polymer 1 | 53 | S833 | 20.5 | S399 | 22.0 | IRG819 | 2.5 | ITX |
| Example 104 | Polymer 1 | 53 | S833 | 20.5 | S399 | 22.0 | IRG819 | 2.5 | ITX |
| Example 105 | Polymer 1 | 53 | S833 | 20.0 | S399 | 22.0 | IRG819 | 2.5 | ITX |
| Example 106 | Polymer 1 | 53 | S833 | 20.0 | S399 | 22.0 | IRG819 | 2.5 | ITX |
| Example 107 | Polymer 1 | 53 | S833 | 20.0 | S399 | 22.0 | IRG819 | 2.5 | ITX |
| Example 108 | Polymer 1 | 53 | S833 | 20.0 | S399 | 22.0 | IRG819 | 2.5 | ITX |
| Example 109 | Polymer 1 | 53 | S833 | 20.5 | S399 | 22.0 | IRG819 | 2.5 | ITX |
| Example 110 | Polymer 1 | 53 | S833 | 20.5 | S399 | 22.0 | IRG819 | 2.5 | ITX |
| Example 111 | Polymer 1 | 53 | S833 | 20.5 | S399 | 22.0 | IRG819 | 2.5 | ITX |
| Example 112 | Polymer 1 | 53 | S833 | 21.7 | S399 | 22.0 | IRG819 | 2.5 | ITX |
| Example 113 | Polymer 1 | 53 | S833 | 21.3 | S399 | 22.0 | IRG819 | 2.5 | ITX |
| Example 114 | Polymer 1 | 53 | S833 | 21.0 | S399 | 22.0 | IRG819 | 2.5 | ITX |
| Example 115 | Polymer 1 | 53 | S833 | 20.0 | S399 | 22.0 | IRG819 | 2.5 | ITX |
| Example 116 | Polymer 1 | 53 | S833 | 17.0 | S399 | 22.0 | IRG819 | 2.5 | ITX |

Photocurable ink
Total solid content of particles (amounts are described in parts by mass)

Gelling agent (internal addition, amphiphilic gelling agent)

| | Sensitizer Amount | Species | Hydrogen-bonding group | Number of carbon atoms of alkyl group or alkylene group | Molecular weight | Melting point (° C.) | Amount |
|---|---|---|---|---|---|---|---|
| Example 101 | 0.5 | gel-01 | Urea group | 18 | 565 | 118 | 1.5 |
| Example 102 | 0.5 | gel-02 | Urea group | 18 | 791 | 163 | 1.5 |
| Example 103 | 0.5 | gel-03 | Urethane group | 18 | 739 | 134 | 1.5 |
| Example 104 | 0.5 | gel-04 | Urethane group | 18 | 1036 | 93 | 1.5 |
| Example 105 | 0.5 | gel-05 | Urethane group | 18 | 793 | 112 | 2.0 |
| Example 106 | 0.5 | gel-06 | Amide group | 10 | 345 | 137 | 2.0 |
| Example 107 | 0.5 | gel-07 | Ester group | 29 | 932 | 83 | 2.0 |
| Example 108 | 0.5 | gel-08 | Urea group | 3 | 318 | 132 | 2.0 |
| Example 109 | 0.5 | gel-09 | Urethane group | 6 | 373 | 99 | 1.5 |
| Example 110 | 0.5 | None | — | — | — | — | — |
| Example 111 | 0.5 | None | — | — | — | — | — |
| Example 112 | 0.5 | gel-01 | Urea group | 18 | 565 | 118 | 0.3 |
| Example 113 | 0.5 | gel-01 | Urea group | 18 | 565 | 118 | 0.7 |
| Example 114 | 0.5 | gel-01 | Urea group | 18 | 565 | 118 | 1.0 |
| Example 115 | 0.5 | gel-01 | Urea group | 18 | 565 | 118 | 2.0 |
| Example 116 | 0.5 | gel-01 | Urea group | 18 | 565 | 118 | 5.0 |

TABLE 2-2

Photocurable ink

Gelling agent (external addition, amphiphilic gelling agent)

| | Species | Amount (mass %) relative to total solid content of particles | Amount (mass %) of gelling agent relative to total amount of ink | Evaluation results | | |
|---|---|---|---|---|---|---|
| | | | | Scratch resistance | Definition of image | Ejection stability |
| Example 101 | None | — | 0.2 | A | A | A |
| Example 102 | None | — | 0.2 | A | A | A |
| Example 103 | None | — | 0.2 | A | A | A |
| Example 104 | None | — | 0.2 | A | A | A |
| Example 105 | None | — | 0.3 | A | A | A |
| Example 106 | None | — | 0.3 | B | B | A |
| Example 107 | None | — | 0.3 | C | C | A |
| Example 108 | None | — | 0.3 | C | C | A |
| Example 109 | None | — | 0.2 | C | C | A |
| Example 110 | gel-03 | 1.5 | 0.2 | A | A | C |
| Example 111 | gel-06 | 1.5 | 0.2 | B | B | C |

TABLE 2-2-continued

| | Photocurable ink | | | | | |
|---|---|---|---|---|---|---|
| | Gelling agent (external addition, amphiphilic gelling agent) | | | Evaluation results | | |
| | Species | Amount (mass %) relative to total solid content of particles | Amount (mass %) of gelling agent relative to total amount of ink | Scratch resistance | Definition of image | Ejection stability |
| Example 112 | None | — | 0.05 | B | B | A |
| Example 113 | None | — | 0.1 | A | A | A |
| Example 114 | None | — | 0.2 | A | A | A |
| Example 115 | None | — | 0.3 | A | A | A |
| Example 116 | None | — | 0.8 | A | A | B |

In Table 2-1, "Number of carbon atoms of alkyl group or alkylene group" means the number of carbon atoms of a group that has the maximum number of carbon atoms among all the alkyl groups and the alkylene groups of each gelling agent.

As described in Tables 2-1 and 2-2, Examples 101 to 116, which employ a photocurable ink containing water, particles including a polymer having at least one of a urethane group or a urea group, and a gelling agent having a hydrogen-bonding group (amphiphilic gelling agent), provide images having high scratch resistance as in the above-described Examples 1 to 13. In addition, these Examples 101 to 116 provide, as in the above-described Examples 1 to 13, high definition of the images and the ejection stability of the inks.

The results of Examples 101 to 107 have demonstrated the following: when the hydrogen-bonding group of the amphiphilic gelling agent is at least one selected from the group consisting of an amide group, a urea group, and a urethane group (Examples 101 to 106), the resultant images have higher scratch resistance.

Furthermore, when the hydrogen-bonding group of the amphiphilic gelling agent is at least one selected from the group consisting of a urea group and a urethane group (Examples 101 to 105), the resultant images have even higher scratch resistance.

The results of Examples 101 to 106, 108, and 109 have demonstrated the following: when the hydrophobic group of the amphiphilic gelling agent is at least one selected from the group consisting of linear alkyl groups having 10 or more carbon atoms and linear alkylene groups having 10 or more carbon atoms (Examples 101 to 106), the resultant images have higher scratch resistance.

The results of Examples 103, 106, 110, and 111 have demonstrated the following: when the amphiphilic gelling agent is included in the specified particles (Examples 103 and 106), higher ink ejection stability is achieved.

The results of Examples 112 to 116 have demonstrated the following: when the gelling agent content relative to the total solid content of the specified particles is 0.1 mass % to 2.5 mass % (Examples 112 to 115), higher ink ejection stability is achieved.

Furthermore, the results of Examples 112 to 116 have demonstrated the following: when the gelling agent content relative to the total solid content of the specified particles is 0.5 mass % to 2.5 mass % (Examples 113 to 115), higher ink ejection stability and higher scratch resistance of images are achieved.

In each of the above-described Examples 101 to 116, the aqueous dispersion of the specified particles was measured for the volume-average dispersed-particle size of the specified particles.

As a result, in each of the Examples, the specified particles were found to have a volume-average dispersed-particle size in the range of 0.15 µm to 0.25 µm.

In each of the above-described Examples 101 to 116, the aqueous dispersion of the specified particles was measured for the enclosure ratio of the gelling agent in the specified particles.

As a result, in each of Examples 101 to 109 and 112 to 116, the enclosure ratio of the gelling agent was found to be 99 mass % or more, which demonstrated that the gelling agent was included in the specified particles.

In Examples 110 and 111, the enclosure ratio of the gelling agent was found to be 0 mass %, which demonstrated that the gelling agent was not included in the specified particles.

Example 201: Thermosetting Ink with Hydrogelling Agent

Synthesis of Specified Polymer

In accordance with the following reaction scheme, the following Polymer 2 was synthesized as the specified polymer.

The following Polymer 2 has a structure in which a structure unit derived from IPDI and other structure units are bonded together to form urethane groups.

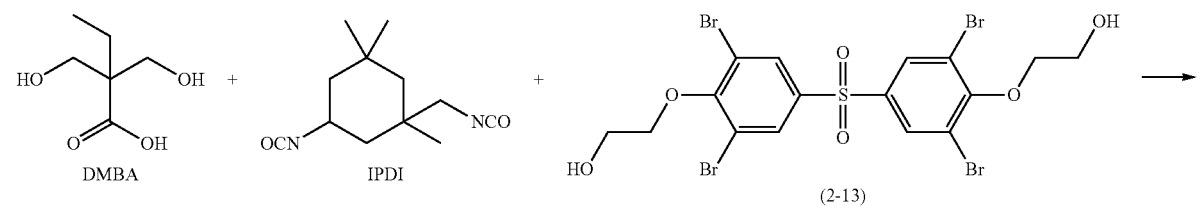

(2-13)

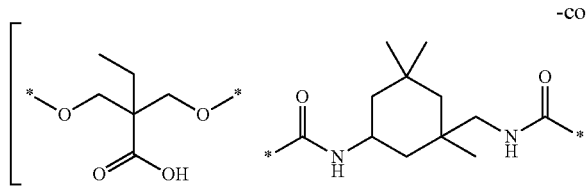
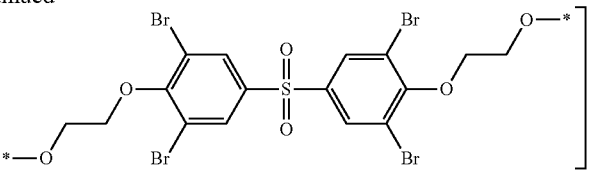

Polymer 2

Into a three-neck flask, IPDI (34.5 g), DMBA (9.1 g), Compound (2-13) (56.4 g), and ethyl acetate (100 g) were charged and heated at 70° C. To this, 0.2 g of NEOSTANN U-600 (manufactured by Nitto Kasei Co., Ltd., inorganic bismuth catalyst; hereafter, also referred to as "U-600") was added and stirred at 70° C. for 15 hours.

Subsequently, to this, isopropyl alcohol (70.0 g) and ethyl acetate (63.3 g) were added, and stirred at 70° C. for 3 hours. After stirring for 3 hours, the reaction solution was left to cool to room temperature, and subsequently subjected to adjustment of the concentration using ethyl acetate to thereby obtain a 30 mass % solution of Polymer 2 (the solvent was a mixed solution of ethyl acetate/isopropyl alcohol).

Polymer 2 was found to have a weight-average molecular weight (Mw) of 20000.
Preparation of Ink In the preparation of the ink, the same procedures as in Example 1 were performed except that S833, S399, IRG819, and ITX were changed to Trixene™ BI 7982 (thermal-polymerizable compound; blocked isocyanate; Baxenden Chemicals Limited) (hereafter, also referred to as "BI7982"; the amount is described in Table 3) from which propylene glycol monomethyl ether was driven off under a reduced pressure under conditions of 60° C. and 2.67 kPa (20 torr), and Polymer 1 was changed to Polymer 2 in the same amount as that of Polymer 1. In this way, a thermosetting ink was prepared.
Evaluations The thermosetting ink obtained above was evaluated in the following manner.

The results are described in Table 3.
Scratch Resistance of Cured Film

The same procedures as in the evaluation of scratch resistance of a cured film in Example 1 were performed except that, in the evaluation of scratch resistance of a cured film, the procedures of heating the coating film at 60° C. for 3 minutes to dry the coating film, and irradiating the dried coating film with ultraviolet radiation (UV) were changed to a procedure of heating the coating film in an oven at 120° C. for 5 minutes.
Ink Ejection Stability and Definition of Image The ink ejection stability and the definition of an image were respectively evaluated as in the evaluations of ink ejection stability and the definition of an image in Example 1.

Example 202: Thermosetting Ink with Amphiphilic Gelling Agent

The same procedures were performed as in Example 201 except that BI7982 was changed to a thermal-polymerizable compound having an epoxy group that was EPICLON™ 840 (DIC Corporation; hereafter also referred to as "EP840"; the amount is described in Table 3) and a thermal curing accelerator that was 2-methylimidazole (hereafter, also referred to as "2MI"; the amount is described in Table 3).

The results are described in Table 3.

Examples 203 to 205, 207, and 208: Thermosetting Inks with Hydrogelling Agents or Amphiphilic Gelling Agents The same procedures were performed as in Example 201 except that the combination of the species of the gelling agent, the amount of the gelling agent, the species of the thermal-polymerizable compound, and the amount of the thermal-polymerizable compound were changed as described in Table 3.

The results are described in Table 3.

Example 206: Thermosetting Ink with Amphiphilic Gelling Agent

The same procedures as in Example 202 were performed except that the species of the gelling agent was changed as described in Table 3.

The results are described in Table 3.

In Examples 201 to 208, the details of the gelling agents (agarose, poly-NIPAM, methylcellulose, gel-01, gel-04, gel-06, and gel-07) are the same as those described in Examples 1 to 13 and 101 to 116.

Comparative Example 201: Thermosetting Ink without Gelling Agent

The same procedures were performed as in Example 201 except that the gelling agent was not used, and the amount of BI7982 was changed as described in Table 3.

The results are described in Table 3.

TABLE 3

| | Thermosetting ink | | | | | | | | | | |
|---|---|---|---|---|---|---|---|---|---|---|---|
| | Total solid content of particles (amounts are described in parts by mass) | | | | | | | | | | |
| | Polymer | | Thermal-polymerizable compound | | Thermal curing accelerator | | Gelling agent (internal addition) | | Amount (mass %) of gelling agent relative to total amount of ink | Evaluation results | | |
| | Species | Amount | Species | Amount | Species | Amount | Species | Amount | | Scratch resistance | Definition of image | Ejection stability |
| Example 201 | Polymer 2 | 53 | BI7982 | 45.5 | — | — | Agarose | 1.5 | 0.2 | A | A | A |
| Example 202 | Polymer 2 | 53 | EP840 | 41.5 | 2MI | 4 | Agarose | 1.5 | 0.2 | A | A | A |
| Example 203 | Polymer 2 | 53 | BI7982 | 45.0 | — | — | poly-NIPAM | 2.0 | 0.3 | B | B | A |
| Example 204 | Polymer 2 | 53 | BI7982 | 45.5 | — | — | Methyl-cellulose | 1.5 | 0.2 | C | C | A |
| Example 205 | Polymer 2 | 53 | BI7982 | 45.5 | — | — | gel-01 | 1.5 | 0.2 | A | A | A |
| Example 206 | Polymer 2 | 53 | EP840 | 41.5 | 2MI | 4 | gel-04 | 1.5 | 0.2 | A | A | A |
| Example 207 | Polymer 2 | 53 | BI7982 | 45.0 | — | — | gel-06 | 2.0 | 0.3 | B | B | A |
| Example 208 | Polymer 2 | 53 | BI7982 | 45.5 | — | — | gel-07 | 1.5 | 0.2 | C | C | A |
| Comparative Example 201 | Polymer 2 | 53 | BI7982 | 47.0 | — | — | None | — | 0 | D | D | A |

As described in Table 3, Examples 201 to 208 relating to thermosetting inks also provide results similar to those of Examples 1 to 13 and 101 to 116 relating to photocurable inks.

In each of the above-described Examples 201 to 208, the aqueous dispersion of the specified particles was measured for the volume-average dispersed-particle size of the specified particles.

As a result, in each of the Examples, the specified particles were found to have a volume-average dispersed-particle size in the range of 0.15 μm to 0.25 μm.

In addition, in each of the above-described Examples 201 to 208, the aqueous dispersion of the specified particles was measured for the enclosure ratio of the gelling agent in the specified particles.

As a result, in each of Examples 201 to 208, the enclosure ratio of the gelling agent was found to be 99 mass % or more, which demonstrated that the gelling agent was included in the specified particles.

Example 301: Photocurable Ink Including MC with Hydrogelling Agent or Amphiphilic Gelling Agent Preparation of Aqueous Dispersion of Microcapsules (MC)

In the following manner, an aqueous dispersion of microcapsules (MC) was prepared, the microcapsules including a shell composed of a polymer having a urethane group and a urea group, and a core including a photopolymerizable compound, a photopolymerization initiator, a sensitizer, and a specified gelling agent.

In this Example, microcapsules (MC) correspond to the specified particles.

Preparation of Oil-Phase Component

Ethyl acetate,

TAKENATE (registered trademark) D-110N (43 parts by mass as the amount of a trifunctional isocyanate compound present as solid content; hereafter, this solid content is also referred to as "D110") manufactured by Mitsui Chemicals, Inc., a solution of the following NCO1 (10 parts by mass as the amount of NCO1 present as solid content), the above-described S833 as a photopolymerizable compound (20.5 parts by mass), the above-described S399 as a photopolymerizable compound (22.0 parts by mass), the above-described IRG819 as a photopolymerization initiator (2.5 parts by mass), the above-described ITX as a sensitizer (0.5 parts by mass), and the above-described agarose as a gelling agent (1.5 parts by mass), were mixed and stirred for 15 minutes, to obtain 45.7 g of an oil-phase component having a solid content of 30 mass %.

TAKENATE D-110N is a 75 mass % ethyl acetate solution of an adduct of trimethylolpropane (TMP) and m-xylylene diisocyanate (XDI) ("D110", which is a trifunctional isocyanate compound).

NCO1 is an isocyanate compound having an introduced carboxy group, specifically, an adduct of 2,2-bis(hydroxymethyl) butyrate (DMBA) and IPDI (DMPA/IPDI=1/3 (molar ratio)). NCO1 has an acid value of 1.2 mmol/g.

The above-described NCO1 solution is a 35 mass % ethyl acetate solution of NCO1.

The NCO1 solution was prepared in the following manner: to a three-neck flask, 18 g of 2,2-bis(hydroxymethyl) butyrate (DMBA), 82 g of isophorone diisocyanate (IPDI), and 186 g of ethyl acetate (AcOEt) were added, and heated at 50° C.; to this, 0.3 g of NEOSTANN U-600 was added, and a reaction was caused for 3 hours.

Preparation of Aqueous-Phase Component

Distilled water (43.1 g) and sodium hydroxide serving as a neutralizer were mixed and stirred for 15 minutes, to prepare an aqueous-phase component.

The amount of sodium hydroxide used as a neutralizer was adjusted such that the MC to be produced would have a neutralization degree of 90%.

Specifically, the amount of sodium hydroxide was determined using the following mathematical formula.

Amount of sodium hydroxide (g)=Total amount of oil-phase component (g)×(Concentration of solid contents of oil-phase component (mass %)/100)×(NCO1 content relative to total solid-content amount of oil-phase component (mass %)/100)×Acid value of NCO1 (mmol/g)×0.9× Molecular weight of sodium hydroxide (g/mol)/ 1000

The oil-phase component and the aqueous-phase component were mixed, and the resultant mixture was emulsified at room temperature with a homogenizer at 12000 rpm for 10 minutes, to obtain an emulsion. The obtained emulsion was added to distilled water (15.3 g). The resultant liquid was heated at 50° C., and stirred at 50° C. for 5 hours, to drive off ethyl acetate from the liquid.

The liquid from which ethyl acetate had been driven off was diluted with distilled water such that the solid-content amount became 20 mass %, to thereby obtain an aqueous dispersion of microcapsules.

The polymer forming the shells of the microcapsules is formed by a reaction between D110, which is a trifunctional isocyanate compound, and NCO1, which is an isocyanate compound having an introduced carboxy group, and has a three-dimensional crosslinked structure.

The polymer of the shells of the microcapsules has
urethane groups originally included in NCO1,
urethane groups originally included in D110, and
urea groups formed by reactions of isocyanate groups in D110 or NCO1, isocyanate groups in D110 or NCO1, and water.

Preparation of Photocurable Ink

Components were mixed together so as to satisfy the following composition to prepare a photocurable ink.

Composition of Photocurable Ink

The above-described aqueous dispersion: 82 parts
Pigment dispersion liquid (Pro-jet Cyan APD1000 (manufactured by FUJIFILM Imaging Colorants, Inc.), pigment concentration: 14 mass %): 13 parts
Fluorosurfactant (manufactured by E. I. du Pont de Nemours and Company, Capstone FS-31, solid content: 25 mass %): 0.3 parts
2-Methylpropanediol: 4.7 parts Evaluations The obtained photocurable ink was evaluated as in the evaluations in Example 1.

The results are described in Table 4-2.

Examples 302 to 304 and 306 to 309

The same procedures as in Example 301 were performed except that the combination of the species of the gelling agent, the amount of the gelling agent, and the amounts of the photopolymerizable compounds was changed as described in Tables 4-1 and 4-2.

The results are described in Table 4-2.

Example 305

In Example 305, Polymer 1 used in Example 1 was used as a dispersing agent for microcapsules.

In this Example, the composite of the microcapsules and the dispersing agent corresponds to the specified particles.

The same procedures as in Example 301 were performed except that, in the Preparation of oil-phase component, the solution of NCO1 (10 parts by mass as the amount of NCO1 present as solid content) was changed to the 30 mass % solution of Polymer 1 prepared in Example 1 (10 parts by mass as the amount of Polymer 1 present as solid content).

Incidentally, the amount of sodium hydroxide used in this Example 305 was determined as in the amount of sodium hydroxide used in Example 1.

The results are described in Table 4-2.

Example 310

The same procedures as in Example 305 were performed except that the species of the gelling agent was changed as described in Table 4-1.

The results are described in Table 4-2.

The polymers forming the shells of microcapsules in Examples 305 and 310 have urea groups formed by a reaction of the isocyanate groups of D110 and water.

Comparative Example 301

The same procedures as in Example 301 were performed except that, in the Preparation of aqueous dispersion, the gelling agent was not used, and the amount of the photopolymerizable compound (S833) was changed as described in Table 4-1.

The results are described in Table 4-2.

TABLE 4-1

Photocurable ink containing MC
Starting materials of MC (amounts are described in parts by mass)

|  | Shells of MC (starting materials) |  |  |  | Cores of MC |  |  |  |
|---|---|---|---|---|---|---|---|---|
|  |  |  |  |  | Photopolymerizable compound |  | Photopolymerizable compound |  |
|  | Species | Amount | Species | Amount | Species | Amount | Species | Amount |
| Example 301 | D110 | 43 | NCO1 | 10 | S833 | 20.5 | S399 | 22.0 |
| Example 302 | D110 | 43 | NCO1 | 10 | S833 | 20.5 | S399 | 22.0 |
| Example 303 | D110 | 43 | NCO1 | 10 | S833 | 20.0 | S399 | 22.0 |
| Example 304 | D110 | 43 | NCO1 | 10 | S833 | 20.5 | S399 | 22.0 |
| Example 305 | D110 | 43 | — | — | S833 | 20.5 | S399 | 22.0 |
| Example 306 | D110 | 43 | NCO1 | 10 | S833 | 20.5 | S399 | 22.0 |
| Example 307 | D110 | 43 | NCO1 | 10 | S833 | 20.5 | S399 | 22.0 |
| Example 308 | D110 | 43 | NCO1 | 10 | S833 | 20.0 | S399 | 22.0 |
| Example 309 | D110 | 43 | NCO1 | 10 | S833 | 20.5 | S399 | 22.0 |
| Example 310 | D110 | 43 | — | — | S833 | 20.5 | S399 | 22.0 |
| Comparative Example 301 | D110 | 43 | NCO1 | 10 | S833 | 22.0 | S399 | 22.0 |

TABLE 4-1-continued

Photocurable ink containing MC
Starting materials of MC (amounts are described in parts by mass)
Cores of MC

|  | Photopolymerization initiator | | Sensitizer | | Gelling agent (internal addition) | |
|---|---|---|---|---|---|---|
|  | Species | Amount | Species | Amount | Species | Amount |
| Example 301 | IRG819 | 2.5 | ITX | 0.5 | Agarose | 1.5 |
| Example 302 | IRG819 | 2.5 | ITX | 0.5 | Agarose | 1.5 |
| Example 303 | IRG819 | 2.5 | ITX | 0.5 | poly-NIPAM | 2.0 |
| Example 304 | IRG819 | 2.5 | ITX | 0.5 | Methylcellulose | 1.5 |
| Example 305 | IRG819 | 2.5 | ITX | 0.5 | Agarose | 1.5 |
| Example 306 | IRG819 | 2.5 | ITX | 0.5 | gel-01 | 1.5 |
| Example 307 | IRG819 | 2.5 | ITX | 0.5 | gel-04 | 1.5 |
| Example 308 | IRG819 | 2.5 | ITX | 0.5 | gel-06 | 2.0 |
| Example 309 | IRG819 | 2.5 | ITX | 0.5 | gel-07 | 1.5 |
| Example 310 | IRG819 | 2.5 | ITX | 0.5 | gel-01 | 1.5 |
| Comparative Example 301 | IRG819 | 2.5 | ITX | 0.5 | None | — |

TABLE 4-2

Photocurable ink containing MC

|  | Dispersing agent | | Amount (mass %) of gelling agent relative to total amount of ink | Evaluation results | | |
|---|---|---|---|---|---|---|
|  | Species | Amount | | Scratch resistance | Definition of image | Ejection stability |
| Example 301 | None | — | 0.2 | A | A | A |
| Example 302 | None | — | 0.2 | A | A | A |
| Example 303 | None | — | 0.3 | B | B | A |
| Example 304 | None | — | 0.2 | C | C | A |
| Example 305 | Polymer 1 | 10 | 0.2 | A | A | A |
| Example 306 | None | — | 0.2 | A | A | A |
| Example 307 | None | — | 0.2 | A | A | A |
| Example 308 | None | — | 0.3 | B | B | A |
| Example 309 | None | — | 0.2 | C | C | A |
| Example 310 | Polymer 1 | 10 | 0.2 | A | A | A |
| Comparative Example 301 | None | — | 0 | D | D | A |

As described in Table 4-2, Examples 301 to 310 relating to photocurable inks containing MC as the specified particles provided results similar to those in Examples 1 to 13 and 101 to 116 relating to photocurable inks containing the specified particles.

In each of the above-described Examples 301 to 310, the aqueous dispersion of MC was measured for the volume-average dispersed-particle size of MC (however, in Examples 305 and 310, the volume-average dispersed-particle size of the composite of MC and the dispersing agent. The same applies to the following description.). As a result, in each of the Examples, MC were found to have a volume-average dispersed-particle size in the range of 0.15 µm to 0.25 µm.

In addition, in each of the above-described Examples 301 to 310, the aqueous dispersion of MC was measured for the enclosure ratio of the gelling agent in MC.

As a result, in each of Examples 301 to 310, the enclosure ratio of the gelling agent was found to be 99 mass % or more, which demonstrated that the gelling agent was included in MC.

Example 401: Thermosetting Ink Containing MC

Preparation of Ink

The same procedures as in Example 301 were performed except that, in the Preparation of ink, S833, S399, IRG819, and ITX were changed to BI7982 (in an amount described in Table 5), to prepare a thermosetting ink.

Evaluations

The thermosetting ink obtained above was subjected to the evaluations for a thermosetting ink as in Example 201.

The results are described in Table 5.

Examples 403 to 405, 407, and 408: Thermosetting Inks Containing MC

The same procedures as in Example 401 were performed except that the combination of the species of the gelling agent, the amount of the gelling agent, and the amount of the thermal-polymerizable compound was changed as described in Table 5.

The results are described in Table 5.

Example 402: Thermosetting Ink Containing MC

The same procedures as in Example 401 were performed except that BI7982 was changed to EP840 (in an amount described in Table 5) and 2MI (in an amount described in Table 5).
The results are described in Table 5.

Example 406: Thermosetting Ink Containing MC

The same procedures as in Example 402 were performed except that the species of the gelling agent was changed as described in Table 5.
The results are described in Table 5.

Comparative Example 401: Thermosetting Ink Containing MC

The same procedures as in Example 401 were performed except that, in the Preparation of aqueous dispersion, the gelling agent was not used, and the amount of the thermal-polymerizable compound (BI7982) was changed as described in Table 5.
The results are described in Table 5.

As described in Table 5, Examples 401 to 408 relating to thermosetting inks containing MC provided results similar to those of Examples 301 to 310 relating to photocurable inks containing MC.

In each of the above-described Examples 401 to 408, the aqueous dispersion of MC was measured for the volume-average dispersed-particle size of MC. As a result, in each of the Examples, MC were found to have a volume-average dispersed-particle size in the range of 0.15 µm to 0.25 µm.

In addition, in each of the above-described Examples 401 to 408, the aqueous dispersion of MC was measured for the enclosure ratio of the gelling agent in MC.

As a result, in each of Examples 401 to 408, the enclosure ratio of the gelling agent was found to be 99 mass % or more, which demonstrated that the gelling agent was is included in MC.

The entire contents disclosed by JP2017-144936 filed in the Japan Patent Office on Jul. 26, 2017 are incorporated herein by reference.

All the documents, patent applications, and technical standards mentioned in this Specification are incorporated herein by reference to the same extent as in the case where the documents, patent applications, and technical standards

TABLE 5

Thermosetting ink containing MC
Starting materials of MC (amounts are described in parts by mass)

| | Shells of MC (starting materials) | | Cores of MC | | | | | |
|---|---|---|---|---|---|---|---|---|
| | | | Thermal-polymerizable compound | | Thermal curing accelerator | | Gelling agent (internal addition) | |
| | Species | Amount | Species | Amount | Species | Amount | Species | Amount |
| Example 401 | D110 | 43 | NCO1 | 10 | BI7982 | 45.5 | — | — | Agarose | 1.5 |
| Example 402 | D110 | 43 | NCO1 | 10 | EP840 | 41.5 | 2MI | 4 | Agarose | 1.5 |
| Example 403 | D110 | 43 | NCO1 | 10 | BI7982 | 45.0 | — | — | poly-NIPAM | 2.0 |
| Example 404 | D110 | 43 | NCO1 | 10 | BI7982 | 45.5 | — | — | Methyl-cellulose | 1.5 |
| Example 405 | D110 | 43 | NCO1 | 10 | BI7982 | 45.5 | — | — | gel-01 | 1.5 |
| Example 406 | D110 | 43 | NCO1 | 10 | EP840 | 41.5 | 2MI | 4 | gel-04 | 1.5 |
| Example 407 | D110 | 43 | NCO1 | 10 | BI7982 | 45.0 | — | — | gel-06 | 2.0 |
| Example 408 | D110 | 43 | NCO1 | 10 | BI7982 | 45.5 | — | — | gel-07 | 1.5 |
| Comparative Example 401 | D110 | 43 | NCO1 | 10 | BI7982 | 47.0 | — | — | None | — |

| | Thermosetting ink containing MC Amount (mass %) of gelling agent relative to total amount of ink | Evaluation results | | |
|---|---|---|---|---|
| | | Scratch resistance | Definition of image | Ejection stability |
| Example 401 | 0.2 | A | A | A |
| Example 402 | 0.2 | A | A | A |
| Example 403 | 0.3 | B | B | A |
| Example 404 | 0.2 | C | C | A |
| Example 405 | 0.2 | A | A | A |
| Example 406 | 0.2 | A | A | A |
| Example 407 | 0.3 | B | B | A |
| Example 408 | 0.2 | C | C | A |
| Comparative Example 401 | 0 | D | D | A |

What is claimed is:

1. An ink composition, comprising:
    water;
    particles comprising a polymer having at least one selected from the group consisting of a urethane group and a urea group; and
    a gelling agent having a hydrogen-bonding group,
    wherein a content of the gelling agent relative to a total solid content of the particles is 0.1 mass % to 2.5 mass %.

2. The ink composition according to claim 1, wherein the hydrogen-bonding group comprises at least one selected from the group consisting of a hydroxy group, an ether group, a polyoxyalkylene group, an ester group, an amide group, a urea group, and a urethane group.

3. The ink composition according to claim 2, wherein the gelling agent comprises at least one selected from the group consisting of a hydrogelling agent and an amphiphilic gelling agent,
    the hydrogelling agent comprises at least one selected from the group consisting of a polysaccharide, a protein, an acrylic resin having the hydrogen-bonding group, a vinyl resin having the hydrogen-bonding group, and a polyoxyalkylene resin, and
    the amphiphilic gelling agent has the hydrogen-bonding group comprising at least one selected from the group consisting of an ester group, an amide group, a urea group, and a urethane group, and a hydrophobic group comprising at least one selected from the group consisting of a linear alkyl group and a linear alkylene group.

4. The ink composition according to claim 3, wherein the gelling agent comprises the hydrogelling agent, and
    the hydrogelling agent comprises at least one selected from the group consisting of agarose, agaropectin, amylose, amylopectin, gum arabic, sodium alginate, propylene glycol alginate, methylcellulose, ethylcellulose, ethylhydroxyethylcellulose, curdlan, carrageenan, carboxymethylcellulose, carboxymethyl starch, agar, xanthan gum, guar gum, quince seeds, glucomannan, keratan sulfate, hydroxyethylcellulose, hydroxypropylcellulose, pectin, methyl starch, locust bean gum, dextrin, cyclodextrin, gelatin, poly(N-isopropylacrylamide), polyvinyl alcohol, polymethyl vinyl ether, polyethylene glycol, polyethylene glycol monomethyl ether, a polyethylene glycol-polypropylene glycol block copolymer, a polyethylene glycol-polypropylene glycol-polyethylene glycol block copolymer, and a polypropylene glycol-polyethylene glycol-polypropylene glycol block copolymer.

5. The ink composition according to claim 3, wherein the gelling agent comprises the hydrogelling agent, and
    the hydrogelling agent forms helixes or hydrogen bonds to form hydrogel.

6. The ink composition according to claim 3, wherein the gelling agent comprises the hydrogelling agent, and
    the hydrogelling agent comprises at least one selected from the group consisting of agarose, agaropectin, amylose, amylopectin, curdlan, carrageenan, agar, and gelatin.

7. The ink composition according to claim 3, wherein the gelling agent comprises the hydrogelling agent, and
    the hydrogelling agent has a gel point of 100° C. or less.

8. The ink composition according to claim 3, wherein the gelling agent comprises the amphiphilic gelling agent,
    the hydrogen-bonding group of the amphiphilic gelling agent comprises at least one selected from the group consisting of an amide group, a urea group, and a urethane group, and
    the hydrophobic group of the amphiphilic gelling agent comprises at least one selected from the group consisting of a linear alkyl group having 10 or more carbon atoms and a linear alkylene group having 10 or more carbon atoms.

9. The ink composition according to claim 3, wherein the gelling agent comprises the amphiphilic gelling agent, and
    the hydrogen-bonding group of the amphiphilic gelling agent comprises at least one selected from the group consisting of a urea group and a urethane group.

10. The ink composition according to claim 3, wherein the gelling agent comprises the amphiphilic gelling agent, and
    the amphiphilic gelling agent has a weight-average molecular weight of less than 2000.

11. The ink composition according to claim 1, wherein the gelling agent is included in the particles.

12. The ink composition according to claim 1, wherein the particles have a polymerizable group.

13. A method for producing the ink composition according to claim 1, the method comprising:
    mixing and emulsifying an oil-phase component comprising an organic solvent, the gelling agent, and the polymer, or an oil-phase component comprising an organic solvent, the gelling agent, and a tri- or higher functional isocyanate compound, and an aqueous-phase component comprising water, to form the particles.

14. An image-forming method, comprising:
    applying the ink composition according to claim 1 onto a substrate to form an ink film; and
    heating the ink film.

* * * * *